US012742878B2

(12) United States Patent
Charvat et al.

(10) Patent No.: US 12,742,878 B2
(45) Date of Patent: Sep. 22, 2026

(54) TECHNIQUES FOR ADAPTIVE COLLECTION OF INFORMATION ABOUT TARGET OBJECTS BASED ON SITUATIONAL AWARENESS DATA

(71) Applicant: TeraDar, Inc., Cambridge, MA (US)

(72) Inventors: Gregory L. Charvat, Guilford, CT (US); Nicholas Saiz, San Jose, CA (US); Matthew Carey, Watertown, MA (US); Gunnar Juergens, Santa Barbara, CA (US); Sunil Chomal, Lexington, MA (US)

(73) Assignee: TeraDar, Inc., Boston, MA (US)

( * ) Notice: Subject to any disclaimer, the term of this patent is extended or adjusted under 35 U.S.C. 154(b) by 152 days.

(21) Appl. No.: 18/750,805

(22) Filed: Jun. 21, 2024

(65) Prior Publication Data

US 2024/0427009 A1 Dec. 26, 2024

Related U.S. Application Data

(60) Provisional application No. 63/509,904, filed on Jun. 23, 2023.

(51) Int. Cl.
*G01S 13/88* (2006.01)
*G01S 13/02* (2006.01)
(Continued)

(52) U.S. Cl.
CPC .............. *G01S 13/88* (2013.01); *G01S 13/89* (2013.01); *G01S 13/931* (2013.01); *H01Q 21/06* (2013.01); *G01S 2013/0263* (2013.01)

(58) Field of Classification Search
None
See application file for complete search history.

(56) References Cited

U.S. PATENT DOCUMENTS 10,162,046 B2 12/2018 Millar et al.
10,578,719 B2 3/2020 O'Keeffe
(Continued)

FOREIGN PATENT DOCUMENTS

DE 10 2018 124638 A1 4/2020
EP 3 885 797 A1 9/2021
(Continued)

OTHER PUBLICATIONS

Invitation to Pay Additional Fees for International Application No. PCT/US2024/035056 mailed Oct. 1, 2024.
(Continued)

*Primary Examiner* — Whitney Moore
(74) *Attorney, Agent, or Firm* — Wolf, Greenfield & Sacks, P.C.

(57) ABSTRACT

Described herein are techniques for adapting usage of radar devices to collect data about target objects based on situational awareness data. Techniques described herein may involve selecting a radar operational configuration (e.g., waveform type, and/or transmitter and/or receiver configuration) and/or frame rate. According to various embodiments, situational awareness data may be indicative of at least one characteristic relating to a vehicle, a target object, and/or the vehicle's environment such as velocity data indicative of the velocity of the vehicle, velocity data indicative of the velocity of a target object, data indicative of at least one weather condition associated with the vehicle's environment, data indicative of the type of road in which the vehicle is traveling, data indicative of the level of traffic in the vehicle's surroundings. Techniques described herein may be deployed for use in connection with computer-assisted driving modules (e.g., ADAS and autonomous vehicles).

20 Claims, 29 Drawing Sheets

(51) Int. Cl.

| | |
|---|---|
| ***G01S 13/89*** | (2006.01) |
| ***G01S 13/931*** | (2020.01) |
| ***H01Q 21/06*** | (2006.01) |

(56) References Cited

U.S. PATENT DOCUMENTS

| | | | |
|---|---|---|---|
| 10,725,169 B2 | 7/2020 | Goossen et al. | |
| 10,754,020 B2 | 8/2020 | Holt et al. | |
| 10,775,484 B2 | 9/2020 | Jeong et al. | |
| 11,300,677 B2 | 4/2022 | Bialer et al. | |
| 11,630,197 B2 | 4/2023 | Unnikrishnan et al. | |
| 11,650,306 B1 | 5/2023 | DeSalvo et al. | |
| 11,867,789 B2 | 1/2024 | Sudarsan et al. | |
| 12,449,507 B2 | 10/2025 | Wu et al. | |
| 12,474,445 B2 | 11/2025 | Lyu et al. | |
| 12,485,887 B2 | 12/2025 | Chilton | |
| 2002/0105456 A1 | 8/2002 | Isaji | |
| 2010/0073216 A1 | 3/2010 | Sakamoto et al. | |
| 2010/0141527 A1 | 6/2010 | Lalezari | |
| 2016/0036124 A1 | 2/2016 | Schoor | |
| 2017/0285141 A1 | 10/2017 | Chung et al. | |
| 2018/0246200 A1 | 8/2018 | Goossen et al. | |
| 2018/0246205 A1 | 8/2018 | Surace | |
| 2019/0064341 A1 | 2/2019 | Bunch et al. | |
| 2019/0196006 A1* | 6/2019 | Hershkowitz | G01S 7/292 |
| 2020/0033445 A1 | 1/2020 | Raphaeli et al. | |
| 2020/0072956 A1 | 3/2020 | Lee | |
| 2020/0218913 A1 | 7/2020 | Unnikrishnan et al. | |
| 2020/0219264 A1 | 7/2020 | Brunner et al. | |
| 2020/0242922 A1 | 7/2020 | Dulberg et al. | |
| 2020/0256947 A1 | 8/2020 | Motoda | |
| 2020/0300995 A1 | 9/2020 | Wu | |
| 2020/0333433 A1 | 10/2020 | Longman et al. | |
| 2020/0341117 A1 | 10/2020 | Sandford et al. | |
| 2020/0341134 A1 | 10/2020 | Roger et al. | |
| 2020/0371229 A1 | 11/2020 | Levitan et al. | |
| 2021/0149038 A1 | 5/2021 | Yuasa et al. | |
| 2022/0187450 A1 | 6/2022 | Vollbracht et al. | |
| 2022/0252720 A1 | 8/2022 | Chung et al. | |
| 2022/0276352 A1 | 9/2022 | Ferreira et al. | |
| 2022/0299593 A1 | 9/2022 | Abir et al. | |
| 2022/0413114 A1 | 12/2022 | Charvat et al. | |
| 2022/0413126 A1 | 12/2022 | Charvat et al. | |
| 2022/0413141 A1 | 12/2022 | Charvat et al. | |
| 2023/0145218 A1 | 5/2023 | Murray et al. | |
| 2023/0176215 A1 | 6/2023 | Li et al. | |
| 2023/0194676 A1 | 6/2023 | Kapsenberg et al. | |
| 2023/0236288 A1 | 7/2023 | Vollbracht et al. | |
| 2023/0384418 A1 | 11/2023 | Jeannin et al. | |
| 2024/0004081 A1 | 1/2024 | Gassend | |
| 2024/0038063 A1 | 2/2024 | Dulberg et al. | |
| 2024/0208492 A1 | 6/2024 | Chilton | |
| 2024/0427008 A1 | 12/2024 | Charvat et al. | |
| 2025/0321325 A1 | 10/2025 | Kapsenberg et al. | |
| 2026/0023162 A1 | 1/2026 | Sandford et al. | |
| 2026/0029512 A1 | 1/2026 | Sandford et al. | |
| 2026/0063764 A1 | 3/2026 | Sandford et al. | |
| 2026/0063765 A1 | 3/2026 | Sandford et al. | |

FOREIGN PATENT DOCUMENTS

| | | |
|---|---|---|
| EP | 4 113 165 A1 | 1/2023 |
| WO | WO 2013/055272 A1 | 4/2013 |

OTHER PUBLICATIONS

Invitation to Pay Additional Fees for International Application No. PCT/US2022/034266 mailed Oct. 21, 2022.

International Search Report and Written Opinion for International Application No. PCT/US2022/034266 mailed Dec. 13, 2022.

International Preliminary Report on Patentability for International Application No. PCT/US2022/034266 mailed Jan. 4, 2024.

Carrara et al., Spotlight synthetic aperture radar. Signal Processing Algorithms. 1995. 570 pages.

Charvat et al., Time-of-flight microwave camera. Scientific reports. Oct. 5, 2015;5(1):1-6.

Gorham et al., SAR image formation toolbox for MATLAB. Algorithms for Synthetic Aperture Radar Imagery XVII. Proc. of SPIE vol. 7699. Apr. 2010. 14 pages.

Jakowatz et al., Spotlight-mode synthetic aperture radar: a signal processing approach. Springer. 1996. 443 pages.

International Search Report and Written Opinion for International Application No. PCT/US2024/035056 mailed Nov. 25, 2024.

International Preliminary Report on Patentability for International Application No. PCT/US2024/035056 mailed Jan. 2, 2026.

* cited by examiner

900a

Tx Element 822a
Tx Element 822b
Tx Element 822c
900b

Tx Element 822a
Tx Element 822b
Tx Element 822c
900c

Tx Element 822a
Tx Element 822b
Tx Element 822c

1000a

Tx Element 822a
Tx Element 822b
Tx Element 822c

1000b

Tx Element 822a
Tx Element 822b
Tx Element 822c

1000c

Tx Element 822a
Tx Element 822b
Tx Element 822c

1400a

Rx Element 1232a
Rx Element 1232b
Rx Element 1232c

1400b

Rx Element 1232a
Rx Element 1232b
Rx Element 1232c

1400c

Rx Element 1232a
Rx Element 1232b
Rx Element 1232c

TECHNIQUES FOR ADAPTIVE COLLECTION OF INFORMATION ABOUT TARGET OBJECTS BASED ON SITUATIONAL AWARENESS DATA

CROSS-REFERENCE TO RELATED APPLICATIONS

This application claims the benefit of priority under 35 U.S.C. § 119(e) of U.S. Provisional Patent Application Ser. No. 63/509,904, entitled "METHODS FOR COLLECTING DATA ABOUT TARGET OBJECTS USING SELECTABLE WAVEFORM TYPES," filed on Jun. 23, 2023, which is incorporated by reference herein in its entirety.

BACKGROUND

Vehicles with Advanced Driver Assistance Systems (ADAS) and Autonomous vehicles, such as self-driving cars, are vehicles equipped with sensors capable of sensing the surrounding environment, which helps the vehicles move without human intervention. Autonomous vehicles have been under development for decades. In recent years, billions have been invested in the pursuit of fully autonomous vehicles. Notwithstanding, the development and deployment of fully autonomous vehicles require significant advances in technology.

SUMMARY

Some embodiments provide for a method of using a radar device to collect data about a target object, the radar device configured to transmit and/or receive RF signals in a plurality of radar operational configurations, the method comprising: obtaining, by processing circuitry of the radar device, situational awareness data for a vehicle, the situational awareness data being indicative of at least one characteristic of the vehicle, at least one characteristic of the target object, and/or at least one characteristic of an environment of the vehicle; selecting, by the processing circuitry, using the situational awareness data for the vehicle and from among the plurality of radar operational configurations, at least one radar operational configuration to use for collecting the data about the target object; transmitting, using a transmitter of the radar device according to the at least one radar operational configuration, one or more RF transmit signals; and receiving, using a receiver of the radar device according to the at least one radar operational configuration, one or more RF receive signals generated at least in part by reflection of the one or more RF transmit signals from the target object.

Some embodiments provide for a radar device for collecting data about a target object, the radar device being configured to transmit and/or receive RF signals in a plurality of radar operational configurations, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle; and select, using the situational awareness data for the vehicle and from among the plurality of radar operational configurations, at least one radar operational configuration to use for collecting the data about the target object; a transmitter configured to transmit, according to the at least one radar operational configuration, one or more RF transmit signals; and a receiver configured to receive, according to the at least one radar operational configuration, one or more RF receive signals generated at least in part by reflection of the one or more RF transmit signals from the target object.

Some embodiments provide for a method of using a radar device to collect data about a target object, the radar device configured to transmit a plurality of waveform types having corresponding frequency bandwidths, the method comprising: obtaining, using processing circuitry of the radar device, situational awareness data for a vehicle, the situational awareness data being indicative of at least one characteristic of the vehicle, at least one characteristic of the target object, and/or at least one characteristic of an environment of the vehicle; selecting, using the processing circuitry, using the situational awareness data for the vehicle and from among the plurality of waveform types having corresponding frequency bandwidths, at least one waveform type to use for collecting the data about the target object; transmitting, using the radar device, one or more RF transmit signals having at least one frequency bandwidth corresponding to the at least one waveform type; and receiving, using the radar device, one or more RF receive signals generated at least in part by reflection of the one or more RF transmit signals from the target object.

Some embodiments provide for a radar device for collecting data about a target object, the radar device being configured to transmit a plurality of waveform types having corresponding frequency bandwidths, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle, and select, using the situational awareness data for the vehicle and from among the plurality of waveform types having corresponding frequency bandwidths, at least one waveform type to use for collecting the data about the target object; a transmitter configured to transmit one or more RF transmit signals having at least one frequency bandwidth corresponding to the at least one waveform type; and a receiver configured to receive one or more RF receive signals generated at least in part by reflection of the one or more RF transmit signals from the target object.

Some embodiments provide for a method of using a radar device to collect data about a target object, the radar device configured to transmit of a plurality of waveform types having a corresponding plurality of frequency bandwidths, the method comprising: obtaining, using processing circuitry of the radar device, situational awareness data for a vehicle; generating, using the processing circuitry, one or more range-cross range images of the target object at least in part by: selecting waveform bandwidths to use for imaging the target object based on the obtained situational awareness data for the vehicle; and imaging the target object using one or more RF signals corresponding to the selected waveform bandwidths.

Some embodiments provide for a radar device configured to collect data about a target object least in part by transmitting of a plurality of waveform types having a corresponding plurality of frequency bandwidths, the radar device comprising: processing circuitry configured to: obtain situational awareness data for a vehicle; generate one or more range-cross range images of the target object at least in part by: selecting waveform bandwidths to use for imaging the target object based on the obtained situational awareness data for the vehicle; and imaging the target object using one or more RF signals corresponding to the selected waveform bandwidths.

Some embodiments provide for a method of using a radar device to collect data about a target object, the radar device being configurable among a plurality of transmitter configurations, the method comprising: obtaining, using processing circuitry of the radar device, situational awareness data for a vehicle, the situational awareness data being indicative of at least one characteristic of the vehicle, at least one characteristic of the target object, and/or at least one characteristic of an environment of the vehicle; selecting, using the processing circuitry, using the situational awareness data for the vehicle and from among a plurality of transmitter configurations, at least one transmitter configuration to use for collecting the data about the target object; transmitting, using a transmitter of the radar device according to the at least one transmitter configuration, one or more RF transmit signals; and receiving, using a receiver of the radar device, one or more RF receive signals generated at least in part by reflection of the one or more RF transmit signals from the target object.

Some embodiments provide for a radar device for collecting data about a target object, the radar device being configurable among a plurality of transmitter configurations, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle, and select, using the situational awareness data for the vehicle and from among the plurality of transmitter configurations, at least one transmitter configuration to use for collecting the data about the target object; a transmitter configured to transmit one or more RF transmit signals according to the at least one transmitter configuration; and a receiver configured to receive one or more RF receive signals generated at least in part by reflection of the one or more RF transmit signals from the target object.

Some embodiments provide for a method of using a radar device to collect data about a target object, the radar device being configurable among a plurality of receiver configurations, the method comprising: obtaining, using processing circuitry of the radar device, situational awareness data for a vehicle, the situational awareness data being indicative of at least one characteristic of the vehicle, at least one characteristic of the target object, and/or at least one characteristic of an environment the vehicle; selecting, using the processing circuitry, using the situational awareness data for the vehicle and from among a plurality of receiver configurations, at least one receiver configuration to use for collecting the data about the target object; transmitting, using a transmitter of the radar device, one or more RF transmit signals; and receiving, using a receiver of the radar device in the at least one receiver configuration, one or more RF receive signals generated at least in part by reflection of the one or more RF transmit signals from the target object.

Some embodiments provide for a radar device for collecting data about a target object, the radar device being configurable among a plurality of receiver configurations, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle, and select, using the situational awareness data for the vehicle and from among the plurality of receiver configurations, at least one receiver configuration to use for collecting the data about the target object; a transmitter configured to transmit one or more RF transmit signals; and a receiver configured to receive one or more RF receive signals, according to the at least one receiver configuration, generated at least in part by reflection of the one or more RF transmit signals from the target object.

Some embodiments provide for a method of using a radar device to generate a range-cross range image of a target object, the method comprising: using processing circuitry of the radar device: obtaining situational awareness data for a vehicle, the situational awareness data being indicative of at least one characteristic of the vehicle, at least one characteristic of the target object, and/or at least one characteristic of an environment of the vehicle; selecting a frame rate based on the situational awareness data for the vehicle; generating a plurality of range-cross range images corresponding to a respective plurality of frames defined by the frame rate, the generating comprising: for a particular frame of the plurality of frames, generating a respective range-cross range image using one or more RF signals received by the radar device during the particular frame; and outputting the plurality of range-cross range images.

Some embodiments provide for a radar device for generating a range-cross range image of a target object, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle; select a frame rate based on the situational awareness data for the vehicle; generate a plurality of range-cross range images corresponding to a respective plurality of frames defined by the frame rate at least in part by: for a particular frame of the plurality of frames, generating a respective range-cross range image using one or more RF signals received by the radar device during the particular frame; and output the plurality of range-cross range images.

BRIEF DESCRIPTION OF DRAWINGS

Various aspects and embodiments will be described with reference to the following figures. It should be appreciated that the figures are not necessarily drawn to scale.

DETAILED DESCRIPTION

Figure 1:
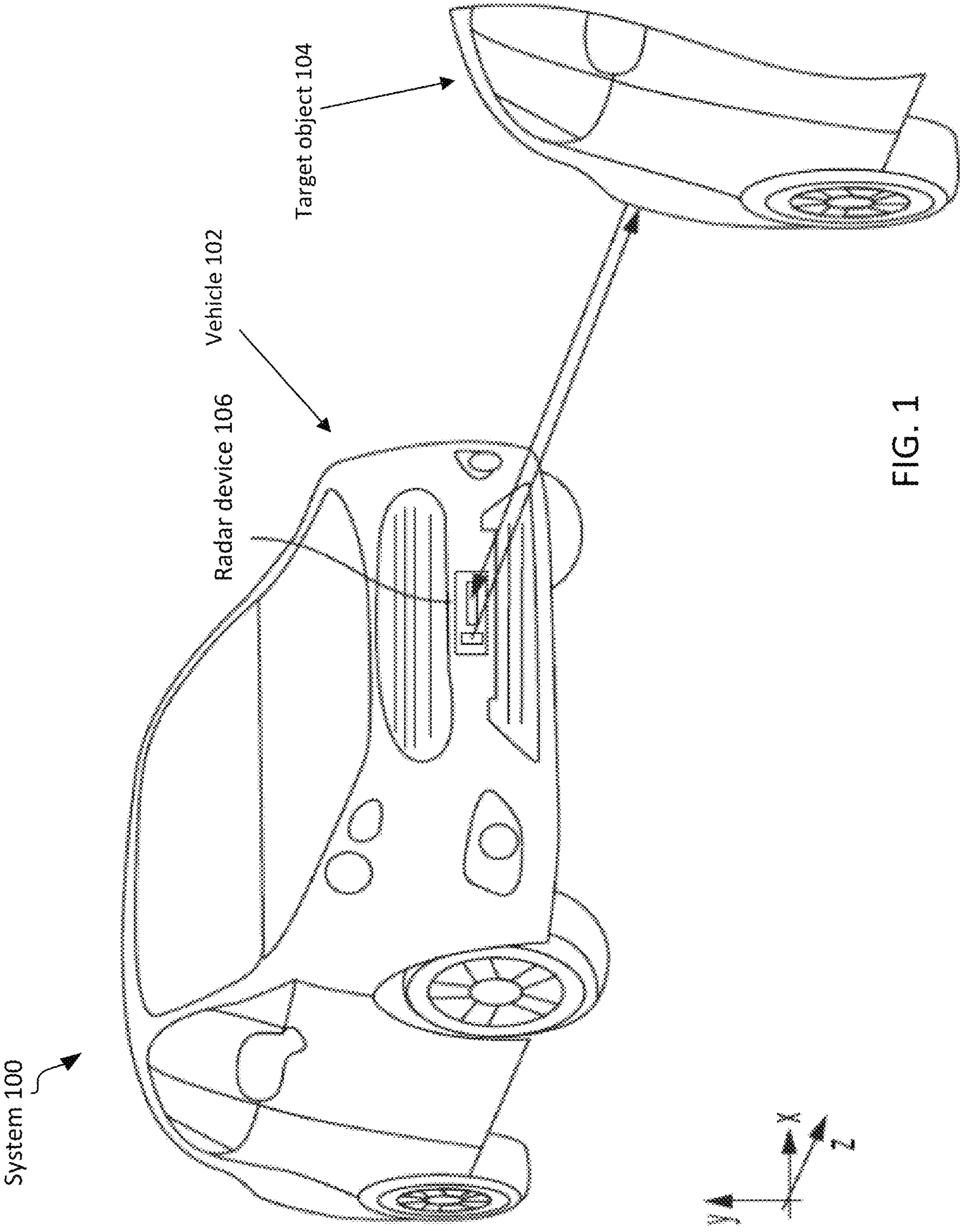
FIG. 1 illustrates an example sensing system including a radar device mounted on a vehicle, in accordance with some embodiments of the technology described herein.

I. Radar Operational Configurations Based on Situational Awareness

The inventors have developed techniques for adapting how a radar device operates based on the environment in which the radar device is operating. In particular, the inventors have developed techniques for configuring the radar device based on situational awareness data related to a vehicle. Examples of situational awareness data include data indicative of the velocity of the vehicle, data indicative of the velocity of a target object, data indicative of at least one weather condition associated with the vehicle's environment, data indicative of the type of road on which the vehicle is traveling, data indicative of the level of traffic in the vehicle's surroundings, data indicative of whether a particular type of cruise control is activated, etc. The techniques described herein may promote vehicle safety, and may be deployed for example in the context of autonomous vehicles, advanced driver assistance systems (ADAS), or more generally for use in connection with computer-assisted driving modules. Examples of vehicles to which the techniques described herein may be applied include cars, trucks, aircrafts, vertical take-off and landing (VTOL) aircrafts, short take-off and landing (STOL) aircrafts, helicopters, ships, boats, bicycles, motorbikes, spacecrafts, and other types of vehicles.

In some embodiments, radar operational configurations may be selected to balance radar range, precision, field of view, and/or frame rate with constraints on available power. For example, when a vehicle is traveling at high speed (e.g., on a highway), a radar operational configuration with high radar range, low range resolution, low angular precision, moderate field of view, and/or moderate frame rate may be selected so that the radar device may make efficient use of power (e.g., on detecting other vehicles that may be far away, even at lower range resolution). As another example, when a vehicle has low power available (e.g., a low battery in an electric or hybrid-electric vehicle), a radar operational configuration with moderate radar range, moderate precision, moderate field of view, and/or low frame rate may be selected so that the radar device may consume less power while still providing important radar images to the vehicle. As yet another example, when a vehicle is traveling at low speed (e.g., while parking), a radar operational configuration with low radar range, high range resolution, high angular precision, large field of view, and high frame rate may be selected so that the radar device may provide radar images with sufficient resolution for locating and/or identifying target objects likely to be present and to create a safety concern.

The inventors have recognized that accurate and adaptive sensing systems may facilitate widespread and safe operation of autonomous and semi-autonomous vehicles and/or vehicle features (e.g., assisted and/or self-parking modes, semi-automated cruise control, lane departure warning and/or prevention systems, etc.). Conventional vehicle sensing systems, such as conventional radar devices, are not adaptive in that they do not respond to changing vehicle conditions. Another drawback of conventional vehicle sensing systems (e.g., radar, LIDAR, optical) is that they consume a large amount of power, which may preclude incorporation into modern high efficiency vehicles such as electric vehicles, in which energy available for sensing devices may be limited.

Some techniques developed by the inventors overcome these drawbacks by adapting a radar operational configuration of a radar device based on situational awareness. In some embodiments, situational awareness data indicative of a characteristic of a vehicle, a target object, and/or an environment of the vehicle may be used to select a radar operational configuration that is appropriate for the situation. For example, where a vehicle is traveling at low speed (e.g., in a parking mode), an appropriate radar operational configuration may specify short-range, high range resolution, high angular precision, large field of view, and high frame rate radar imaging, such as with the expectation that pedestrians may be near the vehicle. As another example, where a vehicle is traveling at high speed (e.g., on a highway), an appropriate radar operational configuration may specify long range, low range resolution, moderate angular precision, moderate field of view, and moderate frame rate imaging, such as with the expectation that objects on the road are likely to be other vehicles that are far away enough to give a moderately long reaction time to the sensing vehicle. As yet another example, where an object has been detected (e.g., within an elevation and/or azimuth range), an appropriate radar operational configuration may specify a range consistent with the detected range of the object, high (and/or tailored) range resolution, high angular precision, and a field of view tailored to the directional range (e.g., in elevation and/or azimuth) in which the object was detected.

Accordingly, some embodiments provide a method of using a radar device (e.g., 200 in FIGS. 2A-3B) to collect data about a target object, the radar device configured to transmit and/or receive RF signals in a plurality of radar operational configurations. For example, the radar device may have processing circuitry (e.g., 210), a transmitter (e.g., 220), and a receiver (e.g., 230).

Figure 3A:
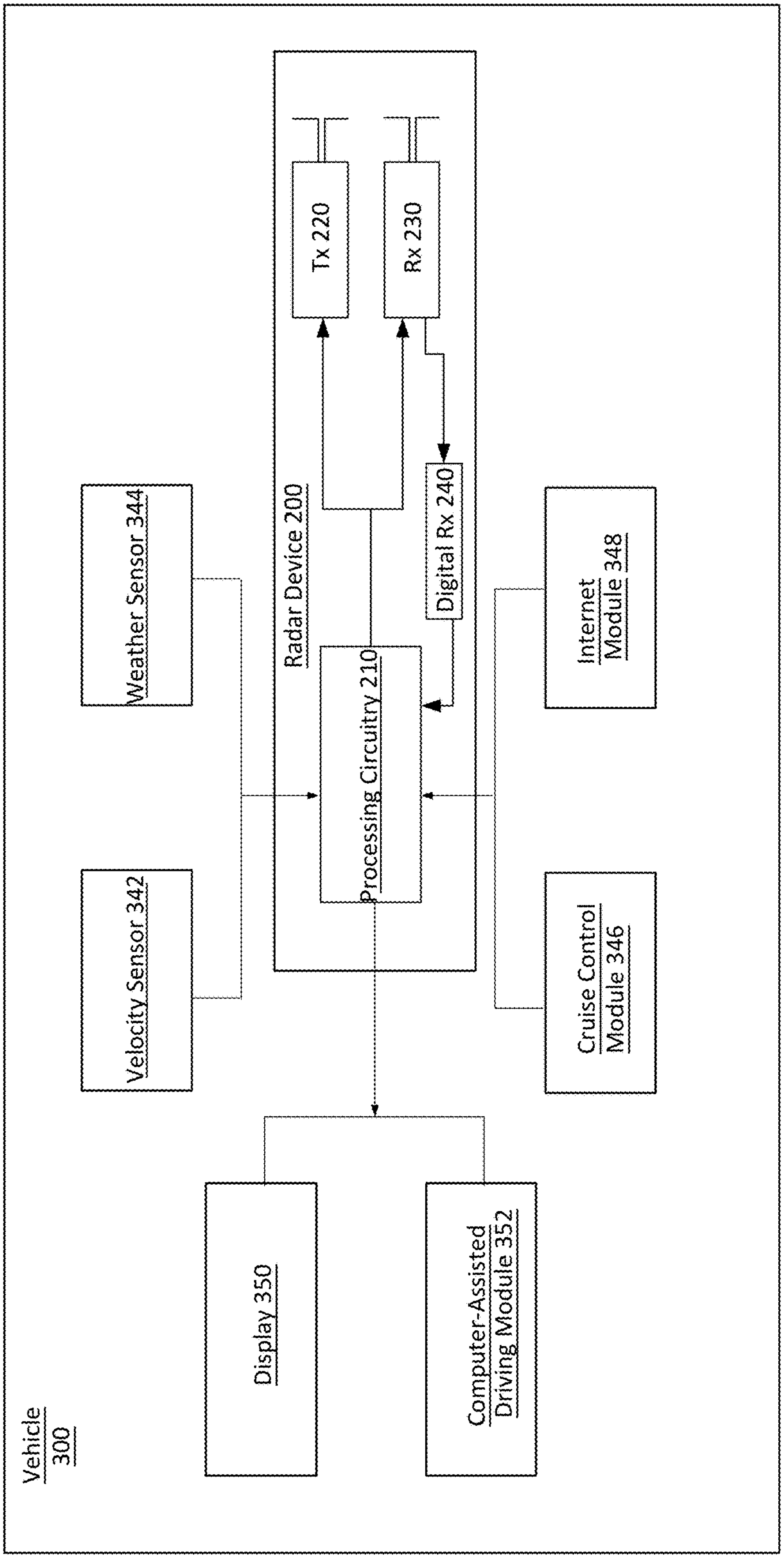
FIG. 3A illustrates an example vehicle equipped with a radar device and other components that are communicatively coupled to the radar device, in accordance with some embodiments of the technology described herein.

In some embodiments, the method includes obtaining, by the processing circuitry (e.g., 210) of the radar device (e.g., 200), situational awareness data for a vehicle (e.g., 300 in FIG. 3A). For example, the situational awareness data may be indicative of at least one characteristic of the vehicle, at least one characteristic of the target object, and/or at least one characteristic of an environment of the vehicle. For example, the situational awareness data may include data selected from a group consisting of: data indicating a velocity of the vehicle, data indicating that the vehicle is in a cruise control and/or lane departure prevention mode, data indicating that the vehicle is parking, data indicating that the vehicle is on a highway, data indicating a low power level of the vehicle, data indicating a distance from the vehicle to the target object, data indicating a velocity of the target object, data indicating an elevation range of the target object with respect to the radar device, data indicating an azimuth range of the target object with respect to the radar device, data indicating a level of traffic in the environment of the vehicle, data indicating a type of road on which the vehicle is traveling, data indicating a weather condition in the environment of the vehicle, and data indicating a hazardous condition in the environment of the vehicle.

In some embodiments, the method may include selecting, by the processing circuitry (e.g., 210) of the radar device (e.g., 200), using the situational awareness data for the vehicle and from among the plurality of radar operational configurations, at least one radar operational configuration to use for collecting the data about the target object. For example, radar operational configurations selectable by the processing circuitry may specify a plurality of waveform types (e.g., FIGS. 5A-5B), a plurality of transmitter configurations (e.g., FIGS. 7-10D), and/or a plurality of receiver configurations (e.g., FIGS. 11-14D). For instance, the waveform types may have different frequency bandwidths (e.g., FIG. 5B) providing different range resolutions, the transmitter configurations may specify different transmit power levels (e.g., FIGS. 9A-9B), different subsets of transmit antenna elements (e.g., FIGS. 9B-9C), and/or different transmit phase shift patterns (e.g., FIGS. 10A-10C) to produce different transmit beams, and/or the receiver configurations may specify different subsets of receive antenna elements (e.g., FIGS. 13A-13B) and/or different receive phase shift patterns (e.g., FIGS. 14A-14C) to produce different receive beams.

In some embodiments, the method may include transmitting, transmitting, using the transmitter (e.g., 220) of the radar device (e.g., 200) according to the radar operational configuration(s), one or more RF transmit signals. For example, the plurality of radar operational configurations may specify a plurality of waveform types (e.g., FIG. 5B) having corresponding frequency bandwidths, the radar operational configuration(s) may specify at least one waveform type of the plurality of waveform types having a corresponding frequency bandwidth, and the RF transmit signal(s) (e.g., transmitted using the transmitter) may have the specified waveform type(s). For instance, where multiple waveform types are specified, RF transmit signals may be transmitted having respective ones of the multiple waveform types over time, such as during a frame and/or over a sequence of frames.

In the same or another example, the transmitter (e.g., 820 in FIG. 8) may include a plurality of transmit antenna elements (e.g., 822) arranged along a dimension (e.g., elevation) of a transmit antenna array of the transmitter (e.g., 820), the plurality of radar operational configurations may specify a plurality of different subsets of the plurality of transmit antenna elements (e.g., 822 in FIGS. 9B-9C), the radar operational configuration(s) may specify at least one subset (e.g., FIG. 9B and/or FIG. 9C) of the plurality of different subsets, and transmitting the RF transmit signal(s) according to the radar operational configuration(s) may include transmitting the RF transmit signal(s) using the specified subset(s) of the plurality of different subsets of the plurality of transmit antenna elements (e.g., 822). For instance, where multiple subsets of transmit antenna elements are specified, RF transmit signals may be transmitted using different ones of the subsets over time, such as during a frame and/or over a sequence of frames.

In the same or yet another example, the transmitter (e.g., 820 in FIG. 8) may include a plurality of transmit antenna elements (e.g., 822) arranged along a dimension (e.g., elevation) of a transmit antenna array of the transmitter (e.g., 820), the plurality of radar operational configurations may specify a plurality of different transmit phase shift patterns (e.g., FIGS. 10A-10C) for transmitting the RF transmit signal(s) via the plurality of transmit antenna elements (e.g., 822), the radar operational configuration(s) may specify at least one transmit phase shift pattern (e.g., FIG. 10A, FIG. 10B, and/or FIG. 10C) of the plurality of different transmit phase shift patterns, and transmitting the RF transmit signal(s) according to the radar operational configuration(s) may include transmitting the RF transmit signal(s) according to the specified transmit phase shift pattern(s). For instance, where multiple transmit phase shift patterns are specified, RF transmit signals may be transmitted using different ones of the multiple transmit phase shift patterns over time, such as during a frame (e.g., to produce a first sweep over a first angular field of view) and/or over a sequence of frames (e.g., to produce multiple sweeps of respective angular fields of view during respective frames).

In some embodiments, the method may include receiving, using the receiver (e.g., 230) of the radar device (e.g., 200) according to the radar operational configuration(s), one or more RF receive signals generated at least in part by reflection of the one or more RF transmit signals from the target object. For example, where the radar operational configuration(s) specify at least one receiver configuration, such as a subset of receive antenna elements and/or a receive phase shift pattern, the RF receive signal(s) may be received according to the specified receiver configuration(s). For example, the receiver (e.g., 1230 in FIG. 12) may include a plurality of receive antenna elements (e.g., 1232) arranged along a dimension (e.g., azimuth) of a receive antenna array of the receiver (e.g., 1230), the plurality of radar operational configurations may specify a plurality of different subsets (e.g., FIGS. 13A-13B) of the plurality of receive antenna elements (e.g., 1232), the radar operational configuration(s) may specify at least one subset (e.g., FIG. 13A and/or FIG. 13B of the plurality of different subsets, and receiving the RF receive signal(s) according to the radar operational configuration(s) may include receiving the RF receive signal(s) using the specified subset(s) of the plurality of different subsets of the plurality of receive antenna elements (e.g., 1232). For instance, where multiple subsets of receive antenna elements are specified, RF receive signals may be received using different ones of the subsets over time, such as during a frame and/or over a sequence of frames.

In the same or another example, the receiver (e.g., 1230) may include a plurality of receive antenna elements (e.g., 1232) arranged along a dimension (e.g., azimuth) of a receive antenna array of the receiver (e.g., 1230), the plurality of radar operational configurations may specify a plurality of different receive phase shift patterns (e.g., FIGS. 14A-14C) for receiving the RF receive signal(s) via the plurality of receive antenna elements (e.g., 1232), the radar operational configuration(s) may specify at least one receive phase shift pattern (e.g., FIG. 14A, FIG. 14B, and/or FIG. 14C) of the plurality of different receive phase shift patterns, and receiving the RF receive signal(s) may include receiving the RF receive signal(s) according to the specified receive phase shift pattern(s). For instance, where multiple receive phase shift patterns are specified, RF receive signals may be received using different ones of the multiple receive phase shift patterns over time, such as during a frame (e.g., to produce a first sweep over a first angular field of view) and/or over a sequence of frames (e.g., to produce multiple sweeps of respective angular fields of view during respective frames).

In some embodiments, the method may further include generating, using processing circuitry (e.g., 210) of the radar device (e.g., 200) according to the radar operational configuration(s), using the RF receive signal(s), a range-cross range image of the target object. For example, the plurality of radar operational configurations may specify a plurality of frame rates, the radar operational configuration(s) may specify at least one frame rate of the plurality of frame rates, and generating the range-cross range image may use the RF receive signal(s) received during a frame defined by the specified frame rate(s). For instance, the RF transmit signal(s) may be transmitted before and/or during the frame (e.g., with multiple RF transmit signals being swept over an angular field of view), the RF receive signal(s) may be received during the frame (e.g., with multiple RF receive signals being received over an angular field of view), and the range-cross range image may use the RF receive signal(s).

In some embodiments, the vehicle is a car. In other embodiments, the vehicle may be a boat or aircraft. In some embodiments, the RF transmit signal(s) may have frequency content in a frequency band of 300 GHz-3 THz.

FIG. 1 illustrates an example sensing system 100 including a radar device 106 mounted on a vehicle 102, in accordance with some embodiments of the technology described herein.

Although radar device 106 is shown as being attached to the front bumper of a vehicle 102, embodiments of the present technology are not limited to any particular location. Further, vehicles may be equipped with more than one radar device 106. For example, a radar device may be attached to the front side of the vehicle, and another radar device may be attached to the rear side.

In some embodiments, radar device 106 may include a transmitter, a receiver and processing circuitry (e.g., analog and/or digital circuitry). For example, the transmitter may be configured to transmit RF signals in directions where target objects are likely to be present. For example, RF signals may be transmitted along the road in front of a vehicle. Similarly, the receiver may be configured to receive RF signals resulting from the reflection of transmitted RF signals from a target object 104. In FIG. 1, for example, transmitted signals may be reflected from the rear side of another vehicle. In some embodiments, the processing circuitry may be configured to use the received RF signals to determine the relative and/or absolute location of the target object and/or to produce images (e.g., range-cross range images). In some embodiments, the position (and/or velocity) of a target object may be determined based on a measurement of distance relative to the known location of the radar device (and/or based on Doppler shift measurements). In some embodiments, a computer-assisted driving module may use the data obtained using the radar device to automatically control the vehicle in some respect (e.g., to self-drive the vehicle without human intervention or with some degree of human intervention) or to perform other automated operations.

FIG. 1 further shows an x-y-z coordinate system as applied to the illustrated scene. The x-axis will be referred to herein as the horizontal axis or azimuth axis, the y-axis as the vertical axis or elevation axis, and the z-axis as the longitudinal axis or range axis. In the illustrated embodiment, the z-axis is an axis along which the vehicle 102 is separated from the target object 104. In some embodiments, a transmitter and/or receiver of radar device 106 may have an array of antenna elements arranged along the x-axis (e.g., to focus transmission and/or reception in the x-z or azimuth plane) and/or arranged along the y-axis (e.g., to focus transmission and/or reception in the y-z or elevation plane).

Figure 2A:
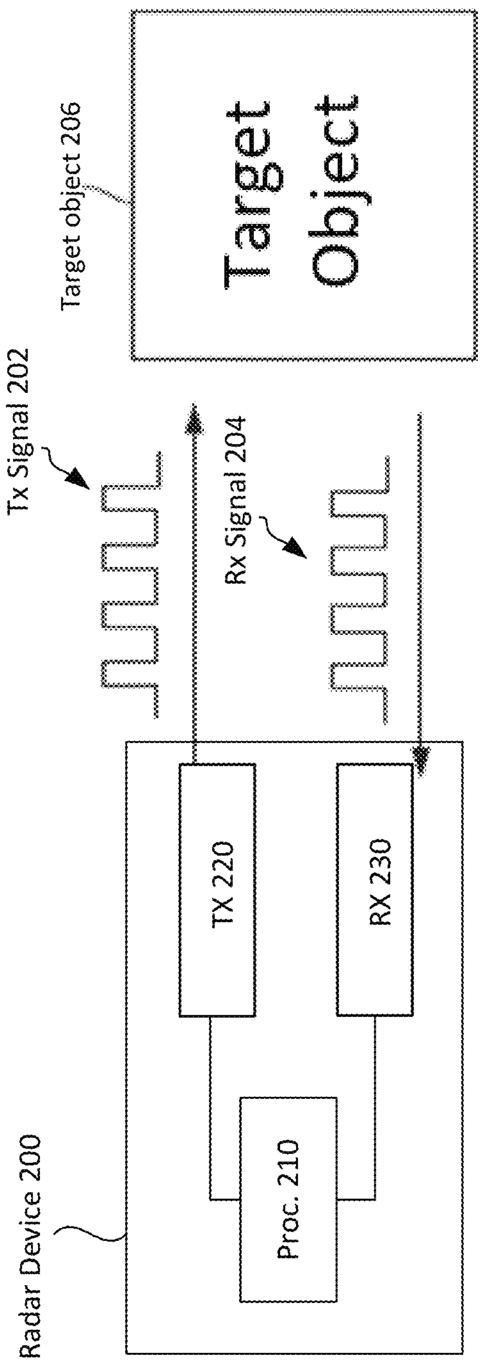
FIG. 2A illustrates an example radar device transmitting and receiving RF signals, in accordance with some embodiments of the technology described herein.

FIG. 2A illustrates an example radar device 200 transmitting an RF signal 202 and receiving an RF signal 204, in accordance with some embodiments of the technology described herein.

As shown in FIG. 2A, the radar device 200 has a transmitter (TX) 220 and a receiver (RX) 230. In some embodiments, TX 220 may include transmit circuitry (analog and/or digital) configured to generate RF transmit signals (e.g., pulses, as shown in FIG. 2A) for transmission via a transmit antenna array. In some embodiments, RX 230 may include receive circuitry (analog and/or digital) configured to receive RF signals via a receive antenna array, the RF receive signals generated at least in part by reflection of RF transmit signals from a target object 206.

Also shown in FIG. 2A, the radar device 200 includes processing circuitry 210. In some embodiments, processing circuitry 210 may include analog and/or digital circuitry and/or may be implemented, for example, using one or more field programmable gate arrays (FPGA), one or more application-specific integrated circuits (ASICs), one or more processors, and/or one or more microcontrollers. In some embodiments, processing circuitry 210 may be configured to control operation of radar device 200, such as to control timing of RF signal transmission and/or reception, and/or processing circuitry 210 may be configured to process data obtained by radar device 200, such as to generate range-cross range images using received RF signals. According to various embodiments, processing circuitry 210 may be packaged on the same printed circuit board hosting the transmit and/or receive circuitry of radar device 200, and/or processing circuitry 210 may be packaged separately therefrom.

Figure 2B:
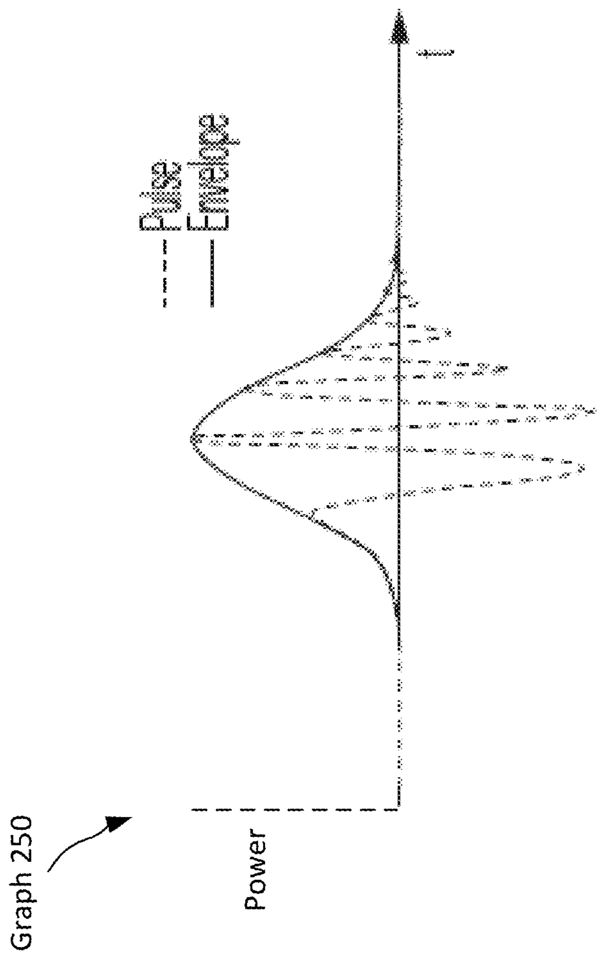
FIG. 2B illustrates an example of a pulse that may be transmitted by the radar device of FIG. 2A, in accordance with some embodiments of the technology described herein.

FIG. 2B illustrates, in a graph 250, an example of a pulse that may be transmitted by the radar device 200, in accordance with some embodiments of the technology described herein. In the example of FIG. 2B, the illustrated pulse is a chirp. For instance, the illustrated pulse may be modulated with a carrier signal having a time-varying frequency (e.g., increasing or decreasing linearly over time). It should be appreciated that other types of pulses may be transmitted depending on the embodiment. In some embodiments, a response pulse may be generated upon reflection of a transmitted pulse from target object 206. For example, each response pulse may carry information about the reflected power at each frequency in the frequency range of the pulse. For instance, frequency content of the response pulse may indicate a time of reception of the response pulse, which in turn may indicate a distance to the target object 206.

FIG. 3A illustrates an example vehicle 300 equipped with the radar device 200 and other components that are communicatively coupled to the radar device 200, in accordance with some embodiments of the technology described herein.

As shown in FIG. 3A, the vehicle 300 is further equipped with a velocity sensor 342, a weather sensor 344, a cruise control module 346, an internet module 348, a display 350, and a computer-assisted driving module 352. In some embodiments, processing circuitry 210 of radar device 200 may be coupled to some or all of the foregoing components.

In some embodiments, processing circuitry 210 may be coupled to display 350, which in some embodiments may be used to display range-cross range images generated by processing circuitry 210 using radar device 200. In some embodiments, processing circuitry 210 may be configured to obtain situational awareness data from velocity sensor 324, weather sensor 344, cruise control module 346 and/or internet module 348.

In some embodiments, processing circuitry 210 may be configured to provide data generated using radar device 200 as an input to computer-assisted driving module 352, such as to be used to inform and/or perform computer-assisted driving tasks. For instance, computer-assisted driving module 352 may be configured to perform computer vision tasks such as object detection, lane boundary detection, and/or traffic sign recognition. In some embodiments, a computer-assisted driving module 352 may be configured to execute a neural network (e.g., a convolutional neural network). For example, training data for the neural network may include annotated datasets, in which images or video frames are labeled (e.g., manually) with relevant objects or features to be classified. For instance, the neural network may be trained to recognize patterns and features from the labeled examples. According to various embodiments, a neural network may be trained with data representing several different environments (e.g., with vehicles moving at different velocities, with target objects moving at different velocities, with different weather conditions, with different types of roads, with different levels of traffic, with a cruise control that is activated or deactivated, etc.). In some embodiments, a computer-assisted driving module 352 may be alternatively or additionally configured to control the vehicle 300 to allow the vehicle 300 to drive itself, with (e.g., semi-autonomously) or without (e.g., fully autonomously) some degree of human intervention.

It should be noted that a vehicle may include any combination of components shown coupled to radar device 200. Some embodiments, for example, may omit velocity sensor 342, weather sensor 344, cruise control module 346, internet module 348, computer-assisted driving module 352 and/or display 350.

Figure 3B:
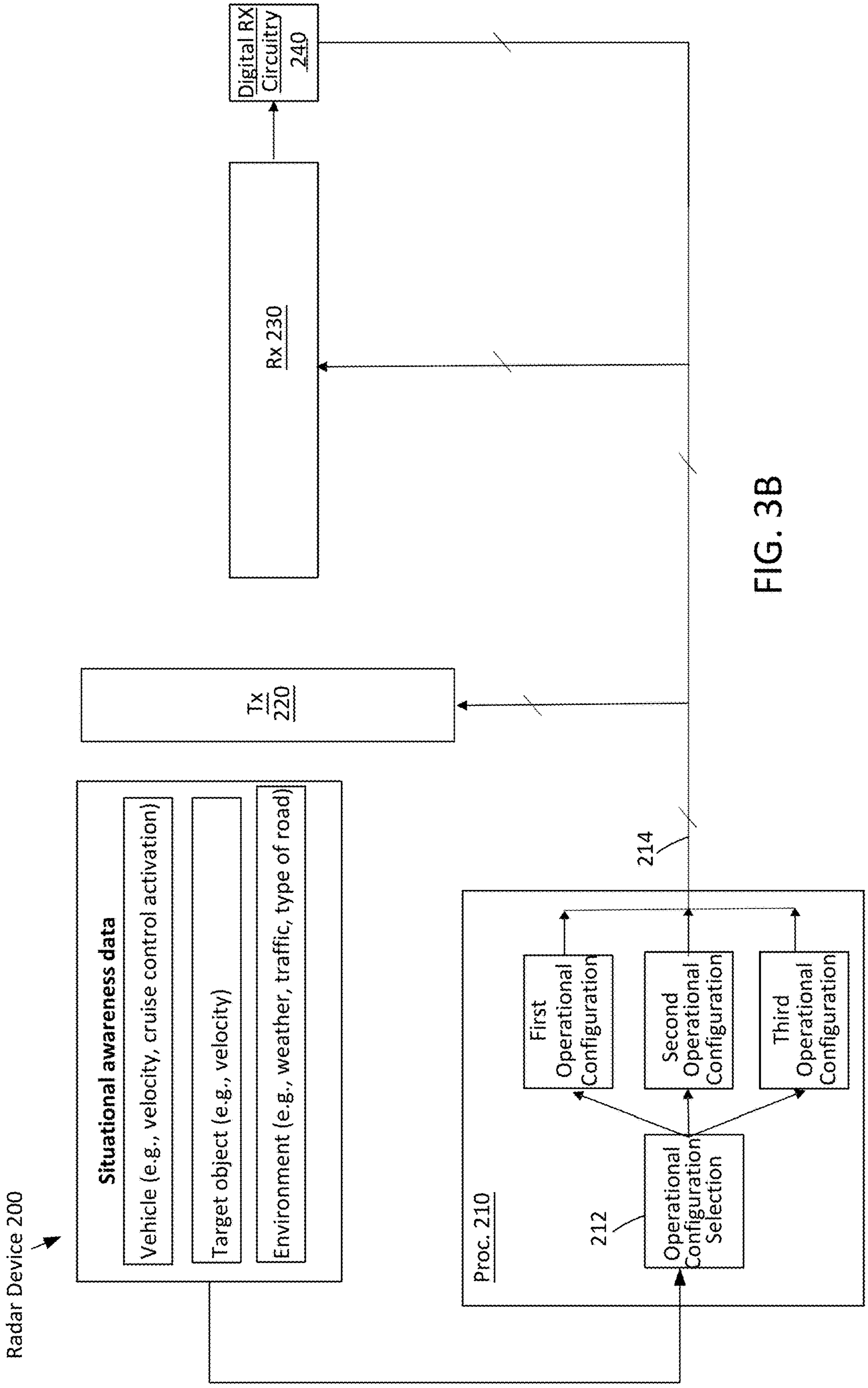
FIG. 3B illustrates an example radar device having processing circuitry configured to select among radar operational configurations, in accordance with some embodiments of the technology described herein.

FIG. 3B illustrates radar device 200 further showing components of processing circuitry 210 configured to select among radar operational configurations, in accordance with some embodiments of the technology described herein. Also further shown in FIG. 3B, radar device 200 includes digital RX circuitry 240, which may be configured to perform at least some processing of RF signals received via RX 230, such as conversion from analog to digital representation for further processing by processing circuitry 210.

According to various embodiments, processing circuitry 210 may be configured to use TX 220 and/or RX 230 according to a selected radar operational configuration. For example, a radar operational configuration may specify a transmitter configuration according to which to use TX 220 and/or a receiver configuration according to which to use RX 230.

As shown in FIG. 3B, processing circuitry 210 includes operational configuration selection circuitry 212, which may be configured to select at least one radar operational configuration based on situational awareness data. For instance in FIG. 3B, operational configuration selection circuitry 212 is shown configured to select from among first, second, and third radar operational configurations. In the illustrated embodiment, processing circuitry 210 is shown configured to output a control signal 214 to TX 220 and/or 230, which may cause TX 220 and/or RX 230 to operate according to the selected radar operational configuration.

As shown in FIG. 3B, situational awareness data may be indicative of at least one characteristic of the vehicle 300, at least one characteristic of a target object (e.g., 206), and/or at least one characteristic of an environment of the vehicle 300. According to various embodiments, the environment of the vehicle may include the environment presently surrounding the vehicle and/or the environment in which the vehicle is expected to be at some point in the future (e.g., based on a positional estimate obtained from an electronic navigation system).

In one example, the situational awareness data may include velocity data that is indicative of the velocity of the vehicle. For example, the velocity data may include information about the current velocity of the vehicle, the velocity of the vehicle at some time in the past, the projected velocity of the vehicle at some time in the future and/or the velocity of the vehicle averaged over an appropriate time interval, among other examples. According to various embodiments, radar device 200 may be configured to obtain velocity data from any suitable source, including for example from velocity sensor 342 (FIG. 3A), which may determine the velocity of vehicle 300 and may be implemented as a vehicle speed sensor (VSS), a transmission speed sensor, an accelerometer, a gyroscope and/or an electronic navigation system (e.g., GPS).

Alternatively or additionally, radar device 200 may be configured to determine the velocity of the vehicle, such as using Doppler radar processing techniques on one or more received RF signals. For example, radar device 200 may be configured to determine the velocity of the target object (e.g., 106) relative to the velocity of the vehicle 300, such as using Doppler radar processing techniques, for example by measuring the Doppler shift of a received RF signal reflected from the target object relative to the RF signal transmitted by radar device 200.

In the same or another example, the situational awareness data may include cruise control data indicative of the condition of a cruise control for the vehicle. For example, in cruise control mode, the vehicle may maintain a set velocity in a static fashion or in adaptive fashion (e.g., based on further maintaining a set distance from another vehicle). In some embodiments, cruise control data may indicate whether cruise control is activated or deactivated, including which particular types of control are activated and which ones are deactivated. Additionally, or alternatively, the cruise control data may indicate the velocity and/or distance to another vehicle set to maintained by the cruise control. Cruise control data may be obtained from cruise control module 346, which in turn may be configured to perform cruise control operations.

In the same or another example, situational awareness data may include lane departure data indicative of a condition of a lane departure warning and/or departure prevention mode of the vehicle. For example, in a lane departure warning mode, the vehicle may warn an operator if the vehicle has departed, is departing, and/or is expected to depart from the lane in which the vehicle is traveling. In a lane departure prevention mode, the vehicle may keep the vehicle within the boundaries of its lane of travel. In some embodiments, lane departure warning and/or prevention data may be provided from a lane departure warning and/or prevention module (not shown).

In the same or another example, the situational awareness data may include traffic data indicative of a level of traffic associated with the vehicle's environment. The traffic data may indicate a level of traffic in the present surroundings of the vehicle and/or in the area where the vehicle is expected to be at some point in the future (e.g., using an electronic navigation system). The traffic data may indicate, for example, whether traffic is heavy, moderate, or light. Radar device 200 may be configured to obtain traffic data from any suitable source, such as from internet module 348 (on the basis of data indicative of the vehicle's present and/or expected location). Internet module 348 may be a module configured to wirelessly connect to the internet, to download data from the internet and/or to upload data to the internet.

In the same or another example, the situational awareness data may include road data indicative of the type of road associated with the vehicle's environment. The road data may indicate the type of road in the present surroundings of the vehicle and/or in the area where the vehicle is expected to be at some point in the future (e.g., using an electronic navigation system). The road data may indicate, for example, whether the road is a highway, a street in an urban environment, a street in a rural environment, a street in a residential environment, a roundabout, a parking lot, a road junction, a service road, etc. Additionally, or alternatively, the road data may indicate how many road lanes are present. Radar device 200 may be configured to obtain road data from any suitable source, such as from internet module 348 (on the basis of data indicative of the vehicle's present and/or expected location) or maps stored within a memory coupled to processing circuitry 210 (not shown).

In the same or another example, the situational awareness data may include weather data indicative of at least one weather condition associated with the vehicle's environment. The weather data may indicate at least one weather condition in the present surroundings of the vehicle and/or in the area where the vehicle is expected to be at some point in the future (e.g., using an electronic navigation system). The weather data may provide information about the weather qualitatively (e.g., whether it is rainy, foggy, snowy, dry, etc.) and/or quantitatively (e.g., precipitation rate, temperature, humidity, pressure, etc.). Radar device 200 may be configured to obtain weather data from any suitable source, such as from internet module 348 (on the basis of data indicative of the vehicle's present and/or expected location) and/or from weather sensor 344 (which may include a humidity sensor, a temperature sensor and/or a pressure sensor).

Figure 4:
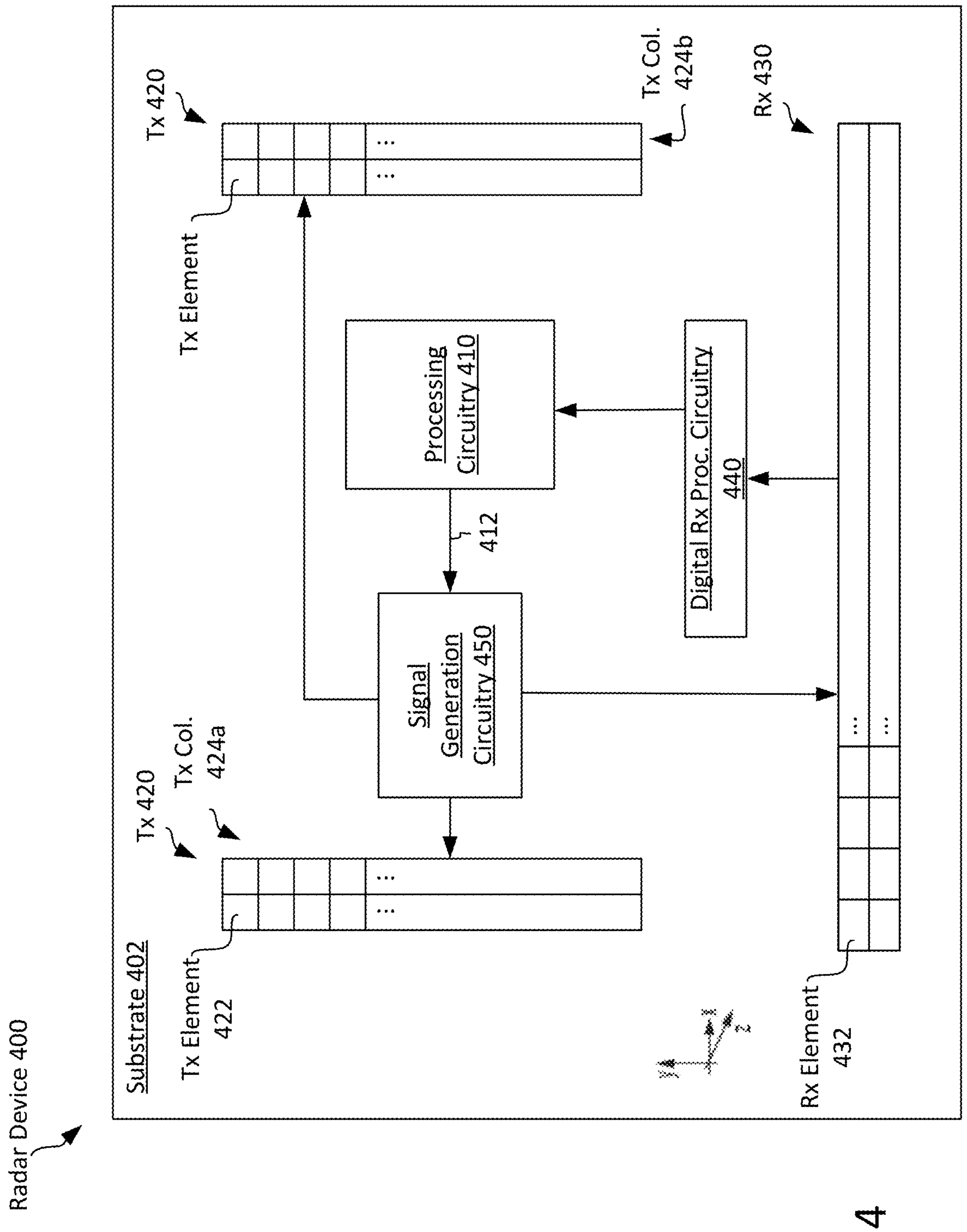
FIG. 4 illustrates an example radar device having a transmitter with a transmit antenna array and a receiver with a receive antenna array, in accordance with some embodiments of the technology described herein.

FIG. 4 illustrates an example radar device 400 having a TX 420 with a transmit antenna array and a RX 430 with a receive antenna array, in accordance with some embodiments of the technology described herein. As shown in FIG. 4, radar device 400 includes a substrate 402 having processing circuitry 410, signal generation circuitry 450, TX 420, RX 430, and digital RX processing circuitry 440 thereon.

In some embodiments, TX 420 and RX 430 may be disposed on substrate 402. For example, TX 420 and RX 430 may be mounted directly on substrate 402. In some embodiments, TX 420 and RX 430 may have components on one or more semiconductor dies that are mounted on substrate 304. For example, as shown in FIG. 4, TX 420 has a transmit antenna array including transmit antenna elements 422, which may be disposed on a plurality of transmit semiconductor dies mounted on substrate 402. Similarly, as shown in FIG. 4, RX 430 has a receive antenna array including receive antenna elements 432, which may be disposed on a plurality of receive semiconductor dies mounted on substrate 402. In some embodiments, semiconductor dies of TX 420 and/or RX 430 may be mounted directly on substrate 402, and/or may be mounted one or more interposers, with the interposer(s) mounted directly on substrate 402.

As shown in FIG. 4, TX 420 has a transmit antenna array including transmit antenna elements 422. Each transmit antenna element may be sized to emit signals having frequency content in the frequency band of 300 GHz-3 THz or any frequency band within the 300 GHz-3 THz band (e.g., 190-300 GHz, 300-320 GHz, 307-313 GHz, 390-450 GHz, 440-480 GHz, 455-495 GHz, or 820-880 GHz). For example, transmit antenna elements 422 may be sized to emit signals having frequency content in the frequency band of 300-320 GHz or 307-313 GHz. In some embodiments, transmit antenna elements described herein may have a frequency bandwidth (e.g., 3 dB bandwidth) of 1 GHz-4 GHz, 1.5 GHz, 3 GHz, 4 GHz-134 GHz, 4 GHz-100 GHz, 4 GHz-60 GHz, 10 GHz-100 GHz, 10 GHz-60 GHz, 10 GHz-30 GHz, 15 GHz-60 GHz, 10 GHz-30 GHz or 15 GHz-25 GHz. Similarly, RX 430 has receive antenna elements 432 that may be sized to receive signals having frequency content in a frequency band of 300 GHz-3 THz or any sub-band of this frequency band. For example, in some embodiments, receive antenna elements 432 may be sized to receive signals having frequency content in a frequency band of 300-320 GHz or 307-313 GHz. In some embodiments, receiver 330 has a frequency bandwidth of 10 GHz-60 GHz, 10 GHz-30 GHz, 15 GHz-60 GHz, 10 GHz-30 GHz or 15 GHz-25 GHz.

In some embodiments, TX 420 may be configured to transmit RF signals outside the plane defined by the top surface of substrate 402 (e.g., parallel to the z-axis or at any angle relative to the z-axis other than 90 deg.). For example, a transmit antenna array of TX 420 may be shaped to have a main lobe extending away from the plane defined by the top surface of substrate 402. Similarly, RX 430 may be configured to receive the transmitted signals upon reflection from a target object. For example, a receive antenna array of RX 430 may be shaped to have a main lobe extending away from the plane defined by the top surface of substrate 402.

In some embodiments, TX 420 may have multiple columns of transmit antenna elements extending in one direction and spaced from one another in an orthogonal direction. For example, as shown in FIG. 4, a first pair of columns of transmit antenna elements 422*a* extends along the y direction and a second pair of columns of transmit antenna elements 422*b* extend along the y direction and are spaced from the first pair of columns along the x direction.

In some embodiments, digital RX circuitry 440 may be configured to offload signals from RX 430 and provide the offloaded signals to processing circuitry 410. For example, digital RX circuitry 440 may include ADC circuitry coupled to RX 430. In some embodiments, ADC circuitry may be implemented using mixed-signal ASICs (e.g., having AFE components of RX 430 and ADC components of digital RX circuitry 440 coupled to processing circuitry 410). In some embodiments, digital RX circuitry 440 may be mounted on substrate 402, either directly, or on an interposer. Alternatively or additionally, at least some AFE and/or ADC circuitry may be located in a same integrated circuit package (e.g., on the same die(s)) as processing circuitry 410. For instance, processing circuitry 410 may include an FPGA and/or ASIC having ADC circuitry therein.

In some embodiments, processing circuitry 410 may include digital circuits and/or analog circuits configured to determine the relative and/or absolute state of a target object based on the reflected signals received from the RX 430 and/or to generate range-cross range images using the reflected signals. Processing circuitry 410 may be mounted on substrate 402, such as shown in FIG. 4 (e.g., on another die such as an FPGA, ASIC, and/or processor), and/or processing circuitry 410 may be integrated on a semiconductor die of RX 430, or, at least in part, on another substrate.

In some embodiments, processing circuitry 410 may be configured to control operation of radar device 400. For example, as shown in FIG. 4, processing circuitry 410 may be configured to provide a control signal 412 to signal generation circuitry 450 that controls signal generation circuitry 450 to generate a reference RF signal (e.g., having a selected waveform type) for transmission and/or reception using TX 420 and/or RX 430. In some embodiments, processing circuitry 410 may be alternatively or additionally configured to operate various components of radar device 200 (e.g., TX 420, RX 430, digital RX circuitry 440) according to a selected radar operational configuration.

The techniques described herein may be used in connection with any suitable frequency, including with millimeter waves, Terahertz frequencies and optical frequencies. Some embodiments relate to radar devices operating in the Terahertz band. The term "Terahertz" is used herein to refer to radio-frequency signals having frequency content in the 300 GHz-3 THz band.

Building reliable sensing capabilities for autonomous vehicles has been a major challenge for decades. Unfortunately, engineers have not identified a single type of sensor capable of effectively monitoring the surrounding environment in all conditions (e.g., rain, snow, fog, night, dense environments, etc.). As a result, the conventional approach is to equip vehicles with multiple types of sensors rather than relying on a single type of sensor. For example, a vehicle may be equipped with optical sensors (e.g., video cameras, infrared cameras), radio-frequency sensors (e.g., radar sensors), and LIDAR sensors. This approach is based on the idea that having a diverse set of sensors provides better coverage than what any sensor can provide individually, as each sensor has advantages and disadvantages.

Optical sensors, for example, allow vehicles to maintain a 360° view of the external environment. Significant progress has been made in recent years in camera-related technologies, with ever-increasing resolutions being available at lower prices than previously possible. With the aid of sophisticated post-processing techniques, often involving machine learning, optical sensors can detect and identify objects in the vicinity of a vehicle. The ability of an optical sensor to distinguish colors improves the camera's ability to distinguish dangerous situations from less risky circumstances. For example, a camera can easily identify other vehicles, pedestrians, cyclists, traffic signs and signals, guardrails, etc. Unfortunately, optical sensors are still far from being perfect. First, poor weather conditions (e.g., darkness, rain, snow, fog) significantly reduce image quality, which significantly degrades the optical sensor's ability to detect target objects in the roadway. Image quality is also degraded when there is low contrast among objects or when objects blend in with the background (e.g., during particularly sunny days). Second, cameras generate inherently two-dimensional data, with depth or distance information not being measured directly. Instead, depth or distance information can be obtained only after further signal processing is performed on the collected image and/or video data, which can be computationally demanding.

Conventional radar sensors used in autonomous vehicles operate in the millimeter wave band (i.e., 30 GHz-300 GHz), or at even lower frequencies. For example, one conventional radar sensor operates in the 76 GHz-81 GHz frequency band. Because of the (relatively long) wavelengths implied by operating in this frequency range, conventional radar sensors have limited spatial (e.g., range and angular) resolution. Indeed, conventional radar sensors used in the automotive context have range resolutions on the order of 10 to 10's of centimeters and horizontal angular resolutions of about 3° to 20°. As a result, while conventional radar sensors can identify the presence of some target object, they cannot reliably identify the nature or shape of the target object. For example, such a conventional radar sensor may be unable to distinguish a pedestrian from a vehicle or a road signal. An angular resolution of about 1° or less (in some applications as low as 0.1°) is necessary to distinguish the types of target objects typically encountered on roads.

LIDAR (light detection and ranging) sensors operate similarly to radar sensors, but at optical frequencies (e.g., in the infrared or visible portions of the electromagnetic spectrum) rather than radio frequencies. The location of an object is determined by transmitting a laser beam and by measuring the time taken for the reflected beam to hit the receiver. Because light is characterized by wavelengths that are substantially shorter than the wavelengths at which conventional automotive radar sensors operate, LIDAR sensors have finer spatial resolutions.

However, LIDAR sensors also have a number of drawbacks. First, they are significantly more susceptible to rain than radar sensors. This is because the size of rain droplets is comparable to the wavelength at which LIDAR sensors operate. In heavy rain, light emitted from the transmitter is scattered by rain droplets, which leads to unwanted echoes. Second, LIDAR sensors are susceptible to sunlight, which can lead to detector saturation that, in turn, reduces a LIDAR sensor's ability to detect objects. Thus, LIDAR sensors work better at night. Third, use of moving parts such as microelectromechanical systems (MEMS) and rotating mirrors make LIDAR sensors particularly expensive.

The inventors have recognized that the conventional approach of using a combination of different types of sensors (e.g., cameras, millimeter wave radar sensors, LIDAR sensors) offers limited performance at a very high cost. Combining millimeter-wave radar data with LIDAR data is computationally demanding (and as a result, costly), especially because such computations must be performed in real time. Typically, millimeter-wave radar data and LIDAR data are combined using sensor fusion algorithms (e.g., iterative state space algorithms such as Kalman filters, extended Kalman filters, particle filters, etc.) that can leverage the benefits of each these technologies to produce meaningful information about the dynamic properties of a target object, such as velocity, angle, and location. Unfortunately, the computational complexity necessary to run fusion algorithms can be prohibitively high, primarily due to their non-linear and iterative nature. As a result, vehicles must be equipped not only with multiple types of sensors, which is expensive in its own right, but also with powerful computers to fuse their measurements, which increases cost further so as to become impractical. Alternatively, using only some of these conventional sensors and/or a less computationally demanding fusion algorithm, results in coverage gaps (e.g., in conditions when the deployed sensors are insufficient or when the computational complexity of fusion algorithms is so high that the refresh rate for updates is too low).

Accordingly, the inventors have developed a new sensing technology for automotive and other autonomous vehicle applications that addresses the above-described shortcomings of conventional sensors and sensor fusion techniques. In particular, the inventors have developed novel radar sensors operating in the Terahertz band, which allows the sensors to combine some of the advantages of radar and LIDAR sensors (because THz radiation behaves in part similarly to millimeter wave RF signals and in part similarly to infrared light) while avoiding the need to employ computationally expensive fusion algorithms. The sensing technology developed by the inventors can be deployed on vehicles (e.g., cars, whether or not fully autonomous) to aid with safety and operation and, in some embodiments, may replace conventional radar and the LIDAR sensors altogether. It should be noted, however, that, in some embodiments, the sensing technology developed by the inventors may be used in conjunction with one or more conventional sensors (e.g., cameras, radar, LIDAR, etc.), as aspects of the technology described herein are not limited in this respect.

Moreover, the sensing technology developed by the inventors improves upon conventional radar and LIDAR sensors. For example, because the sensing technology developed by the inventors operates in the Terahertz band, it achieves a spatial resolution that is significantly better than what is possible with conventional radar sensors. For example, the sensing technology developed by the inventors achieves range resolutions in the order of 7 mm to 10 cm, and angular resolutions in the order of 0.05° to 1°. This means that these systems can distinguish objects separated along the propagation axis by distances as short as 8 mm, for example, or angularly separated by 0.1°, for example. As discussed above, conventional radar sensors can only achieve range resolutions in the order of several centimeters and angular resolutions of about 3° to 20°, which is insufficient for automotive and other applications.

As another example, the sensing technology developed by the inventors is less susceptible than LIDAR sensors to scattering due to rain because Terahertz signals have longer wavelengths relative to infrared signals. Although Terahertz signals are generally more susceptible than millimeter waves to rain, Terahertz signals are less sensitive to variations in rain rate. As yet another example, Terahertz-based active sensing systems are less susceptible than LIDAR sensors to sunlight. The vast majority of the solar energy is concentrated in the visible and infrared regions, from about 300 nm to about 2000 nm. This is why LIDAR sensors that operate in this region are particularly susceptible to sunlight. By contrast, Terahertz signals, having wavelengths between 100 μm and 1 mm, are virtually immune to sunlight.

The Terahertz-based active sensing systems described herein may be used in autonomous vehicles as well as in other contexts.

Applications across a variety of industries have been forced to rely on traditional sensors (cameras, LIDAR, and conventional radar) despite increasing requirements for advanced autonomy, safety and capability. While functional, these traditional sensors have several problems, as discussed above. To enable the next generation of products, new capability is needed to correctly perceive the surrounding environment. The technology described herein unlocks a variety of new applications including new types of medical imaging (e.g., cancer detection and non-ionizing dental imaging prior to treatment). Security applications can also be enhanced by the new types of perception, detecting objections like guns or knives, while preserving privacy of the individual. The technology described herein extends to providing robust perception of autonomous platforms, including vehicles such as cars, trucks, aircraft, ships and spacecraft, regardless of the weather, temperature, dust, or lighting. This robustness unlocks true autonomy in a comprehensive, safe manner in a variety of environments.

Some embodiments apply the waveform type selection techniques described herein to radar devices operating in the millimeter waves, as not all embodiments are limited to use with Terahertz frequencies. In such embodiments, radio-frequency signals may have frequency content in the 100 GHz-300 GHz band. For example, the center frequency may be between 100 GHz and 140 GHz (e.g., approximately 120 GHz), between 180 GHz and 220 GHz (e.g., approximately 200 GHz), or between 230 GHz and 270 GHz (e.g., approximately 250 GHz).

II. Selection of Waveform Types

As mentioned above, the inventors have developed techniques for adapting an operational configuration of a radar device based on situational awareness indicative of at least one characteristic of a vehicle. For example, situational awareness data indicative of a characteristic of a vehicle, a target object, and/or an environment of the vehicle may be used to select a radar operational configuration that is appropriate for the situation. The inventors have recognized that waveform types (e.g., for transmission via a TX) may be selected based on situational awareness data to balance radar precision with constraints on available power and/or computational resources. For instance, a waveform may have a frequency bandwidth (e.g., over the course of a pulse duration), that may define range resolution over the longitudinal range of transmission. The inventors have recognized that a fine range resolution may be balanced with computational load stemming from large amounts of receive data corresponding to distance over the longitudinal range (e.g., at frequencies within the bandwidth of a transmitted waveform).

In some embodiments, capturing images (e.g., range-cross range images) with fine range resolutions can increase the ability of a computer-assisted driving module to take prompt action in dangerous circumstances. A fine range resolution provides a higher capability to distinguish objects from one another in the traveling direction. A coarse range resolution, on the other hand, provides a lower capability to distinguish objects. For example, a range resolution of 8 mm allows the system to distinguish two objects so long as the objects are at least 8 mm apart relative to the traveling direction. Thus, finer range resolutions are beneficial in that they provide more accuracy. Furthermore, finer range resolutions can improve accuracy in Doppler shift measurements.

However, the inventors have recognized and appreciated a drawback resulting from the use of fine range resolutions in radar systems. As the range resolution is increased, larger and larger amounts of data are produced. The data need to be stored somewhere, thus increasing the requirements for memory, and need to be processed, thus increasing the requirements for computational power. However, increasing the memory or the computational power available to a radar device may be impractical, given that the space requirements for radar devices in autonomous vehicle applications are particular stringent.

For purposes of illustration, a radar device configured to generate frames with a spatial resolution of 3 cm in a range of 0 to 200 m at a sampling rate of 20 MSa/s per analog-to-digital converter (ADC) produces, assuming a 12-bit resolution and 416 ADCs, about 100 GB/s of data. Storing and processing this amount of data using hardware integrated on a vehicle is impractical.

Recognizing the need to reduce the amount of data to be stored and processed, the inventors have developed techniques that provide finer range resolutions where doing so is likely to meaningfully improve the ability of a computer-assisted driving module to avoid dangerous situations. On the other hand, coarser range resolutions are provided where dangerous situations are less likely. Situational awareness data, examples of which are described herein, are used to identify potentially dangerous situations that warrant finer range resolutions.

In one example, range resolution is varied depending on velocity data indicative of the velocity of the vehicle. The velocity of a vehicle can be used as a potential indicator to identify the likelihood of sudden events warranting immediate action by the vehicle. The lower the velocity, the higher the likelihood that other vehicles are relatively close to the vehicle. For example, a vehicle traveling at a velocity of less than 30 mph is typical in circumstances in which the vehicle is accelerating upon stopping at a red light, where vehicles tend to closely cluster to one another. Reaction times on the order of a few seconds are often necessary to avoid collisions if unexpected events occur. For example, a pedestrian unexpectedly crossing a street immediately after the light has turned green (for the vehicles) may cause a vehicle to stop abruptly, leading to a potentially dangerous situation. Given the relatively short reaction times necessary to avoid collisions, these circumstances warrant greater range resolutions. On the other hand, velocities beyond 70 mph are more typical in highways, where vehicles tend to be farther away from each other. Unexpected events in these circumstances tend to be more forgiving in terms of reaction times. For example, in a highway setting, several seconds may be sufficient to adjust the course of a vehicle when another vehicle unexpectedly moves from one lane to another. Given the longer reaction times necessary to avoid collisions, the range resolution can be relaxed in these circumstances. As a result, the amount of data being collected is decreased.

In another example, range resolution may be adjusted depending upon weather data. Rainy and foggy conditions tend to be more dangerous than drier conditions, often requiring reaction times in the order of 3 seconds or less in order to avoid a collision. The higher the precipitation rate, the higher the danger. Thus, in some embodiments, range resolution may be varied depending upon a weather condition in the surroundings of a vehicle. Other examples of situational awareness data include data indicative of the velocity of target objects, data indicative of the type of road in which the vehicle is traveling, data indicative of the level of traffic, etc.

In some embodiments, range resolution may be varied by varying the frequency bandwidth of the radio-frequency (RF) signals transmitted by a radar device. The larger the bandwidth, the finer the range resolution. A set of waveform types may be defined in some embodiments, where each waveform type has a different frequency bandwidth. Depending upon the situational awareness data, one or more waveform types may be selected for transmission by the radar device. Selection of a particular waveform type leads the radar device to transmit RF signals with a bandwidth corresponding to the selected waveform type.

Accordingly, some embodiments relate to a method of using a radar device to collect data about a target object. The radar device is configured to transmit a plurality of waveform types having corresponding frequency bandwidths. The method involves obtaining situational awareness data for the vehicle, the situational awareness data being indicative of at least one characteristic of the vehicle (e.g., velocity or cruise control activation), at least one characteristic of the target object (velocity), and/or at least one characteristic of the vehicle's environment (e.g., weather, traffic, type of road). The method further involves selecting, using the situational awareness data for the vehicle and from among the plurality of waveform types having corresponding frequency bandwidths, at least one waveform type to use for collecting data about the target object. Having different frequency bandwidths, the waveform types produce different range resolutions. The method further involves transmitting, using the radar device, one or more RF transmit signals having at least one frequency bandwidth corresponding to the selected at least one waveform type. In some embodiments, the transmitted RF signals are chirped (pulses with time-varying frequencies). The method further involves receiving, using the radar device, one or more RF receive signals generated at least in part by reflection of the one or more RF transmit signals from the target object. In some embodiments, the received information may be used to produce images (e.g., range-cross range images) and/or may be provided as input to a computer-assisted driving module.

Figure 5A:
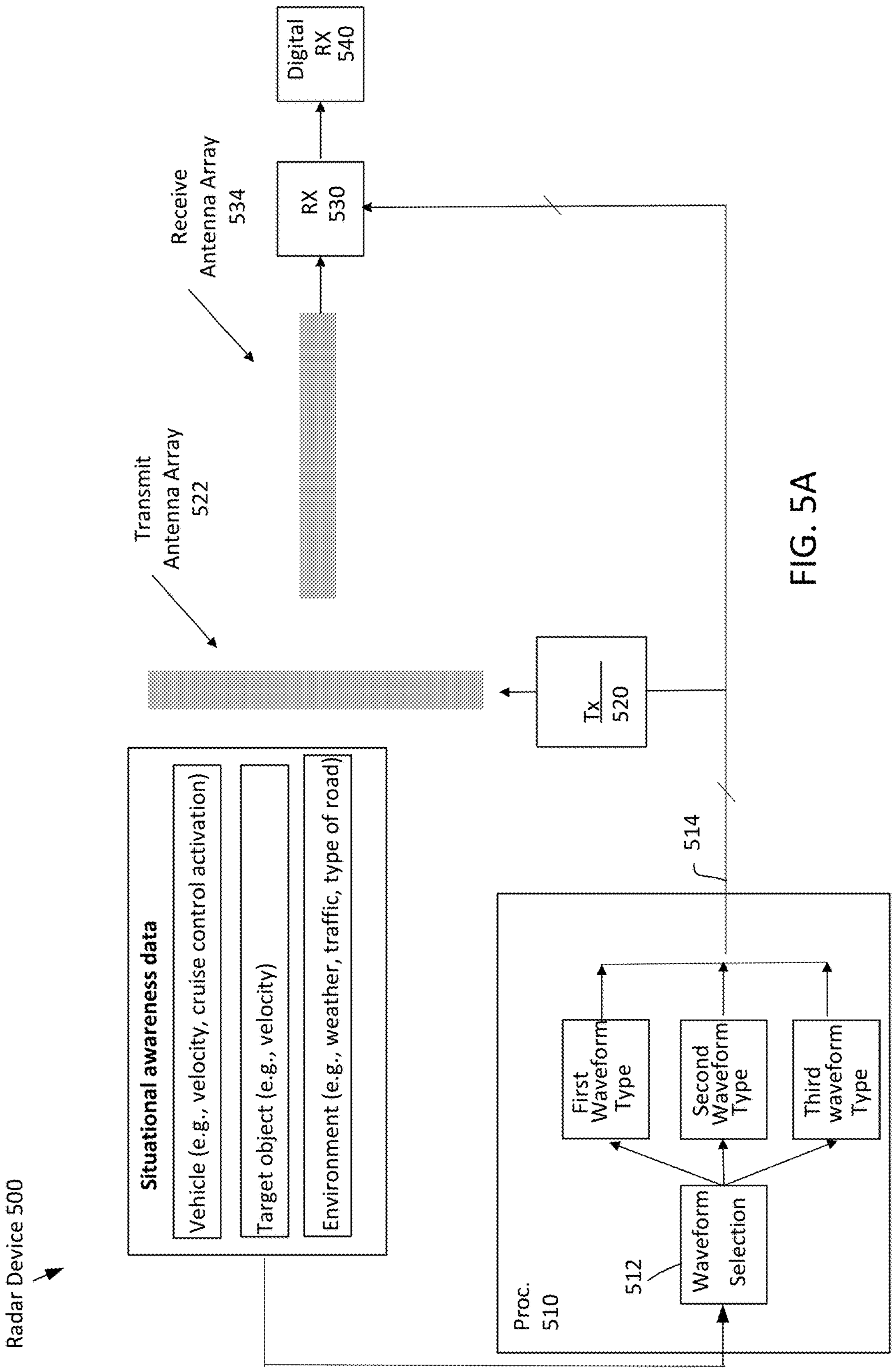
FIG. 5A illustrates an example radar device having processing circuitry configured to select among waveform types for transmitting via a transmit antenna array, in accordance with some embodiments of the technology described herein.

FIG. 5A illustrates an example radar device 500 having processing circuitry 510 configured to select among waveform types for transmitting via a transmit antenna array, in accordance with some embodiments of the technology described herein. In some embodiments, radar device 500 may be configured in the manner described herein for radar device 200. For example, in the illustrated embodiment, radar device 500 further includes TX 520 shown including a transmit antenna array 522, RX 530 shown including a receive antenna array 532, and digital RX circuitry 540 shown coupled to RX 530.

As shown in FIG. 5A, processing circuitry 510 includes waveform selection circuitry 512, which may be configured to select one or more waveform types for transmission via transmit antenna array 522 based on situational awareness data, such as described herein for processing circuitry 210. For example, the situational awareness data may be indicative of at least one characteristic of the vehicle (e.g., 300), at least one characteristic of the target object (e.g., 206), and/or at least one characteristic of the vehicle's environment.

In some embodiments, waveform selection circuitry 512 may be configured to select one or more waveform types for transmission by transmit antenna array 522, and to send a control signal 514 to control transmission using the selected waveform type(s). For example, control signal 514 may be sent to signal generation circuitry (e.g., 450) for generating the selected waveform type(s) to be provided to the transmit antenna array 522 for transmission. For instance, the control signal 514 and/or signal generated by the signal generation circuitry may be further provided to RX 530, such as for use in demodulating a received RF signal generated, at least in part, based on reflection of a transmitted RF signal having the selected waveform type(s) from a target object. In some embodiments, selection may be based on the situational awareness data obtained by processing circuitry 710. In the illustrated embodiment, waveform selection circuitry 512 is shown configured to select from among first, second, and third waveform types, although any other suitable numbers of selectable waveform types are possible.

In some embodiments, selection of a particular waveform type (e.g., over another waveform type) may determine the range resolution of radar device 500 (e.g., the spatial resolution with respect to the z-axis of FIG. 1). For example, a fine range resolution may provide a higher capability to distinguish objects from one another in the longitudinal direction whereas a coarse range resolution may provide a lower capability to distinguish objects from one another in the longitudinal direction. For instance, a range resolution of 8 mm may allow radar device 200 to distinguish two objects so long as the objects are at least 8 mm apart in the longitudinal direction. In some embodiments, finer range resolutions may be used to improve the ability of a computer-assisted driving module (e.g., 352) to make safe decisions, but one tradeoff is that greater amounts of data may be produced at finer range resolution, increasing the computational resources used for processing the data.

Figure 5B:
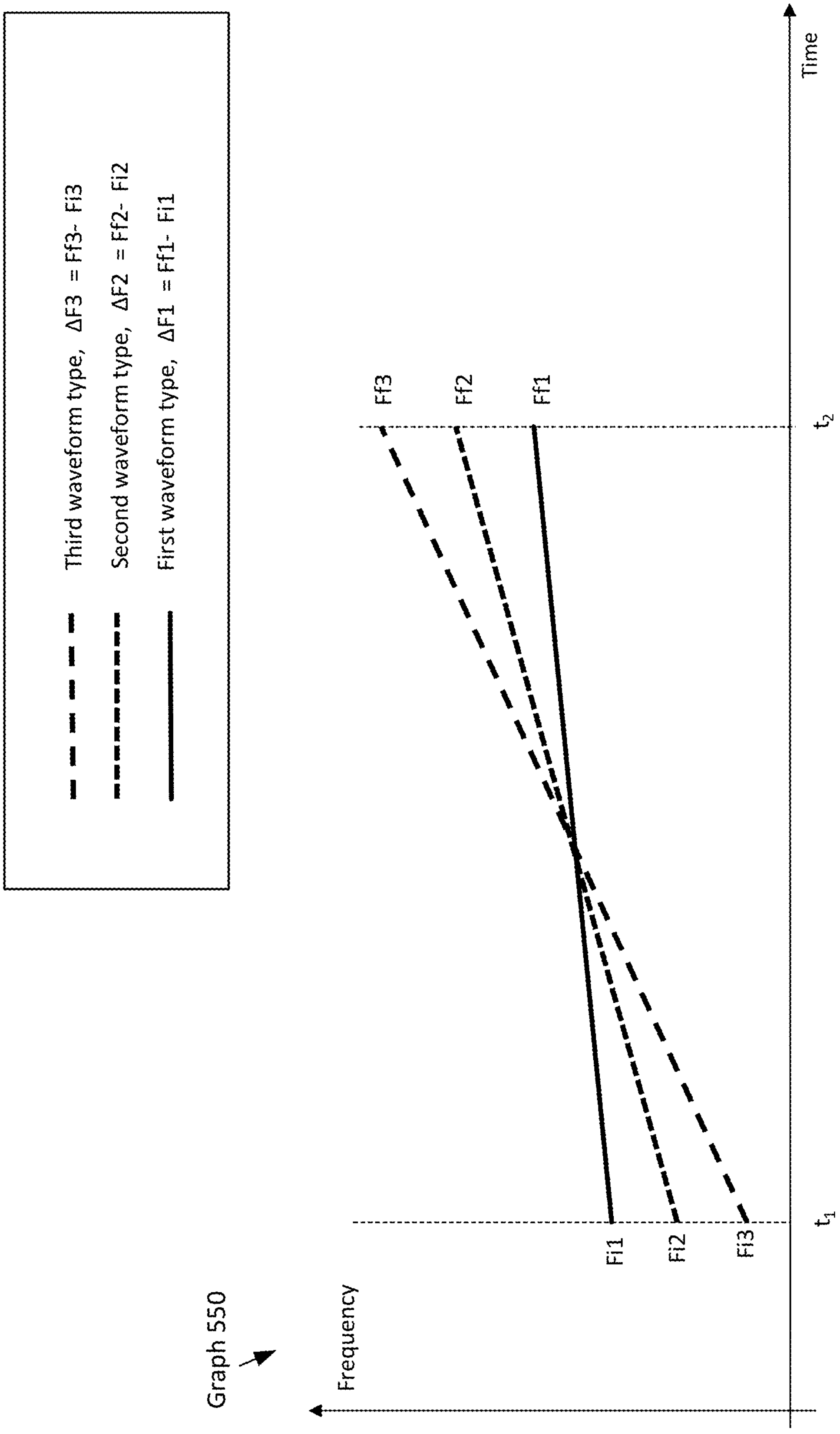
FIG. 5B illustrates frequency over time for waveform types that may be selected for transmission using the radar device of FIG. 5A, in accordance with some embodiments of the technology described herein.

FIG. 5B illustrates frequency over time for waveform types that may be selected for transmission using radar device 500, in accordance with some embodiments of the technology described herein.

In some embodiments, range resolution may be varied by varying the frequency bandwidth of the signal(s) transmitted by TX 520. For example, the higher the bandwidth, the finer the range resolution may be.

In FIG. 5B, three example waveform types having different frequency bandwidths are shown in a frequency vs. time graph 550, illustrating how the frequency of a waveform may vary over time. The three example waveform types shown in FIG. 5B are linear chirps, and the frequency of the waveform varies linearly with time. The three illustrated waveform types have the same duration ($t_2-t_1$), but each has a different frequency bandwidth. In the illustrated example waveform types, both the initial frequency (the frequency at the beginning of the transmission of the chirp) and the final frequency (the frequency at the end of the transmission of the chirp) varies among the waveform types. In other embodiments, waveform types may vary in the initial frequency and not in the final frequency or vice versa.

In FIG. 5B, the first example waveform type has an initial frequency of Fi1 and a final frequency of Ff1. Therefore, the frequency bandwidth of the first waveform type is given by ΔF1=Ff1−Fi1. The second example waveform type has an initial frequency of Fi2 and a final frequency of Ff2. Therefore, the frequency bandwidth of the second waveform type is given by ΔF2=Ff2−Fi2. The third example waveform type has an initial frequency of Fi3 and a final frequency of Ff3. Therefore, the frequency bandwidth of the third waveform type is given by ΔF3=Ff3−Fi3. Because ΔF1 is less than ΔF2, which in turn is less than ΔF3, the range resolution of the third waveform type is finer than the range resolution of the second waveform type, which in turn is finer than the range resolution of the first waveform type.

According to various embodiments, the duration ($t_2-t_1$) may be between 5 μs and 100 ms, 10 μs and 20 ms, between 10 μs and 10 ms, between 10 μs and 1 ms, between 10 μs and 0.5 ms, between 10 μs and 0.1 ms, between 10 μs and 50 μs, between 50 μs and 20 ms, between 50 μs and 10 ms, between 50 μs and 2 ms, between 50 μs and 1 ms, between 50 μs and 0.5 ms, between 50 μs and 0.1 ms, between 0.1 ms and 20 ms, between 0.1 ms and 15 ms, between 0.1 ms and 10 ms, between 0.1 ms and 5 ms, between 0.1 ms and 3 ms, between 0.1 ms and 2 ms, between 0.1 ms and 1 ms, between 1 ms and 20 ms, between 1 ms and 15 ms, between 1 ms and 10 ms, between 1 ms and 5 ms, between 1 ms and 3 ms, or between 1 ms and 2 ms. Other durations are also possible.

Referring back to FIG. 5A, TX 520 may be configured to transmit, using transmit antenna array 522, one or more signals having frequency bandwidth(s) corresponding to the selected waveform type(s). For example, if the first waveform type of FIG. 5B is selected, TX 520 may be configured to transmit one or more chirps with bandwidth ΔF1. In some embodiments, RX 530 may be configured to receive any RF signals reflected from a target object using receive antenna array 532. In some embodiments, RX 530 may include circuitry configured to demodulate (e.g., frequency-shift) a received RF signal to an intermediate frequency and/or to baseband. In some embodiments, digital RX circuitry 540 may be configured to digitize the demodulated signal. In some embodiments, RX 530 may be configured to use a reference signal (e.g., from signal generation circuitry) provided to TX 520 for demodulation (e.g., frequency-shifting). For example, RX 530 may be configured to produce demodulated received RF signals indicating location information about the target object to processing circuitry 510 (e.g., for image generation).

In some embodiments, methods for adjusting the range resolution of radar device 500 may involve varying the bandwidth of the transmitted signals. In some embodiments, the range resolution may be adjusted by varying a parameter of digital RX circuitry 540 (in alternative to, or in addition to, varying the bandwidth of the transmitted signals). For example, some embodiments may involve varying the sampling rate with which digital RX circuitry 540 digitizes signals received via RX antenna array 534 generated at least in part by reflection from target objects, and/or varying the bandwidth of the pass band in the receiver filter. Similar to the examples described above, the sampling rate and/or the filter's bandwidth may be varied on the basis of situational awareness data. In one example, the bandwidth of the pass band in the receiver filter may be varied from 1 GHz to 20 GHz depending upon the situational awareness data. In another example, the sampling rate may be varied from 2 MS/s to 40 MS/s depending upon the situational awareness data (where "MS/s" represents millions of samples per second).

In some embodiments, digital RX circuitry 540 may be configured to process RF signals received by RX 530. For example, processed data output by digital RX circuitry 540 may be used by processing circuitry 210 to generate images, such as for outputting to display 350, and/or to be provided as an input to computer-assisted driving module 352. In some embodiments, images generated by processing circuitry 210 may include for example range-cross range images or range-Doppler images. According to various embodiments, processing circuitry 210 may be configured to output images at any suitable frame rate, including for example between 10 frames per second and 30 frames per second or between 15 frames per second and 25 frames per second. Additionally or alternatively, digital RX circuitry 540 may be configured to process RF signals received by RX 530 to provide information about the location of the target object as input to a computer-assisted module 352.

Figure 5C:
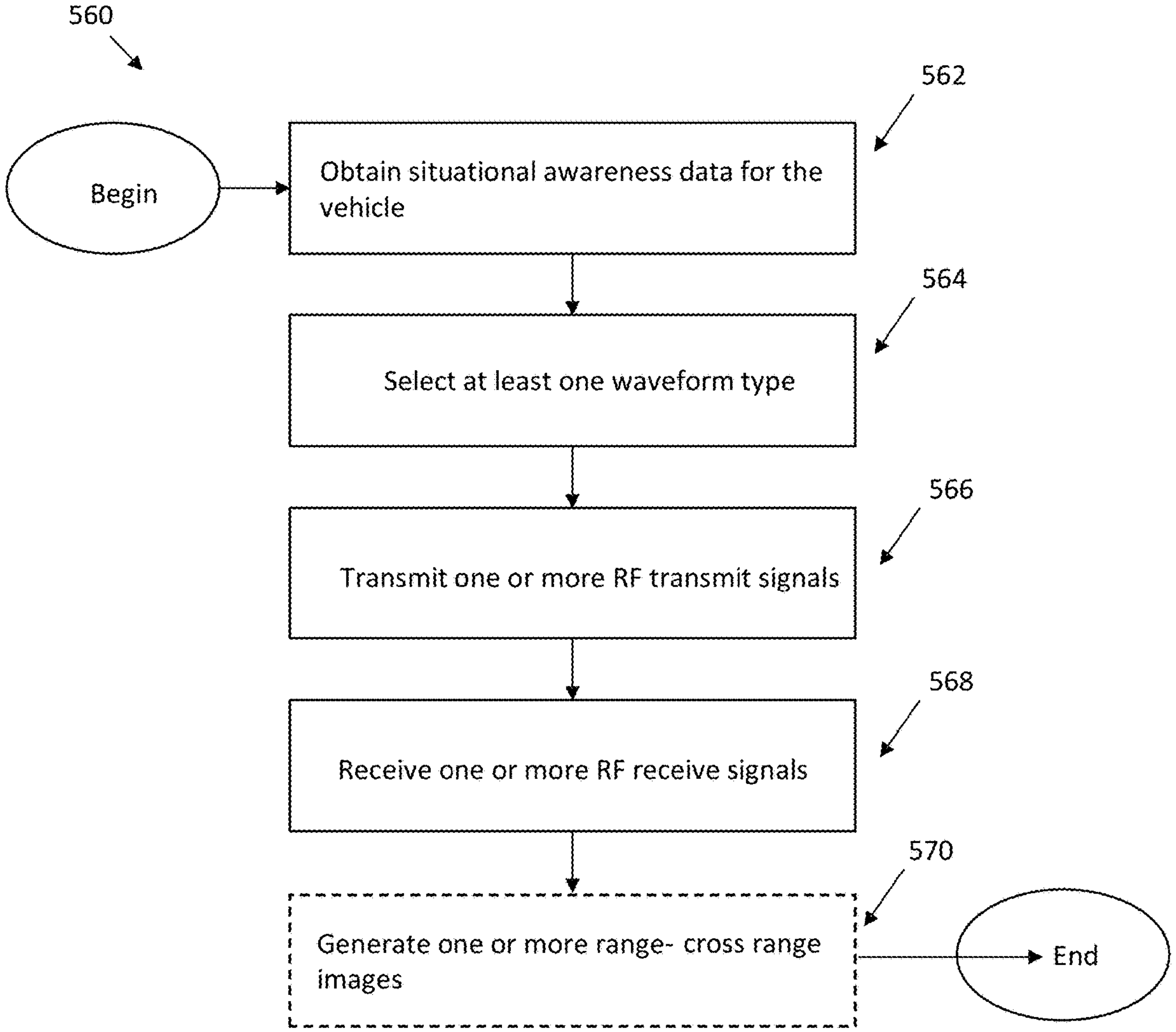
FIG. 5C illustrates an example method of using a radar device to collect data about a target object, in accordance with some embodiments of the technology described herein.

FIG. 5C illustrates an example method 560 of using a radar device (e.g., 500) to collect data about a target object, in accordance with some embodiments of the technology described herein.

In some embodiments, method 560 may be performed using processing circuitry 510 of radar device 500. As shown in FIG. 5C, method 560 begins at step 562, in which the processing circuitry obtains situational awareness data for a vehicle (e.g., 300). For example, the situational awareness data may be indicative of at least one characteristic of the vehicle, at least one characteristic of a target object, and/or at least one characteristic of an environment of the vehicle. According to various embodiments, the processing circuitry may obtain the data from any suitable source, depending on the nature of the data. For example, the processing circuitry may obtain velocity data from a velocity sensor onboard the vehicle. In another example, the processing circuitry may obtain traffic data and/or road data from an internet module onboard the vehicle. In another example, the processing circuitry may obtain weather from the internet module and/or from a weather sensor onboard the vehicle. In another example, the processing circuitry may obtain cruise control data from a cruise control module onboard the vehicle.

At step 564, the processing circuitry selects at least one waveform type to use for collecting data about the target object. The selection is performed using situational awareness data obtained at step 562. The at least one waveform type may be selected from among a set of selectable waveform types, each waveform type having a different frequency bandwidth. In one example, the processing circuitry may select (e.g., using waveform selection circuitry 512) a single waveform type to use for collecting data about the target object. In this example, all image frames may be produced with range resolutions corresponding to the selected waveform type. In another example, the processing circuitry may select more than one waveform type to use for collecting information about the target object, for example a first waveform type and a second waveform type. For instance, the selected waveform types may have different bandwidths. In this example, images generated during some frames may have range resolutions corresponding to the first selected waveform type and images generated during some frames may have range resolutions corresponding to the second selected waveform type. Thus, images may be formed by mixing frames produced with different range resolutions.

At step 566, the processing circuitry controls a TX (e.g., 520) to transmit one or more RF transmit signals having a frequency bandwidth corresponding to the selected at least one waveform type. For example, if a single waveform type is selected at step 564, step 566 may include transmitting signals having bandwidths corresponding to the selected waveform type. If more than one waveform type is selected at step 564 (e.g., a first type and a second type), step 566 may include transmitting signals having bandwidths corresponding to various selected waveform types. For example, transmission may be performed in an alternating fashion. For instance, signals corresponding to the first selected waveform type may be transmitted, and then, signals corresponding to the second selected waveform type may be transmitted, and then, additional signals corresponding to the first selected waveform type may be transmitted again, followed by additional signals corresponding to the second selected waveform type. This or other combinations of different waveform types transmitted over time may facilitate the processing circuitry generating images in respective frames having different range resolutions.

At step 568, the processing circuitry controls a RX (e.g., 530) to receive one or more RF receive signals generated at least in part by reflection of the one or more RF transmit signals (transmitted at step 566) from the target object. For example, the processing circuitry may control the RX to demodulate (e.g., frequency-downshift) and may control digital RX circuitry (e.g., 540) to digitize the received RF signals. In addition to the reflection of the one or more RF transmit signals, the one or more RF receive signals may further include noise, spurious signals, signals obtained as a result of multi-path effects.

Optionally, at step 570, the processing circuitry generates one or more range-cross range images using the RF signals received using the RX. For example, the images may be defined by a frame rate suitable for inspection by a human or for use by the computer-assisted driving module. The frame rate may be, for example, between 10 frames per second and 30 frames per second or between 15 frames per second and 25 frames per second. Depending on how many waveform types are selected at step 564, frames may have the same range resolution and/or may have different range resolutions.

Figure 5D:
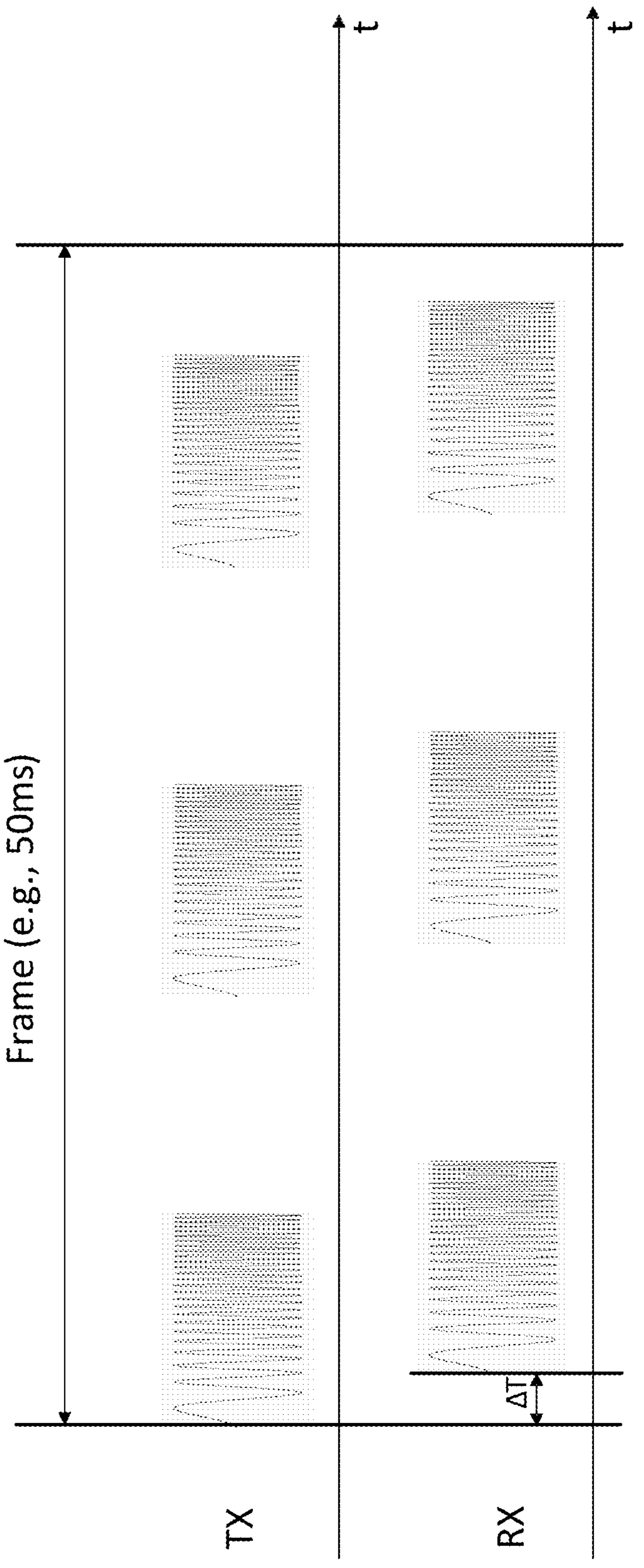
FIG. 5D illustrates transmission and reception of multiple RF signals during a frame according to a frame rate, in accordance with some embodiments of the technology described herein.

FIG. 5D illustrates transmission and reception of multiple RF signals during a frame, in accordance with some embodiments of the technology described herein.

In some embodiments, coherent processing techniques may be used to improve the signal-to-noise ratio (SNR) of a radar device (e.g., 200). In some embodiments, coherent processing may involve accumulating multiple radar signals coherently to increase the effective power and improve the detection of weak signals. In the example of FIG. 5D, a radar device may transmit multiple signals of the same type (a selected waveform type) during a frame (50 ms in this example, corresponding to a frame rate of 20 frames per second). The transmitted signals are shown on the top portion of FIG. 5D. As a result, the radar device may receive multiple signals, each signal resulting from the reflection of a transmitted signal from a target object. The received signals are delayed by an amount ΔT that may depend on the distance between the radar device and the target object. The received signals are shown on the lower portion of FIG. 5D. In some embodiments, the received signals may be combined together coherently, thereby improving the SNR of the radar device.

FIGS. 6A-6D are diagrams showing a few examples of how waveform types may be selected depending upon the situational awareness data obtained by a radar device.

Figure 6A:
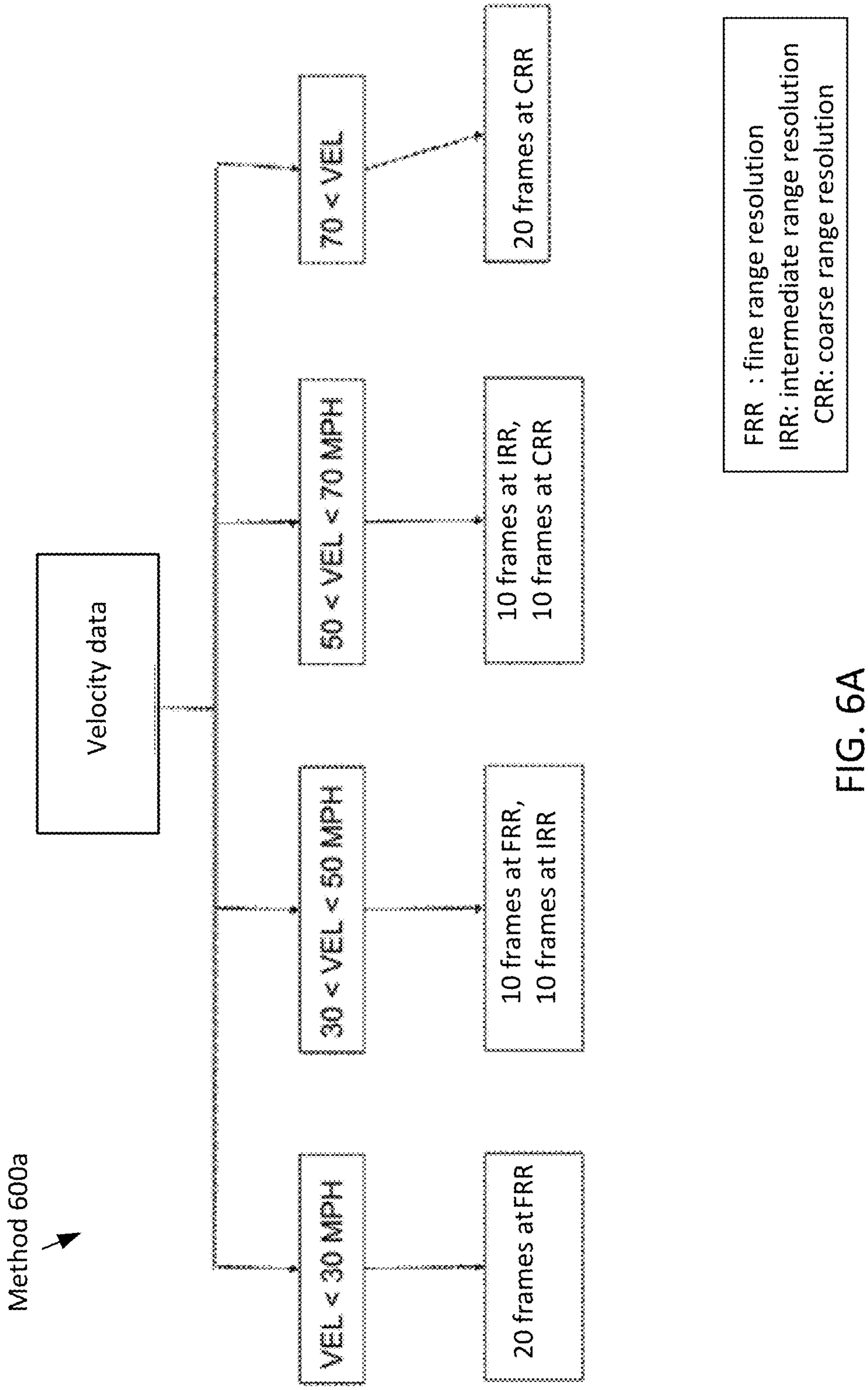
FIG. 6A illustrates an example method of selecting a waveform type based on velocity data indicative of velocity of a vehicle, in accordance with some embodiments of the technology described herein.

FIG. 6A illustrates an example method 600*a* of selecting a frame rate based on velocity data indicative of velocity of a vehicle, in accordance with some embodiments of the technology described herein.

In the example of FIG. 6A, selection of waveform type is performed on the basis of velocity data corresponding to the vehicle. For purposes of illustration, it is assumed that images at a frame rate of 20 frames per second are generated (although other frame rates are possible). In this example, there are three waveform types available for selection-one with a fine range resolution (FRR), one with an intermediate range resolution (IRR) and one with a coarse range resolution (CRR). In one example, signals generated in accordance with the FRR type have bandwidths of 20 GHz, signals generated in accordance with the IRR type have bandwidths of 10 GHz, and signals generated in accordance with the CRR type have bandwidths of 2 GHz. Other values are possible. The composition of the frames is varied depending upon the velocity data. If the velocity data indicates that the vehicle is traveling at a velocity less than 30 mph, all the 20 frames per second are generated by transmitting signals of the FRR type. If the velocity data indicates that the vehicle is traveling at a velocity between 30 mph and 50 mph, of the 20 frames per second, 10 frames are generated by transmitting signals of the FRR type and 10 frames are generated by transmitting signals of the IRR type. If the velocity data indicates that the vehicle is traveling at a velocity between 50 mph and 70 mph, of the 20 frames per second, 10 frames are generated by transmitting signals of the IRR type and 10 frames are generated by transmitting signals of the CRR type. Lastly, if the velocity data indicates that the vehicle is traveling at a velocity beyond 70 mph, all the 20 frames per second are generated by transmitting signals of the CRR type. It should be noted that the selection scheme of FIG. 6A is provided solely for purposes of illustration, as other ways to select waveform types are possible.

As can be appreciated from FIG. 6A, lower velocities dictate greater range resolutions in this example. The velocity of the vehicle can be viewed as a proxy of the likelihood of sudden events warranting immediate action by the vehicle. The lower the velocity, the higher the likelihood that other vehicles are relatively close to the vehicle. For example, velocities of less than 30 mph are typical in circumstances in which a vehicle is accelerating upon stopping at a red light, where vehicles tend to closely cluster to one another. Reaction times in the order of a few seconds are often necessary to avoid collisions if unexpected events occur. For example, a pedestrian crossing a street immediately after the light has turned green (for the vehicles) may cause a vehicle to stop abruptly, leading to potentially dangerous situations. Given the relatively short reaction times necessary to avoid collisions, these circumstances warrant greater range resolutions.

On the other hand, velocities beyond 70 mph are more typical in highways, where vehicles tend to be farther away from each other. Unexpected events in these circumstances tend to be more forgiving. For example, several seconds may be sufficient to adjust the course of a vehicle when another vehicle unexpectedly moves from one lane to another. Given the longer reaction times necessary to avoid collisions, the range resolution can be relaxed in these circumstances. As a result, the amount of data being collected is decreased.

Figure 6B:
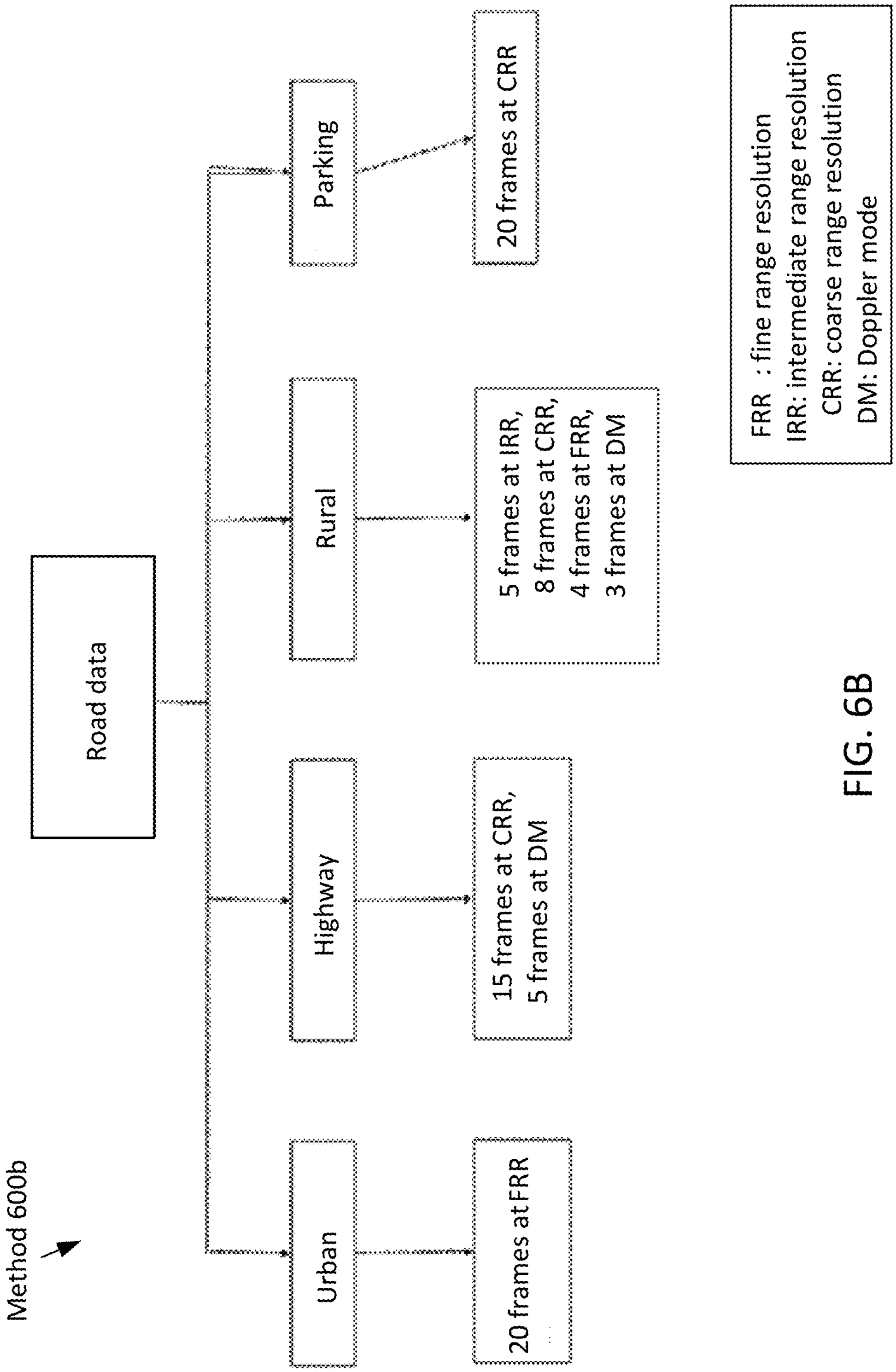
FIG. 6B illustrates an example method of selecting a waveform type based on road data indicative of a type of road associated with an environment of a vehicle, in accordance with some embodiments of the technology described herein.

FIG. 6B illustrates an example method 600*b* of selecting a frame rate based on road data indicative of a type of road associated with an environment of a vehicle, in accordance with some embodiments of the technology described herein.

In the example of FIG. 6B, selection of waveform type is performed on the basis of road data. Again, it is assumed that images at a frame rate of 20 frames per second are generated (although other frame rates are possible). The same waveform types described in connection with FIG. 6A are used. Additionally, some of the frames may be reserved to operate the radar device in the Doppler mode (DM), in which the radar device determines the relative velocity of other vehicles. As in the example of FIG. 6A, road data can be viewed as a proxy of the likelihood of sudden events warranting immediate action by the vehicle. In circumstances where vehicles are more likely to cluster (e.g., in urban settings), short reaction times may be necessary to avoid collisions. In circumstances where vehicles are less likely to cluster (e.g., in highways), longer reaction times may be sufficient to avoid collisions. While FIG. 6B shows an example in which some frames are reserved for DM, it should be appreciated that DM may share a frame with other modes, such as using DM within a portion of a frame.

In this example, if the road data indicates that the vehicle is in an urban setting, all the 20 frames per second are generated by transmitting signals of the FRR type. If the road data indicates that the vehicle is traveling on a highway, of the 20 frames per second, 15 frames are generated by transmitting signals of the FRR type, and the remaining 5 frames may be reserved to operate the radar device in the Doppler mode. If the road data indicates that the vehicle is traveling in a rural setting, of the 20 frames per second, 5 frames are generated by transmitting signals of the IRR type, 8 frames are generated by transmitting signals of the CRR type, 4 frames are generated by transmitting signals of the FRR type, and the remaining 3 frames may be reserved to operate the radar device in the Doppler mode. Lastly, if the road data indicates that the vehicle is in a parking setting (e.g., is in a parking lot), all the 20 frames per second are generated by transmitting signals of the CRR type. It should be noted that the selection scheme of FIG. 6B is provided solely for purposes of illustration, as other ways to select waveform types are possible.

Figure 6C:
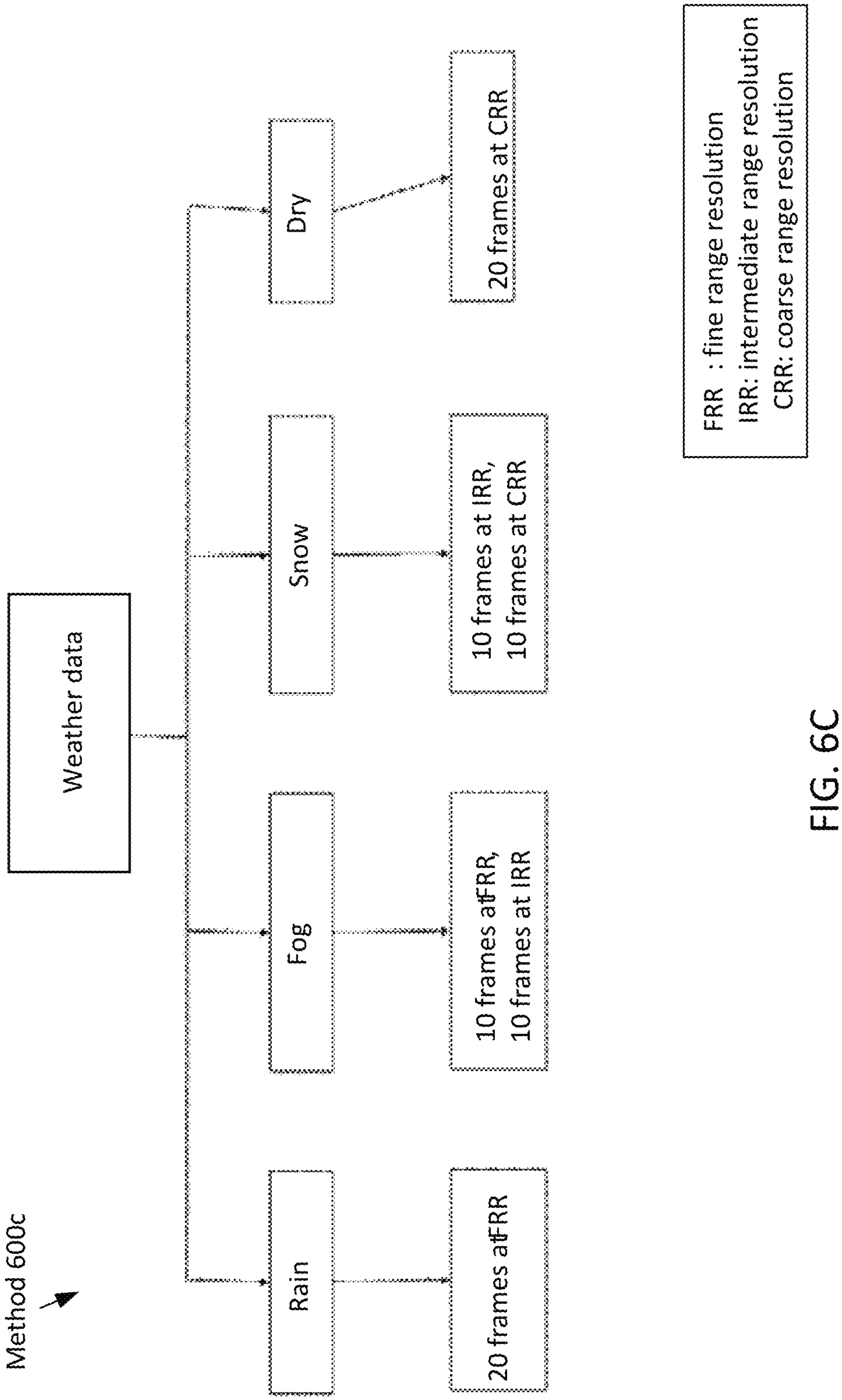
FIG. 6C illustrates an example method of selecting a waveform type based on weather data indicative of a weather condition in an environment of a vehicle, in accordance with some embodiments of the technology described herein.

FIG. 6C illustrates an example method 600*c* of selecting a frame rate based on weather data indicative of a weather condition in an environment of a vehicle, in accordance with some embodiments of the technology described herein.

In the example of FIG. 6C, selection of waveform type is performed on the basis of weather data. Again, it is assumed that images at a frame rate of 20 frames per second are generated (although other frame rates are possible). The same waveform types described in connection with FIG. 6A are used. In this example, range resolution may be adjusted depending on the danger that certain weather conditions may provoke. For example, rainy and foggy conditions tend to be more dangerous than drier conditions, thus warranting finer range resolutions. Similarly, higher precipitation rates tend to be more dangerous than lower precipitation rates, thus warranting finer range resolutions. Thus, range resolution may be varied depending upon the precipitation rate.

In the example of FIG. 6C, if the weather data indicates that the vehicle is in a rainy environment, all the 20 frames per second are generated by transmitting signals of the FRR type. If the weather data indicates that the vehicle is in a foggy environment, 10 frames are generated by transmitting signals of the FRR type and 10 frames are generated by transmitting signals of the IRR type. If the weather data indicates that the vehicle is in a snowy environment, 10 frames are generated by transmitting signals of the IRR type and 10 frames are generated by transmitting signals of the CRR type. Lastly, if the weather data indicates that the vehicle is in a dry environment, all the 20 frames per second are generated by transmitting signals of the CRR type. It should be noted that the selection scheme of FIG. 6C is provided solely for purposes of illustration, as other ways to select waveform types are possible.

Figure 6D:
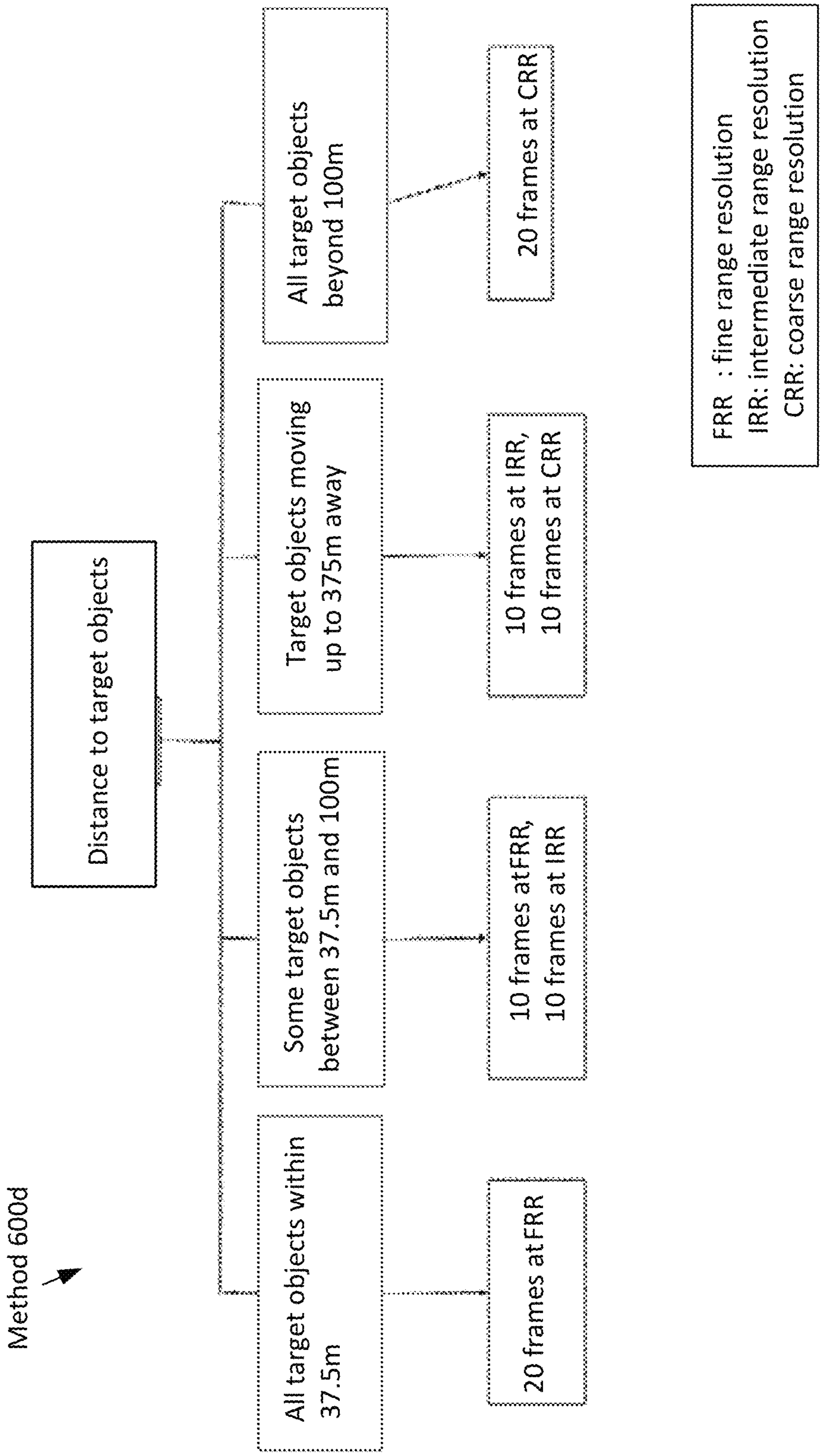
FIG. 6D illustrates an example method of selecting a waveform type based on distance of target objects to a vehicle, in accordance with some embodiments of the technology described herein.

FIG. 6D illustrates an example method 600*d* of selecting a frame rate based on distance of target objects to a vehicle, in accordance with some embodiments of the technology described herein.

In some embodiments, in addition (or in alternative) to selecting waveform types based on situational awareness data, waveform types may be selected based on distance data indicative of the distance of a target object from the vehicle, the distance data obtained using radar device (e.g., 200) itself. FIG. 6D is a diagram showing how waveform types may be selected depending upon the distance to target objects. In this example, if the radar device determines that all target objects are within 37.5 m (though other ranges are possible) of the vehicle, all the 20 frames per second are generated by transmitting signals of the FRR type. If the radar device determines that some target objects are within 37.5 m and some target objects are between 37.5 m and 100 m (though other ranges are possible) of the vehicle, 10 frames are generated by transmitting signals of the FRR type and 10 frames are generated by transmitting signals of the IRR type. If the radar device determines that all target objects are beyond 375 m (though other ranges are possible) of the vehicle, 10 frames are generated by transmitting signals of the IRR type and 10 frames are generated by transmitting signals of the CRR type. Lastly, if the radar device determines that some target objects are beyond 100 m (though other ranges are possible) of the vehicle, all the 20 frames per second are generated by transmitting signals of the CRR type. It should be noted that the selection scheme of FIG. 6D is provided solely for purposes of illustration, as other ways to select waveform types are possible.

III. Selection of Transmitter Configurations

As mentioned above, the inventors have developed techniques for adapting an operational configuration of a radar device based on situational awareness indicative of at least one characteristic of a vehicle. For example, situational awareness data indicative of a characteristic of a vehicle, a target object, and/or an environment of the vehicle may be used to select a radar operational configuration that is appropriate for the situation. The inventors have recognized that TX configurations may be selected based on situational awareness data to balance radar range, precision, and/or field of view, with constraints on available power. For instance, a TX configuration may specify a transmit power level (e.g., for transmission to reach a particular distance from the TX), a transmit phase shift pattern (e.g., for focusing transmission in one or more angular directions), and/or a subset of transmit antenna elements of a transmit antenna array (e.g., for transmission to be focused narrowly or broadly depending on the desired angular resolution).

Some embodiments provide a method of using a radar device (e.g., 700 in FIG. 7) to collect data about a target object, the radar device (e.g., 700) being configurable among a plurality of TX configurations. For example, the radar device may be configured in the manner described herein for radar device 200 including in connection with FIGS. 2A-3B, including processing circuitry (e.g., 710), a TX (e.g., 720), and a RX (e.g., 730).

In some embodiments, the method may include obtaining, using processing circuitry (e.g., 710) of the radar device (e.g., 700), situational awareness data for a vehicle (e.g., 300), the situational awareness data being indicative of at least one characteristic of the vehicle, at least one characteristic of the target object, and/or at least one characteristic of an environment of the vehicle. For example, the situational awareness data may be as described herein including in connection with FIGS. 2A-3B.

In some embodiments, the method may include selecting, using the processing circuitry (e.g., 710), using the situational awareness data for the vehicle and from among a plurality of TX configurations (e.g., FIG. 7), at least one TX configuration to use for collecting the data about the target object. For example, TX configurations selectable by the processing circuitry (e.g., 710) may specify different transmit power levels (e.g., FIGS. 9A-9B), different subsets of transmit antenna elements (e.g., FIGS. 9B-9C), and/or different transmit phase shift patterns (e.g., FIGS. 10A-0C) to produce different transmit beams.

In some embodiments, the method may include transmitting, using a TX (e.g., 720) of the radar device (e.g., 700) according to the TX configuration(s), one or more RF transmit signals. For example, where the TX configuration(s) specify a transmit power level (e.g., FIGS. 9A-9B), a subset (e.g., FIGS. 9B-9C) of a plurality of transmit antenna elements (e.g., 822) of the TX (e.g., 820), and/or a transmit phase shift pattern (e.g., FIGS. 10A-0C) for transmitting the RF transmit signal(s), the RF transmit signal(s) may be transmitted using the specified subset(s) and/or according to the specified transmit power level(s) and/or transmit phase shift pattern(s).

In some embodiments, the method may include receiving, using a RX (e.g., 730) of the radar device, one or more RF receive signals generated at least in part by reflection of the RF transmit signal(s) from the target object. For example, the RX (e.g., 730) may receive the RF receive signal(s) according to a radar operational configuration, and/or may receive the RF receive signal(s) in a static configuration.

In some embodiments, the TX (e.g., 820 in FIG. 8) may include a transmit antenna array including a plurality of transmit antenna elements (e.g., 822) arranged along a dimension (e.g., elevation) of the transmit antenna array, the plurality of TX configurations (e.g., 900*b* and 900*c* in FIGS. 9B-9C) may specify a plurality of different subsets of the plurality of transmit antenna elements (e.g., 822), the selected TX configuration(s) (e.g., 900*b* and/or 900*c*) may specify at least one subset of the plurality of different subsets, and transmitting the RF transmit signal(s) according to the selected TX configuration(s) may include transmitting the RF transmit signal(s) using the specified subset(s).

In some embodiments, the specified subset(s) may include a first subset (e.g., 822*a*, 822*b*, and 822*c*) of the plurality of transmit antenna elements (e.g., 822) and a second subset (e.g., 822*a* and 822*c*) of the plurality of transmit antenna elements (e.g., 822) that is different from the first subset, transmitting the RF transmit signal(s) using the specified subset(s) may include transmitting, at a first time, a first RF transmit signal of the RF transmit signal(s) using the first subset (e.g., 822*a*, 822*b*, and 822*c*) and transmitting, at a second time after the first time, a second RF transmit signal of the RF transmit signal(s) using the second subset (e.g., 822*a* and 822*c*). For example, the method may further include generating, using the processing circuitry (e.g., 710) of the radar device (e.g., 700), a range-cross range image using the RF receive signal(s) generated at least in part by reflection of the first RF transmit signal and/or of the second RF transmit signal from the target object.

In some embodiments, the TX (e.g., 820) may use a first amount of transmit power transmitting the first RF transmit signal using the first subset (e.g., 822*a*, 822*b*, and 822*c*) and the TX (e.g., 820) may use a second amount of transmit power that is different from the first amount of transmit power transmitting the second RF transmit signal using the second subset (e.g., 822*a* and 822*c*), such as a lower amount of transmit power for a subset that includes fewer transmit antenna elements (e.g., 822).

In some embodiments, the TX (e.g., 820) may include a transmit antenna array including a plurality of transmit antenna elements (e.g., 822) arranged along a dimension (e.g., elevation) of the transmit antenna array, the plurality of TX configurations may specify a plurality of different phase shift patterns (e.g., 1000*a*, 1000*b*, and 1000*c* in FIGS. 10A-0C) for transmitting the RF transmit signal(s) via the plurality of transmit antenna elements (e.g., 822), the selected transmitter configuration(s) may specify at least one phase shift pattern (e.g., 1000*a*, 1000*b*, and/or 1000*c*) of the plurality of different phase shift patterns, and transmitting the RF transmit signal(s) according to the selected transmitter configuration(s) may include transmitting the RF transmit signal(s) according to the specified phase shift pattern(s).

In some embodiments, the specified phase shift pattern(s) may include a first phase shift pattern (e.g., 1000*a*) and a second phase shift pattern (e.g., 1000*b*) that is different from the first phase shift pattern, and transmitting the RF transmit signal(s) according to the specified phase shift pattern(s) may include transmitting, at a first time, a first RF transmit signal of the RF transmit signal(s) according to the first phase shift pattern (e.g., 1000*a*) and transmitting, at a second time after the first time, a second RF transmit signal of the RF transmit signal(s) according to the second phase shift pattern (e.g., 1000*b*). For example, the method may further include generating a range-cross range image using the RF receive signal(s) generated at least in part by reflection of the first RF transmit signal and/or of the second RF transmit signal from the target object.

In some embodiments, the specified phase shift pattern(s) may be configured to perform an angular transmit sweep over an angular field of view including a first angular direction (e.g., FIG. 10A) and a second angular direction (e.g., FIG. 10B) different from the first angular direction. For example, according to the first phase shift pattern (e.g., 1000*a*), the TX 820 may focus transmission of the first RF transmit signal in the first angular direction and, according to the second phase shift pattern (e.g., 1000*b*), the TX (e.g., 820) may focus transmission of the second RF transmit signal in the second angular direction. For instance, during a frame, the TX (e.g., 820) may perform the angular sweep over the angular field of view, such that a range-cross range image generated during the frame includes data for the angular field of view.

In some embodiments, the TX (e.g., 820) may include a transmit antenna array including a plurality of transmit antenna elements (e.g., 822) arranged along a dimension (e.g., elevation) of the transmit antenna array, the plurality of TX configurations (e.g., 900*a* and 900*b* in FIGS. 9A-9B) may specify a plurality of different transmit power levels for transmitting the RF transmit signal(s) via the plurality of transmit antenna elements (e.g., 822), the selected transmitter configuration(s) may specify at least one transmit power level (e.g., FIG. 9A and/or FIG. 9B) of the plurality of different transmit power levels, and transmitting the RF transmit signal(s) according to the selected transmitter configuration(s) may include transmitting the RF transmit signal(s) according to the specified transmit power level(s).

Figure 9A:
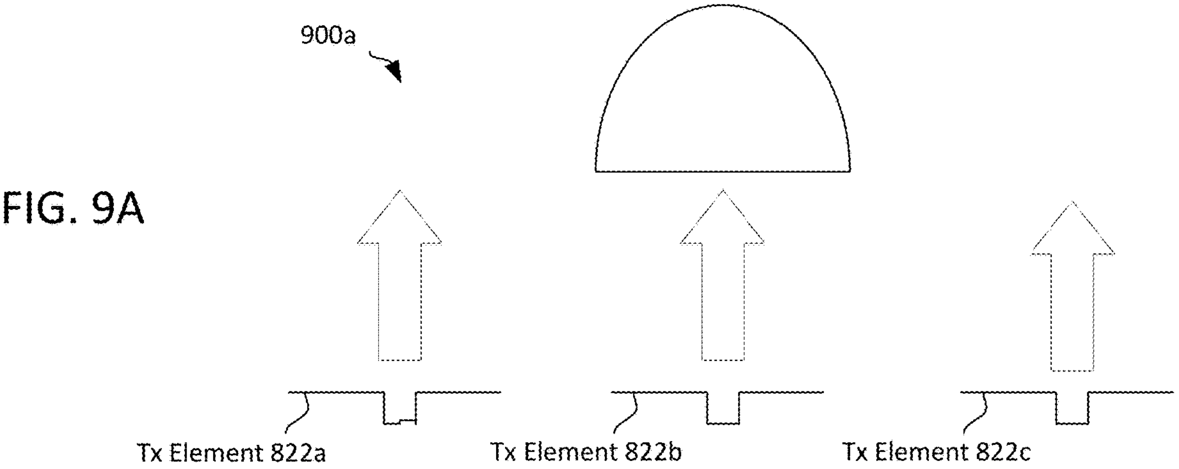
FIG. 9A illustrates example operation of the transmitter of FIG. 8 according to a transmitter configuration using a first subset of transmit antenna elements at a first transmit power level, in accordance with some embodiments of the technology described herein.
Figure 9B:
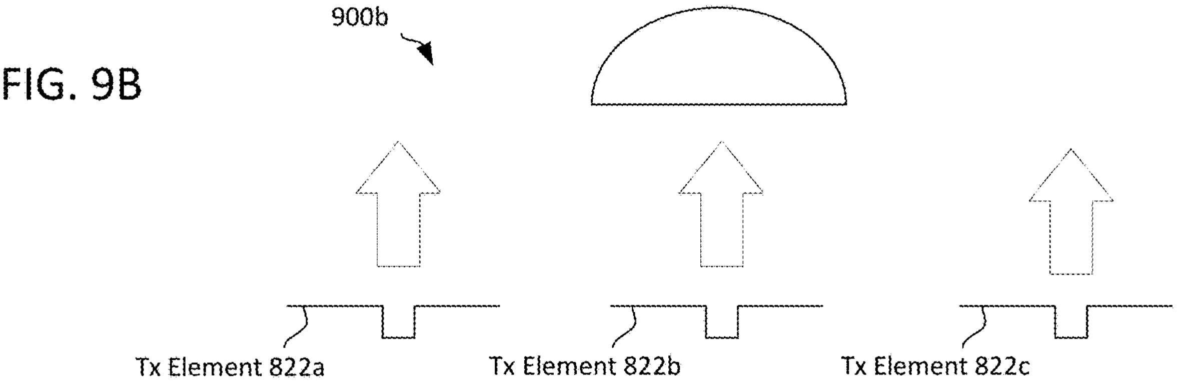
FIG. 9B illustrates example operation of the transmitter of FIG. 8 according to a transmitter configuration using the first subset of transmit antenna elements at a second transmit power level, in accordance with some embodiments of the technology described herein.

In some embodiments, the specified transmit power level(s) may include a first transmit power level (e.g., FIG. 9A) and a second transmit power level (e.g., FIG. 9B) that is different from the first transmit power level, and transmitting the RF transmit signal(s) according to the specified transmit power level(s) may include transmitting, at a first time, a first RF transmit signal of the RF transmit signal(s) according to the first transmit power level (e.g., FIG. 9A) and transmitting, at a second time, a second RF transmit signal of the RF transmit signal(s) according to the second transmit power level (e.g., FIG. 9B). For example, the method may further include generating a range-cross range image using the RF receive signal(s) generated at least in part by reflection of the first RF transmit signal and/or the second RF transmit signal from the target object.

In some embodiments, the RF transmit signal(s) may have frequency content in a frequency band of 300 GHz-3 THz.

Figure 7:
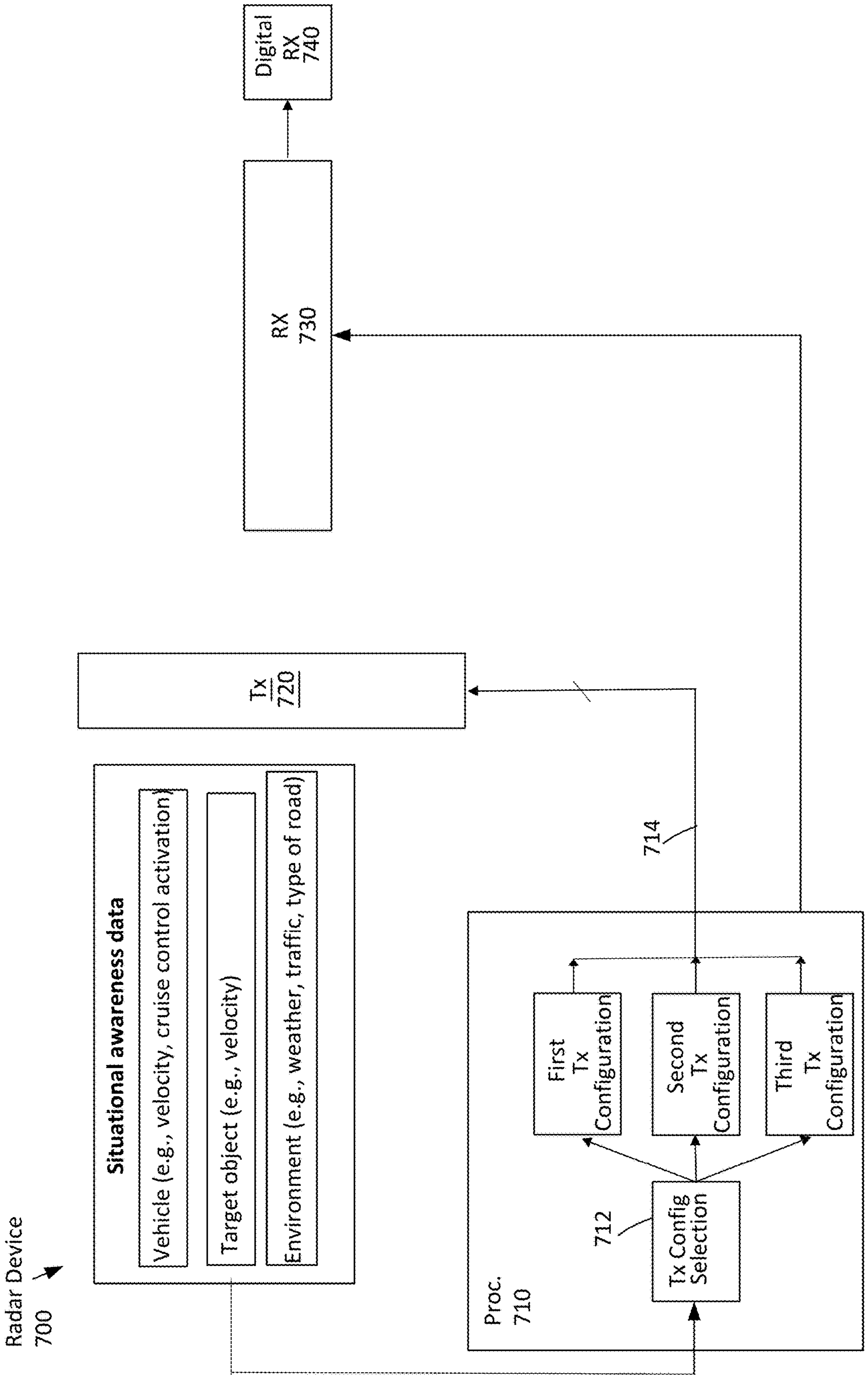
FIG. 7 illustrates an example radar device having processing circuitry configured to select among transmitter configurations for operating a transmitter of the radar device, in accordance with some embodiments of the technology described herein.

FIG. 7 illustrates an example radar device 700 having processing circuitry 710 configured to select among TX configurations for operating a TX 720 of the radar device 700, in accordance with some embodiments of the technology described herein.

In some embodiments, processing circuitry 710 may be configured to obtain situational awareness data for a vehicle (e.g., 300), the situational awareness data being indicative of at least one characteristic of the vehicle, at least one characteristic of the target object, and/or at least one characteristic of an environment of the vehicle, such as described herein for processing circuitry 210 including in connection with FIGS. 3A-3B.

In some embodiments, processing circuitry 710 may be configured to select, using the situational awareness data for the vehicle and from among a plurality of TX configurations, at least one TX configuration to use for collecting data about a target object. For example, as shown in FIG. 7, processing circuitry 710 includes TX configuration selection circuitry 712, which may be configured to select one or more TX configurations based on situational awareness data, such as described herein for processing circuitry 210. For instance, the situational awareness data may be indicative of at least one characteristic of the vehicle (e.g., 300), at least one characteristic of the target object, and/or at least one characteristic of the environment of the vehicle.

In some embodiments, TX configuration selection circuitry 712 may be configured to select one or more TX configurations and to send a control signal 714 to control TX 720 according to the selected TX configuration. For example, selection may be based on the situational awareness data obtained by processing circuitry 710. In the illustrated embodiment, TX configuration selection circuitry 712 is shown configured to select from among first, second, and third TX configurations, although any other suitable numbers of selectable TX configurations are possible.

In some embodiments, TX 720 may be configured to transmit one or more RF transmit signals according to the at least one transmitter configuration. For example, TX 720 may have transmit circuitry (e.g., a phase shifter and/or amplifier) configured to receive control signal 714 from processing circuitry 710, which may control a transmit power level, a selection of transmit antenna elements, and/or a phase shift pattern for transmission of RF signals using TX 720. In some embodiments, RX 730 may be configured to receive one or more RF receive signals generated at least in part by reflection of the RF transmit signal(s) from the target object. In some embodiments, the RF transmit signal(s) may have frequency content in a frequency band of 300 GHz-3 THz.

Figure 8:
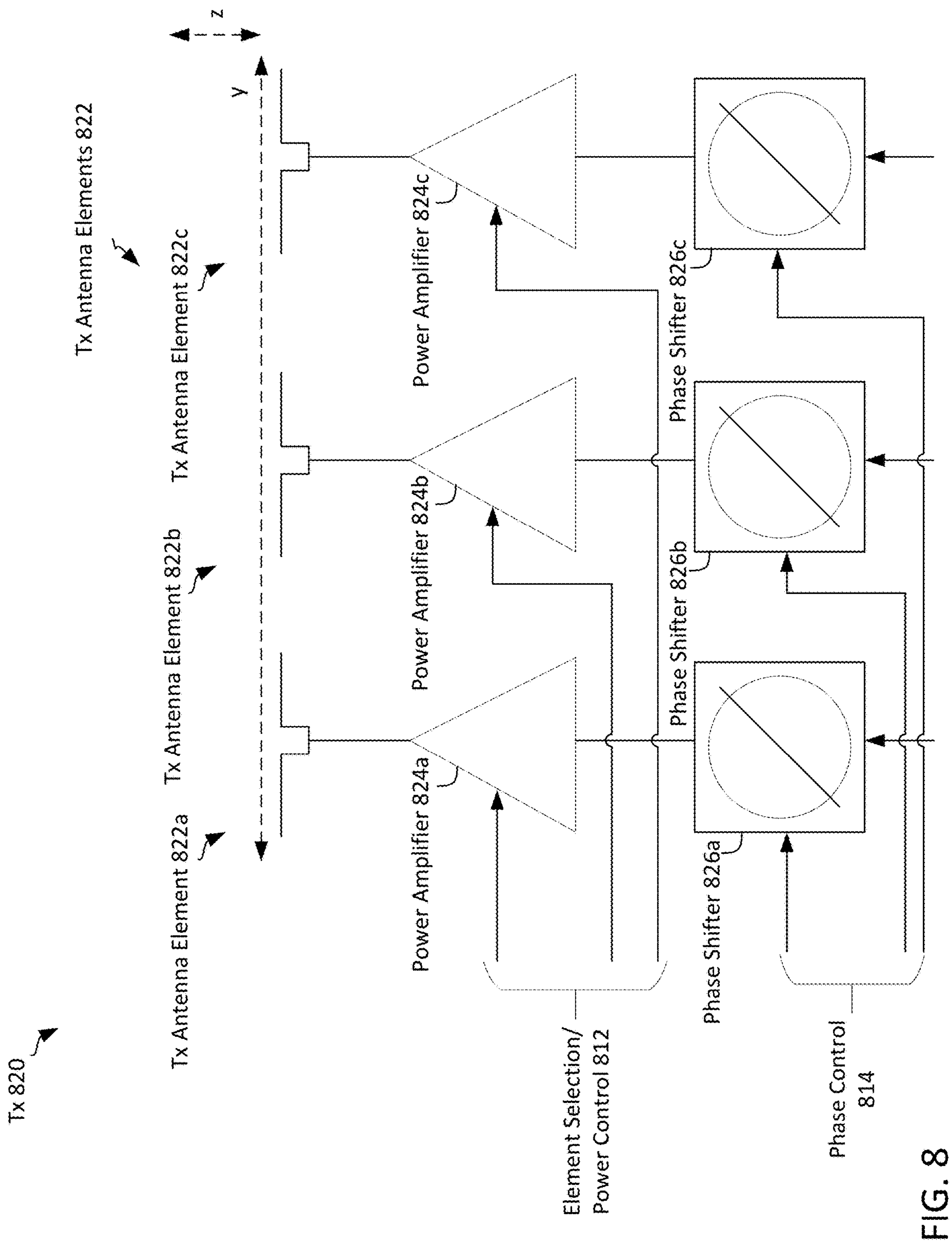
FIG. 8 illustrates an example transmitter that may be included in the radar device of FIG. 7, in accordance with some embodiments of the technology described herein.

FIG. 8 illustrates an example TX 820 that may be included in radar device 700, in accordance with some embodiments of the technology described herein.

In some embodiments, TX 820 may have a transmit antenna array including transmit antenna elements 822, which may be arranged along a dimension of the transmit antenna array. For example, as shown in FIG. 8, transmit antenna elements 822 are arranged along the y-axis, which may be an elevation dimension of the transmit antenna array. For instance, the elevation dimension of the transmit antenna array may be longer than the azimuth dimension of the transmit antenna array, such as in the example of FIG. 4, though it should be appreciated that other array configurations are possible.

In some embodiments, TX configurations selectable by processing circuitry (e.g., 710) may specify a plurality of different subsets of transmit antenna elements 822 and the selected transmitter configuration(s) selected by the processing circuitry may specify at least one subset of the plurality of different subsets. For example, selecting different subsets of transmit antenna elements 822 may control the beamwidth of transmit beams in which the transmit antenna array transmits RF transmit signals, such as described further herein. In some embodiments, when selected, TX 820 may be configured to transmit the RF transmit signal(s) using the specified subset(s). For example, as shown in FIG. 8, transmit circuitry of TX 820 includes power amplifiers 824*a*, 824*b*, and 824*c* respectively coupled to transmit antenna elements 822*a*, 822*b*, and 822*c* respectively. For instance, power amplifiers 824*a*, 824*b*, and/or 824*c* may be selectable to enable and/or disable transmission via the respective transmit antenna elements 822*a*, 822*b*, and/or 822*c* based on an element selection and/or transmit power control signal 812 (e.g., including and/or based on control signal 714), such as by enabling and/or disabling operation of the respective amplifier 824*a*, 824*b*, and/or 824*c*.

Alternatively or additionally, in some embodiments, TX configurations selectable by processing circuitry (e.g., 710) may specify a plurality of different transmit power levels for transmitting the RF transmit signal(s) via transmit antenna elements 822, and the TX configuration selected by the processing circuitry may specify at least one transmit power level of the plurality of different transmit power levels. For example, selecting different transmit power levels for transmitting RF transmit signals may result in shorter or greater range of transmission, such as described further herein. In some embodiments, TX 820 may be configured to transmit the RF transmit signal(s) according to the specified transmit power level(s). For example, as shown in FIG. 8, each power amplifier 824*a*, 824*b*, and 824*b* is shown configured to receive an element selection and/or power control signal 812. For instance, the element selection and/or power control signal 812 may control a transmit power level of the respective amplifier 824*a*, 824*b*, and/or 824*c*.

In some embodiments, TX configurations selectable by processing circuitry (e.g., 710) may specify a plurality of different phase shift patterns for transmitting RF transmit signals via transmit antenna elements 822, and the TX configuration(s) selected by the processing circuitry may specify at least one phase shift pattern of the plurality of different phase shift patterns. For example, selecting different transmit phase shift patterns may control the angular direction in which transmission is focused, such as described further herein. In some embodiments, when selected, TX 820 may be configured to transmit the RF transmit signal(s) according to the specified phase shift pattern(s). For example, as shown in FIG. 8, transmit circuitry of TX 820 includes phase shifters 826*a*, 826*b*, and 826*c* respectively coupled to transmit antenna elements 822*a*, 822*b*, and 822*c*. For instance, phase shifters 826*a*, 826*b*, and 826*c* may be configured to apply a phase shift to an RF transmit signal for transmission by the respective transmit antenna elements 822*a*, 822*b*, and 822*c* based on a phase control signal 814 (e.g., including and/or based on control signal 714), such as by introducing a controllable amount of phase shift to RF signals input to the respective phase shifter 826*a*, 826*b*, and 826*c*.

FIG. 9A illustrates example operation of TX 820 according to a transmitter configuration 900*a* using a first subset of transmit antenna elements 822 at a first transmit power level, in accordance with some embodiments of the technology described herein.

As shown in FIG. 9A, each transmit antenna element 822*a*, 822*b*, and 822*c* transmits an RF transmit signal to produce a transmit beam. In the illustrated embodiment, each transmit antenna element 822*a*, 822*b*, and 822*c* transmits with the same first transmit power level. For instance, power amplifiers 824*a*, 824*b*, and 824*c* may be configured to produce the same first transmit power level in response to the element selection and/or transmit power level control signal 812.

FIG. 9B illustrates example operation of TX 820 according to a transmitter configuration 900*b* using the first subset of transmit antenna elements 822 at a second transmit power level, in accordance with some embodiments of the technology described herein.

As shown in FIG. 9B, each transmit antenna element 822*a*, 822*b*, and 822*c* transmits an RF transmit signal, but with a second transmit power level that is less than the first transmit power level. In the illustrated example, the longitudinal range of the transmission may be shorter, such as 200 meters rather than 300 meters for TX configuration 900*a* for instance.

In some embodiments, the transmit power level(s) specified by a TX configuration may include a first transmit power level and a second transmit power level that is different from the first transmit power level. For example, a TX configuration may specify the first transmit power level shown in FIG. 9A and the second transmit power level shown in FIG. 9B.

In some embodiments, TX 820 may be configured to transmit, at a first time, a first RF transmit signal of the RF transmit signal(s) according to the first transmit power level and transmit, at a second time, a second RF transmit signal of the RF transmit signal(s) according to the second transmit power level. For example, TX 820 may be configured to transmit the first RF transmit signal according to the first transmit power level as shown in FIG. 9A at a first time and to transmit the second RF transmit signal according to the second transmit power level as shown in FIG. 9B at a second time after the first time. For instance, the first RF transmit signal and the second RF transmit signals may be transmitted during different frames (e.g., each including or a part of a transmit sweep over multiple transmit beams over time) and/or during a frame (e.g., as part of a same transmit sweep over multiple transmit beams over time). In some embodiments, the processing circuitry (e.g., 710) may be configured to generate a range-cross range image using the RF receive signal(s) generated at least in part by reflection of the first RF transmit signal and/or the second RF transmit signal from the target object (e.g., where the first RF transmit signal and the second RF transmit signal are transmitted during a frame).

Figure 9C:
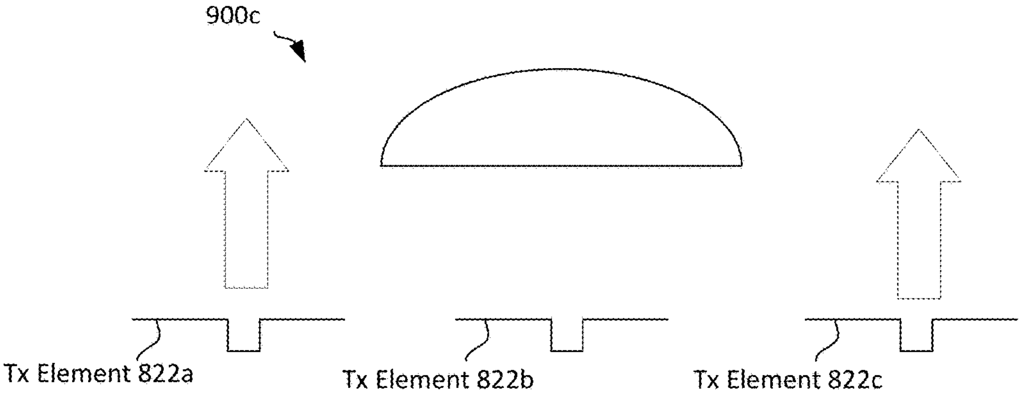
FIG. 9C illustrates example operation of the transmitter of FIG. 8 according to a transmitter configuration using a second subset of transmit antenna elements at the first transmit power level, in accordance with some embodiments of the technology described herein.

FIG. 9C illustrates example operation of TX 820 according to a transmitter configuration 900*c* using a second subset of transmit antenna elements 822 at the first transmit power level, in accordance with some embodiments of the technology described herein.

In some embodiments, one or more subsets of transmit antenna elements 822 specified by a TX configuration may include a first subset of transmit antenna elements 822 and a second subset of transmit antenna elements 822 that is different from the first subset. For example, in TX configuration 900*b* in FIG. 9B, a first subset of transmit antenna elements 822*a*, 822*b*, and 822*c* transmit the RF transmit signal, whereas in TX configuration 900*c* in FIG. 9C, a second subset of transmit antenna elements 822*a* and 822*c* transmit the RF transmit signal. For instance, the first and second subsets are different in that the second subset omits transmit antenna element 822*b*. In the illustrated embodiment, power amplifier 824*b* may be configured not to transmit an RF transmit signal, such as in response to element selection and/or transmit power level control signal 812. As a result, in FIG. 9C, the resulting beamwidth of the transmit beam is wider than in FIG. 9B, which may provide lower resolution in elevation than FIG. 9B while using less power and/or achieving greater range.

In some embodiments, TX 820 may be configured to transmit a first RF transmit signal using a first subset of transmit antenna elements 822 using a first amount of transmit power and transmit a second RF transmit signal using a second subset of transmit antenna elements 822 using a second amount of transmit power that is equal to the first amount of transmit power. For example, as shown in FIGS. 9B and 9C, transmit antenna elements 822*a*, 822*b*, and 822*c* transmit with lower transmit power levels in FIG. 9B than transmit antenna elements 822*a* and 822*c* in FIG. 9C. For instance, the same amount of transmit power may be provided to fewer transmit antenna elements in TX configuration 900*c*, which may result in the same longitudinal range using fewer transmit antenna elements. In other embodiments, different subsets of transmit antenna elements may be configured to use different amounts of transmit power. For instance, where transmit antenna elements 822*a* and 822*b* use the same transmit power level in FIG. 9C as in FIG. 9B, less transmit power may be used due to one fewer transmit antenna element, resulting in shorter longitudinal range and wider beamwidth than in FIG. 9B.

In some embodiments, TX 820 may be configured to transmit, at a first time, a first RF transmit signal of the RF transmit signal(s) using the first subset and transmit, at a second time after the first time, a second RF transmit signal of the RF transmit signal(s) using the second subset. For example, TX 820 may be configured to transmit the first RF transmit signal using the first subset as shown in FIG. 9B at a first time and to transmit the second RF transmit signal using the second subset as shown in FIG. 9C at a second time after the first time. For instance, the first RF transmit signal and the second RF transmit signals may be transmitted during different frames (e.g., each including or a part of a transmit sweep over multiple transmit beams over time) and/or during a frame (e.g., as part of a same transmit sweep over multiple transmit beams over time). In some embodiments, processing circuitry (e.g., 710) of the radar device (e.g., 700) may be configured to generate a range-cross range image using the RF receive signal(s) generated at least in part by reflection of the first RF transmit signal and/or of the second RF transmit signal from a target object (e.g., where the first RF transmit signal and the second RF transmit signal are transmitted during a frame).

Figure 10A:
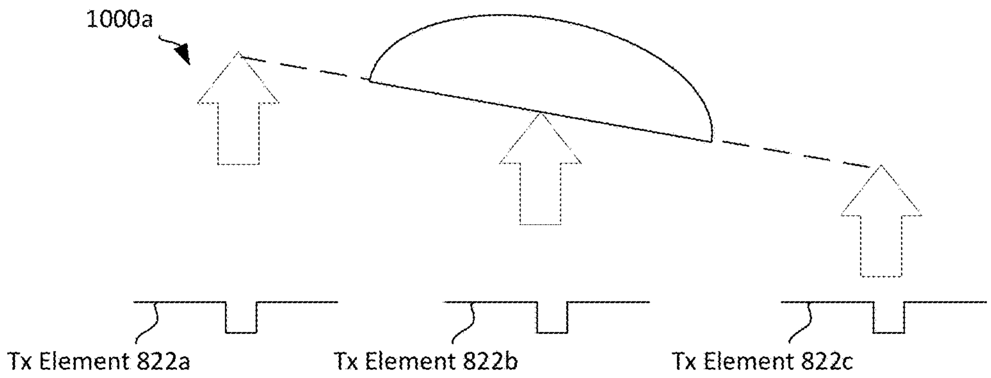
FIG. 10A illustrates example operation of the transmitter of FIG. 8 according to a first transmit phase shift pattern, in accordance with some embodiments of the technology described herein.

FIG. 10A illustrates example operation of TX 820 according to a first transmit phase shift pattern 1000*a*, in accordance with some embodiments of the technology described herein.

As shown in FIG. 10A, each transmit antenna element 822*a*, 822*b*, and 822*c* transmits an RF transmit signal to produce a transmit beam. In the illustrated embodiment, each transmit antenna element 822*a*, 822*b*, and 822*c* transmits with a different phase shifted version of the RF transmit signal, resulting in a phase front oriented in a nonzero elevation angular direction. For instance, phase shifters 826*a*, 826*b*, and 826*c* may be configured to apply different phase shifts in response to the phase shift control signal 814. In the illustrated embodiment, with a phase front oriented in an angular direction of elevation, transmission may be focused in that direction.

Figure 10B:
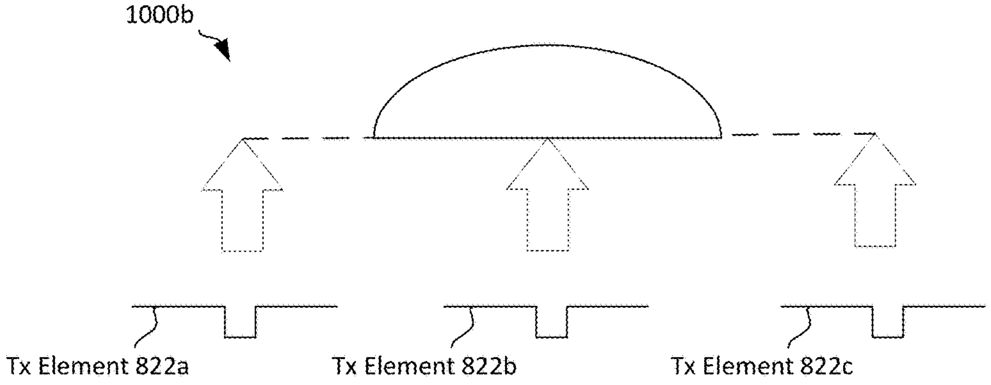
FIG. 10B illustrates example operation of the transmitter of FIG. 8 according to a second transmit phase shift pattern, in accordance with some embodiments of the technology described herein.

FIG. 10B illustrates example operation of TX 820 according to a second transmit phase shift pattern 1000*b*, in accordance with some embodiments of the technology described herein.

As shown in FIG. 10B, each transmit antenna element 822*a*, 822*b*, and 822*c* transmits an RF transmit signal to produce a transmit beam with the same phase version of the RF transmit signal, resulting in a phase front oriented at 0 degrees in elevation. For instance, phase shifters 826*a*, 826*b*, and 826*c* may be configured to apply the same (and/or zero) phase shift in response to the phase shift control signal 814.

Figure 10C:
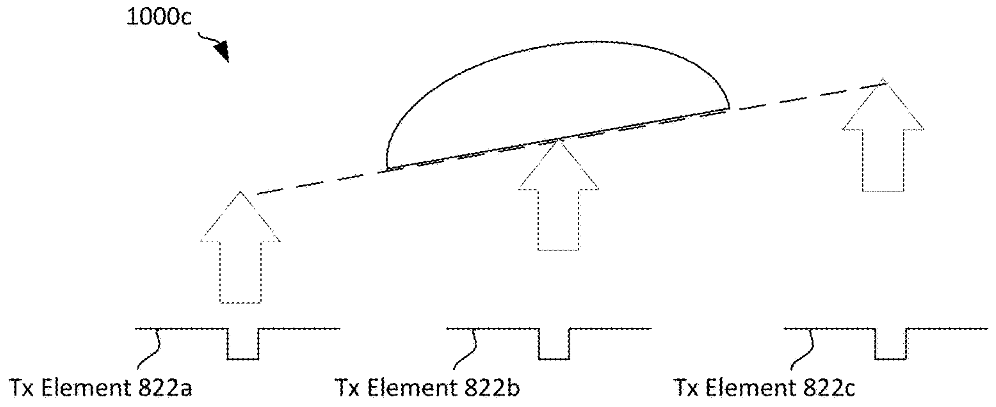
FIG. 10C illustrates example operation of the transmitter of FIG. 8 according to a third transmit phase shift pattern, in accordance with some embodiments of the technology described herein.

FIG. 10C illustrates example operation of TX 820 according to a third transmit phase shift pattern 1000*c*, in accordance with some embodiments of the technology described herein.

As shown in FIG. 10C, each transmit antenna element 822*a*, 822*b*, and 822*c* transmits an RF transmit signal to produce a transmit beam with a different phase shifted version of the RF transmit signal, resulting in a phase front oriented in a nonzero elevation angular direction that is different from the angular direction shown in FIG. 10A. For instance, phase shifters 826*a*, 826*b*, and 826*c* may be configured to apply different phase shifts from one another and with respect to phase shift pattern 1000*a* in response to the phase shift control signal 814.

In some embodiments, specified phase shift pattern(s) of a TX configuration may include a first phase shift pattern and a second phase shift pattern that is different from the first phase shift pattern. For example, the first phase shift pattern may be one of phase shift patterns 1000*a* and 1000*b* and the second phase shift pattern may be phase shift pattern 1000*b* or 1000*c*, respectively.

In some embodiments, TX 820 may be configured to transmit, at a first time, a first RF transmit signal of the RF transmit signal(s) according to the first phase shift pattern and transmit, at a second time after the first time, a second RF transmit signal of the RF transmit signal(s) according to the second phase shift pattern. For example, TX 820 may be configured to transmit the first RF transmit signal according to phase shift pattern 1000*a* as shown in FIG. 10A at a first time and to transmit the second RF transmit signal according to phase shift pattern 1000*b* as shown in FIG. 10B at a second time after the first time. For instance, the first RF transmit signal and the second RF transmit signal may be transmitted during different frames (e.g., each including or a part of a transmit sweep over multiple transmit beams over time) and/or during a frame (e.g., as part of a same transmit sweep over multiple transmit beams over time). In some embodiments, the processing circuitry (e.g., 710) may be further configured to generate a range-cross range image using the RF receive signal(s) generated at least in part by reflection of the first RF transmit signal and/or of the second RF transmit signal from the target object (e.g., where the first RF transmit signal and the second RF transmit signal are transmitted during a frame).

Figure 10D:
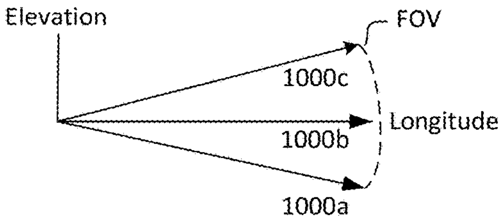
FIG. 10D illustrates angular directions of transmission focus in elevation for the transmitter operations of FIGS. 10A, 10B, and 10C, in accordance with some embodiments of the technology described herein.

FIG. 10D illustrates angular directions of transmission focus in elevation for transmit phase shift patterns 1000*a*, 1000*b*, and 1000*c*, respectively, in accordance with some embodiments of the technology described herein.

In some embodiments, the phase shift pattern(s) specified by a selected TX configuration may be configured to perform an angular transmit sweep over an angular field of view including a first angular direction and a second angular direction different from the first angular direction. For example, according to phase shift pattern 1000*a*, TX 820 may be configured to focus transmission of a first RF transmit signal in the first angular direction and, according to phase shift pattern 1000*b*, TX 820 may be configured to focus transmission of the second RF transmit signal in the second angular direction. For instance, as shown in FIG. 10D, the angular directions of phase shift patterns 1000*a*, 1000*b*, and 1000*c* are different in the elevation-longitude plane, with phase shift patterns 1000*a* and 1000*c* above and below 0 degrees in elevation and phase shift pattern 1000*b* at 0 degrees in elevation, along the longitudinal axis.

In some embodiments, TX configurations selectable by processing circuitry (e.g., 710) may specify a plurality of different subsets of transmit antenna elements 822 and a plurality of different phase shift patterns applied to respective ones of the plurality of different subsets, and the TX configuration(s) selected by the processing circuitry may specify at least one subset of the plurality of different subsets and at least one phase shift pattern applied to the at least one subset. For example, a TX configuration may specify a subset (e.g., transmit antenna elements 822*a* and 822*c* as in FIG. 9C) and a phase shift pattern (e.g., 1000*a*), which may result in a beamwidth and a direction of focus. In some embodiments, TX 820 may be configured to transmit the RF transmit signal(s) using the specified subset(s) according to the specified phase shift pattern(s). For example, selection of a subset of transmit antenna elements 822 may be in response to element selection and/or transmit power level control signal 812 and a phase shift pattern may be in response to phase shift control signal 814.

IV. Selection of Receiver Configurations

As mentioned above, the inventors have developed techniques for adapting an operational configuration of a radar device based on situational awareness indicative of at least one characteristic of a vehicle. For example, situational awareness data indicative of a characteristic of a vehicle, a target object, and/or an environment of the vehicle may be used to select a radar operational configuration that is appropriate for the situation. The inventors have recognized that RX configurations may be selected based on situational awareness data to balance precision and/or field of view with constraints on available power. For instance, a RX configuration may specify a receive phase shift pattern (e.g., for focusing reception in one or more angular directions) and/or a subset of receive antenna elements of a receive antenna array (e.g., for reception to be focused narrowly or broadly depending on the desired angular resolution).

Figure 11:
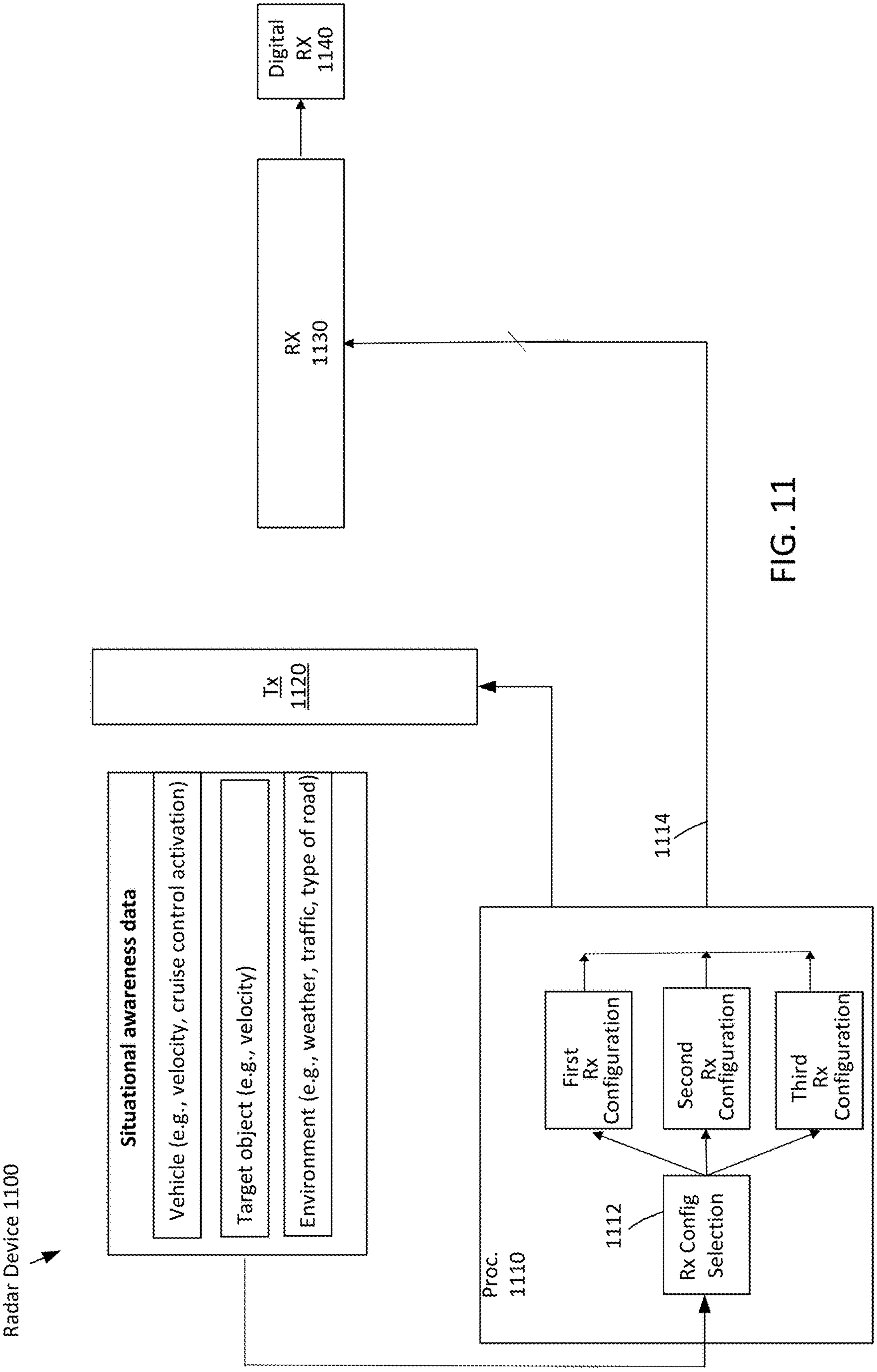
FIG. 11 illustrates an example radar device having processing circuitry configured to select among receiver configurations for operating a receiver of the radar device, in accordance with some embodiments of the technology described herein.

Some embodiments provide a method of using a radar device (e.g., 1100 in FIG. 11) to collect data about a target object, the radar device (e.g., 1100) being configurable among a plurality of RX configurations (e.g., FIG. 11). For example, the radar device may be configured in the manner described herein for radar device 200 including in connection with FIGS. 2A-3B, including processing circuitry (e.g., 1110), a TX (e.g., 1120), and a RX (e.g., 1130).

In some embodiments, the method may include obtaining, using processing circuitry (e.g., 1110) of the radar device (e.g., 1100), situational awareness data for a vehicle (e.g., 300 in FIG. 3A), the situational awareness data being indicative of at least one characteristic of the vehicle, at least one characteristic of the target object, and/or at least one characteristic of an environment the vehicle. For example, the situational awareness data may be as described herein including in connection with FIGS. 2A-3B.

In some embodiments, the method may include selecting, using the processing circuitry (e.g., 1110), using the situational awareness data for the vehicle and from among a plurality of RX configurations, at least one RX configuration to use for collecting the data about the target object. For example, RX configurations selectable by the processing circuitry (e.g., 1110) may specify different subsets of receive antenna elements (e.g., FIGS. 13A-13B) and/or different receive phase shift patterns (e.g., FIGS. 14A-14C) to produce different receive beams.

In some embodiments, the method may include transmitting, using a transmitter (e.g., 1120) of the radar device (e.g., 1100), one or more RF transmit signals. For example, the TX (e.g., 1120) may transmit the RF transmit signal(s) according to a radar operational configuration, and/or may transmit the RF transmit signal(s) in a static configuration.

In some embodiments, the method may include receiving, using a RX (e.g., 1130) of the radar device (e.g., 1100) in the selected RX configuration(s), one or more RF receive signals generated at least in part by reflection of the RF transmit signal(s) from the target object.

In some embodiments, the RX (e.g., 1230) may include a receive antenna array including a plurality of receive antenna elements (e.g., 1232) arranged along a dimension (e.g., azimuth) of the receive antenna array, the plurality of RX configurations (e.g., 1300*a* and/or 1300*b*) may specify a plurality of different subsets (e.g., FIG. 13A and FIG. 13B) of the plurality of receive antenna elements (e.g., 1232), the selected receiver configuration(s) may specify at least one subset (e.g., FIGS. 13A and/or 13B) of the plurality of different subsets, and receiving the RF receive signal(s) according to the selected RX configuration(s) may include receiving the RF receive signal(s) using the specified subset(s).

In some embodiments, the specified subset(s) may include a first subset (e.g., 1232*a*, 1232*b*, and 1232*c* in FIG. 13A) of the plurality of receive antenna elements (e.g., 1232) and a second subset (e.g., 1232*a* and 1232*c* in FIG. 13B) of the plurality of receive antenna elements (e.g., 1232) that is different from the first subset, and receiving the RF receive signal(s) according to the selected receiver configuration(s) may include comprises receiving, at a first time, a first RF receive signal of the RF receive signal(s) using the first subset (e.g., 1232*a*, 1232*b*, and 1232*c*) and receiving, at a second time after the first time, a second RF receive signal of the RF receive signal(s) using the second subset (e.g., 1232*a* and 1232*c*). For example, the method may further include generating, using the processing circuitry (e.g., 1110), a range-cross range image using the first RF receive signal and the second RF receive signal.

In some embodiments, the RX 1230 may use a first amount of receive power receiving the first RF receive signal using the first subset (e.g., 1232*a*, 1232*b*, and 1232*c*) and the RX 1230 may use a second amount of receive power that is different from the first amount of receive power receiving the second RF receive signal using the second subset (e.g., 1232*a* and 1232*c*), such as a lower amount of receive power for a subset that includes fewer receive antenna elements (e.g., 1232).

In some embodiments, the RX (e.g., 1230) may include a receive antenna array including a plurality of receive antenna elements (e.g., 1232) arranged along a dimension (e.g., azimuth) of the receive antenna array, the plurality of RX configurations specify a plurality of different phase shift patterns (e.g., 1400*a*, 1400*b*, and 1400*c* in FIGS. 14A-14C) for receiving the RF receive signal(s) via the plurality of receive antenna elements (e.g., 1232), the selected RX configuration(s) may specify at least one phase shift pattern (e.g., 1400*a*, 1400*b*, and/or 1400*c*) of the plurality of different phase shift patterns, and receiving the RF receive signal(s) according to the selected receiver configuration(s) may include receiving the RF receive signal(s) according to the specified phase shift pattern(s).

In some embodiments, the specified phase shift pattern(s) may include a first phase shift pattern (e.g., 1400*a*) and a second phase shift pattern (e.g., 1400*b*) that is different from the first phase shift pattern, and receiving the RF receive signal(s) according to the specified phase shift pattern(s) may include receiving, at a first time, a first RF receive signal of the RF receive signal(s) according to the first phase shift pattern (e.g., 1400*a*) and receiving, at a second time after the first time, a second RF receive signal of the RF receive signal(s) according to the second phase shift pattern (e.g. 1400*b*). For example, the method may further include generating a range-cross range image using the first RF receive signal and the second RF receive signal.

In some embodiments, the specified phase shift pattern(s) may be configured to perform an angular receive sweep over an angular field of view including a first angular direction (e.g., FIG. 14A) and a second angular direction (e.g., 14B) different from the first angular direction. For example, according to the first phase shift pattern (e.g., 1400*a*), the RX may focus reception of the first RF receive signal in the first angular direction and, according to the second phase shift pattern (e.g., 1400*b*), the RX may focus reception of the second RF receive signal in the second angular direction.

In some embodiments,

The RX may include a receive antenna array including a plurality of receive antenna elements (e.g., 1232) arranged along a dimension (e.g., azimuth) of the receive antenna array, the plurality of RX configurations may specify a plurality of different subsets (e.g., FIGS. 13A-13B) of the plurality of receive antenna elements (e.g., 1232) and a plurality of different phase shift patterns (e.g., FIGS. 14A-14C) applied to respective ones of the plurality of different subsets, the selected RX configuration may specify at least one subset (e.g., FIGS. 13A and/or 13B) of the plurality of different subsets and at least one phase shift pattern (e.g., FIG. 14A, FIG. 14B, and/or FIG. 14C) applied to the at least one subset, and receiving the RF receive signal(s) according to the selected receiver configuration(s) may include receiving the RF receive signal(s) using the specified subset according to the specified phase shift pattern.

In some embodiments, the TX (e.g., 1220) may include a transmit antenna array include a plurality of transmit antenna elements (e.g., 822) arranged along a dimension (e.g., elevation) of the transmit antenna array that is orthogonal to the dimension (e.g., azimuth) of the receive antenna array, and transmitting the RF transmit signal(s) may include transmitting the RF transmit signal(s) via the plurality of transmit antenna elements (e.g., 822).

In some embodiments, the RF transmit signal(s) have frequency content in a frequency band of 300 GHz-3 THz.

FIG. 11 illustrates an example radar device 1100 having processing circuitry 1110 configured to select among RX configurations for operating RX 1130 of the radar device 1100, in accordance with some embodiments of the technology described herein.

In some embodiments, processing circuitry 1110 may be configured to obtain situational awareness data for a vehicle, the situational awareness data being indicative of at least one characteristic of the vehicle, at least one characteristic of the target object, and/or at least one characteristic of an environment of the vehicle, such as described herein for processing circuitry 210 including in connection with FIGS. 3A-3B.

In some embodiments, processing circuitry 1110 may be configured select, using the situational awareness data for the vehicle and from among a plurality of RX configurations, at least one RX configuration to use for collecting the data about a target object. For example, as shown in FIG. 11, processing circuitry 1110 includes RX configuration selection circuitry 1112, which may be configured to select one or more RX configurations based on situational awareness data, such as described herein for processing circuitry 210. For instance, the situational awareness data may be indicative of at least one characteristic of the vehicle (e.g., 300), at least one characteristic of the target object, and/or at least one characteristic of the environment of the vehicle.

In some embodiments, TX configuration selection circuitry 1112 may be configured to select one or more RX configurations and to send a control signal 1114 to control RX 1130 according to the selected RX configuration. For example, selection may be based on the situational awareness data obtained by processing circuitry 1110. In the illustrated embodiment, RX configuration selection circuitry 1112 is shown configured to select from among first, second, and third RX configurations, although any other suitable numbers of selectable RX configurations are possible.

In some embodiments, TX 1120 may be configured to transmit one or more RF transmit signals, such as described herein for TX 220 including in connection with FIGS. 2A-3B. In some embodiments, the RF transmit signal(s) may have frequency content in a frequency band of 300 GHz-3 THz.

In some embodiments, RX 1130 may be configured to receive one or more RF receive signals, according to the selected RX configuration(s), generated at least in part by reflection of the RF transmit signal(s) from the target object. For example, RX 1130 may have receive circuitry (e.g., a phase shifter and/or amplifier) configured to receive control signal 1114 from processing circuitry 1110, which may control a selection of receive antenna elements and/or a phase shift pattern for reception of RF signals using RX 1130.

Figure 12:
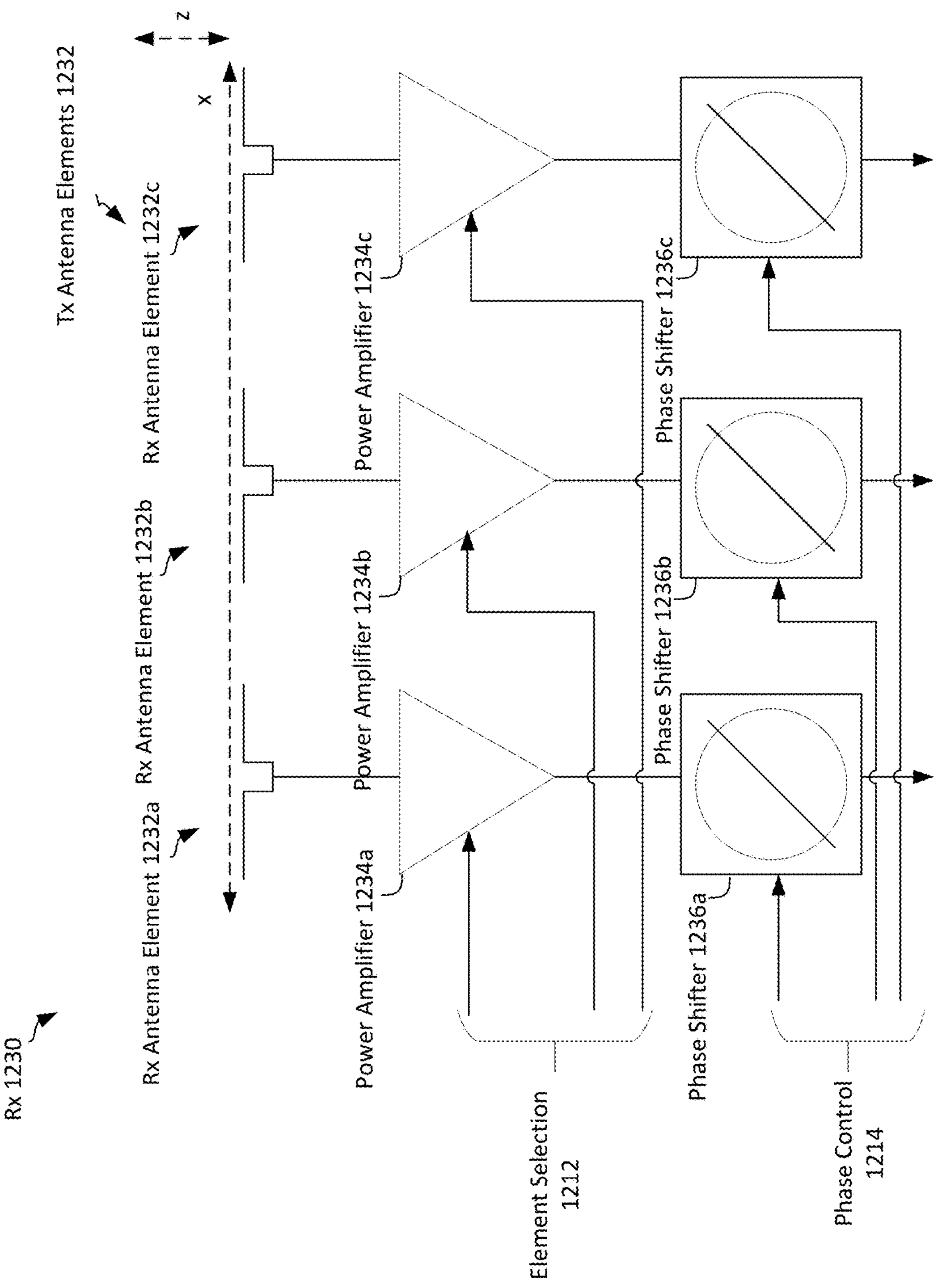
FIG. 12 illustrates an example receiver that may be included in the radar device of FIG. 11, in accordance with some embodiments of the technology described herein.

FIG. 12 illustrates an example RX 1230 that may be included in radar device 1100, in accordance with some embodiments of the technology described herein.

In some embodiments, RX 1230 may include a receive antenna array including a plurality of receive antenna elements 1232, which may be arranged in a dimension of the receive antenna array. For example, as shown in FIG. 12, receive antenna elements 1232 are arranged along the x-axis, which may be an azimuth dimension of the receive antenna array. For instance, the azimuth dimension of the receive antenna array may be longer than the elevation dimension of the receive antenna array, such as in the example of FIG. 4, though it should be appreciated that other array configurations are possible. In some embodiments, a transmitter (e.g., 820) of the radar device may further include a transmit antenna array including transmit antenna elements (e.g., 822) arranged along a dimension of the transmit antenna array that is orthogonal to the dimension of the receive antenna array. For example, as in the example of FIG. 8, the transmit antenna array may have transmit antenna elements (e.g., 822) arranged along the elevation dimension.

In some embodiments, RX configurations selectable by processing circuitry (e.g., 1110) may specify a plurality of different subsets of receive antenna elements 1232, and the RX configuration(s) selected by the processing circuitry may specify at least one subset of the plurality of different subsets. For example, selecting different subsets of receive antenna elements 1232 may control the beamwidth of receive beams in which the receive antenna array receives RF transmit signals, such as described further herein. In some embodiments, when selected, RX 1230 may be configured to receive the RF receive signal(s) using the specified subset(s). For example, as shown in FIG. 12, receive circuitry of RX 1230 includes power amplifiers 1234*a*, 1234*b*, and 1234*c* respectively coupled to receive antenna elements 1232*a*, 1232*b*, and 1232*c* respectively. For instance, power amplifiers 1234*a*, 1324*b*, and/or 1324*c* may be selectable to enable and/or disable reception via the respective receive antenna elements 1232*a*, 1232*b*, and/or 1232*c* based on an element selection control signal 1212 (e.g., including and/or based on element selection control signal 1114), such as by enabling and/or disabling operation of the respective amplifier 1234*a*, 1234*b*, and/or 1234*c*.

In some embodiments, RX configurations selectable by processing circuitry (e.g., 1110) may specify a plurality of different phase shift patterns for receiving the RF receive signal(s) via receive antenna elements 1232, and the RX configuration(s) selected by the processing circuitry may specify at least one phase shift pattern of the plurality of different phase shift patterns. For example, selecting different receive phase shift patterns may control the angular direction in which reception is focused, such as described further herein. In some embodiments, when selected, RX 1230 may be configured to receive the RF receive signal(s)

according to the specified phase shift pattern(s). For example, as shown in FIG. 12, receive circuitry of Rx 1230 includes phase shifters 1236*a*, 1236*b*, and 1236*c* respectively coupled to receive antenna elements 1232*a*, 1232*b*, and 1232*c*. For instance, phase shifters 1236*a*, 1236*b*, and 1236*c* may be configured to apply a phase shift to an RF receive signal received by the respective receive antenna elements 1232*a*, 1232*b*, and 1232*c* based on a phase control signal 1214 (e.g., including and/or based on control signal 1114), such as by introducing a controllable amount of phase shift to RF signals input to the respective phase shifter 1236*a*, 1236*b*, and 1236*c*.

Figure 13A:
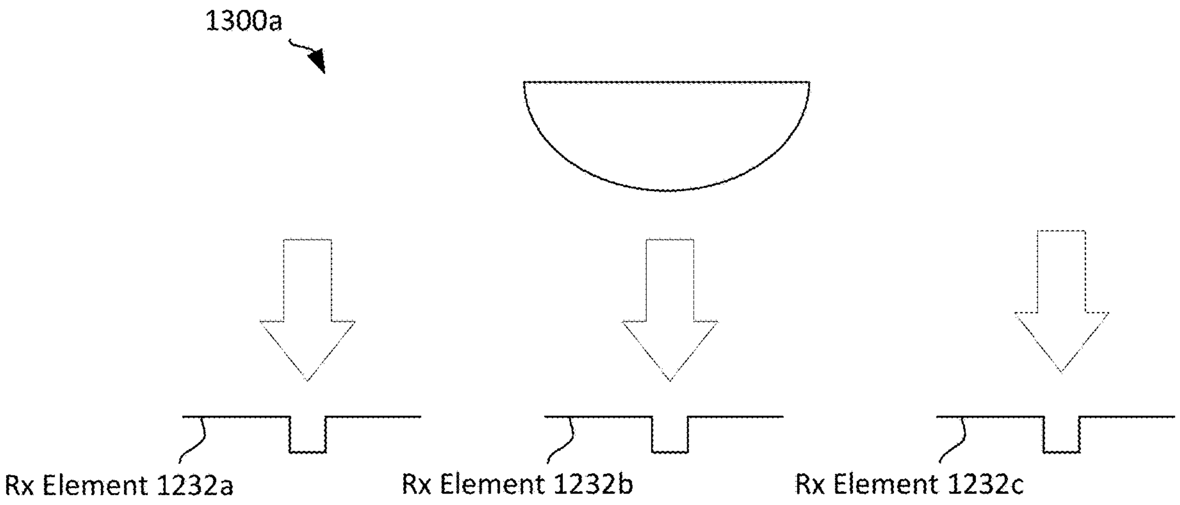
FIG. 13A illustrates example operation of the receiver of FIG. 12 according to a receiver configuration using a first subset of receive antenna elements, in accordance with some embodiments of the technology described herein.

FIG. 13A illustrates example operation of RX 1230 according to a RX configuration 1300*a* using a first subset of receive antenna elements 1232, in accordance with some embodiments of the technology described herein.

As shown in FIG. 13A, each receive antenna element 1232*a*, 1232*b*, and 1232*c* receives an RF receive signal via a receive beam. For instance, power amplifiers 1234*a*, 1234*b*, and 1234*c* may be configured to enable the respective receive antenna elements 1232*a*, 1232*b*, and 1232*c* in response to the element selection control signal 1212.

Figure 13B:
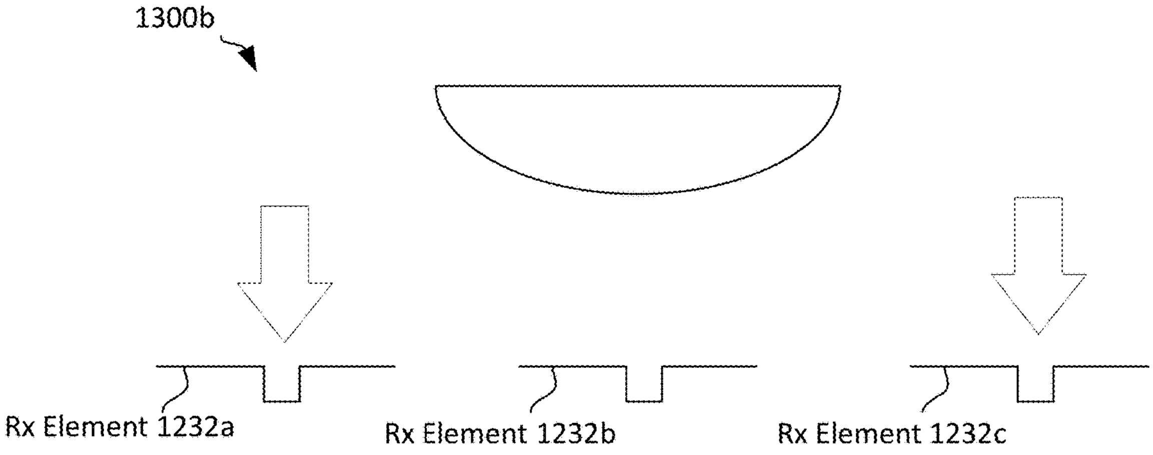
FIG. 13B illustrates example operation of the receiver of FIG. 12 according to a receiver configuration using a second subset of receive antenna elements, in accordance with some embodiments of the technology described herein.

FIG. 13B illustrates example operation of RX 1230 according to a receiver configuration 1300*b* using a second subset of receive antenna elements 1232, in accordance with some embodiments of the technology described herein.

In some embodiments, the subset(s) specified by a RX configuration may include a first subset of receive antenna elements 1232 and a second subset of receive antenna elements 1232 that is different from the first subset. For example, in RX configuration 1300*a* in FIG. 13A, a first subset of receive antenna elements 1232*a*, 1232*b*, and 1232*c* receive the RF receive signal, whereas in RX configuration 1300*b* in FIG. 13B, a second subset of receive antenna elements 1232*a* and 1232*c* receive the RF receive signal. For instance, the first and second subsets are different in that the second subset omits receive antenna element 1232*b*. In the illustrated embodiment, power amplifier 1234*b* may be configured not to receive an RF receive signal, such as in response to element selection control signal 1212. As a result, in FIG. 13B, the resulting beamwidth of the receive beam is wider than in FIG. 13A, which may provide lower resolution in azimuth than FIG. 13A while using less power.

In some embodiments, RX 1230 may be configured to receive, at a first time, a first RF receive signal of the RF receive signal(s) using the first subset and receive, at a second time after the first time, a second RF receive signal of the RF receive signal(s) using the second subset. For example, RX 1230 may be configured to receive the first RF receive signal using the first subset as shown in FIG. 13A at a first time and to receive the second RF receive signal using the second subset as shown in FIG. 13B at a second time after the first time. For instance, the first RF receive signal and the second RF receive signal may be received during different frames (e.g., each including or a part of a receive sweep over multiple receive beams over time) and/or during a frame (e.g., as part of a same receive sweep over multiple receive beams over time). In some embodiments, processing circuitry (e.g., 1110) of the radar device (e.g., 1100) may be configured to generate a range-cross range image using the first RF receive signal and the second RF receive signal (e.g., where the first RF receive signal and the second RF receive signal are received during a frame).

In some embodiments, RX 1230 may be configured to use a first amount of receive power receiving the first RF receive signal using the first subset of receive antenna elements 1232 and RX 1230 may be configured to use a second amount of receive power that is different from the first amount of receive power receiving the second RF receive signal using the second subset of receive antenna elements 1232. For example, selecting fewer receive antenna elements 1232 in FIG. 13B than in FIG. 13A may use less receive power than with a larger number of receive antenna elements 1232, while resulting in a wider beamwidth in FIG. 13B than in FIG. 13A. Alternatively or additionally, selecting fewer receive antenna elements 1232 may result in fewer receive channels for processing downstream, which may lighten the computational load of receive processing (e.g., Fourier Transform).

Figure 14A:
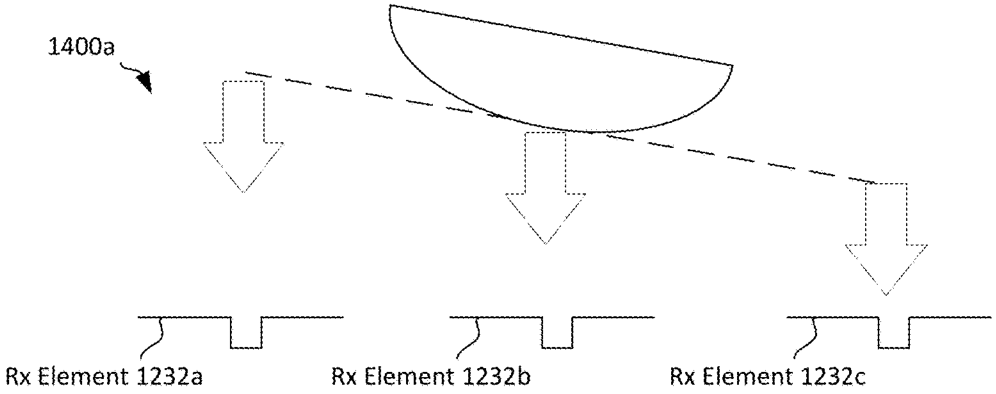
FIG. 14A illustrates example operation of the receiver of FIG. 12 according to a first receive phase shift pattern, in accordance with some embodiments of the technology described herein.

FIG. 14A illustrates example operation of RX 1230 according to a first receive phase shift pattern 1400*a*, in accordance with some embodiments of the technology described herein.

As shown in FIG. 14A, each receive antenna element 1232*a*, 1232*b*, and 1232*c* receives an RF receive signal to produce a receive beam. In the illustrated embodiment, each receive antenna element 1232*a*, 1232*b*, and 1232*c* produces a different phase shifted version of the RF receive signal, resulting in a phase front oriented in a nonzero azimuth angular direction. For instance, phase shifters 1236*a*, 1236*b*, and 1236*c* may be configured to apply different phase shifts in response to the phase shift control signal 1214. In the illustrated embodiment, with a phase front oriented in an angular direction of azimuth, reception may be focused in that direction.

Figure 14B:
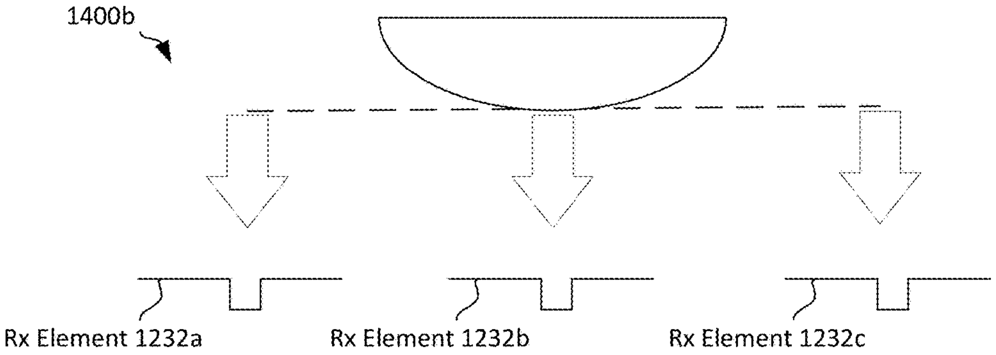
FIG. 14B illustrates example operation of the receiver of FIG. 12 according to a second receive phase shift pattern, in accordance with some embodiments of the technology described herein.

FIG. 14B illustrates example operation of RX 1230 according to a second receive phase shift pattern 1400*b*, in accordance with some embodiments of the technology described herein.

As shown in FIG. 14B, each receive antenna element 1232*a*, 1232*b*, and 1232*c* receives an RF receive signal to produce a receive beam with the same phase version of the RF receive signal, resulting in a phase front oriented at 0 degrees in azimuth. For instance, phase shifters 1236*a*, 1236*b*, and 1236*c* may be configured to apply the same (and/or zero) phase shift in response to the phase shift control signal 1214.

Figure 14C:
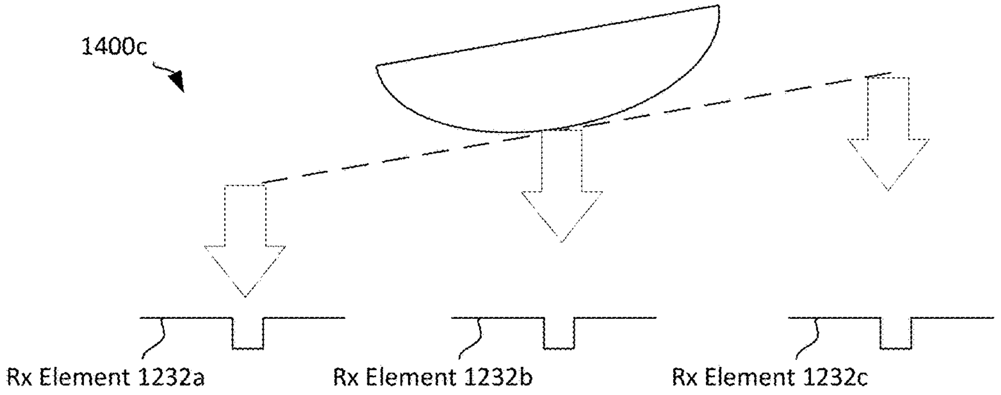
FIG. 14C illustrates example operation of the receiver of FIG. 12 according to a third receive phase shift pattern, in accordance with some embodiments of the technology described herein.

FIG. 14C illustrates example operation of RX 1230 according to a third receive phase shift pattern 1400*c*, in accordance with some embodiments of the technology described herein.

As shown in FIG. 14C, each receive antenna element 1232*a*, 1232*b*, and 1232*c* receives an RF receive signal to produce a receive beam with a different phase shifted version of the RF receive signal, resulting in a phase front oriented in a nonzero azimuth angular direction that is different from the angular direction shown in FIG. 14A. For instance, phase shifters 1236*a*, 1236*b*, and 1236*c* may be configured to apply different phase shifts from one another and with respect to phase shift pattern 1400*a* in response to the phase shift control signal 1214.

In some embodiments, the specified phase shift pattern(s) may include a first phase shift pattern and a second phase shift pattern that is different from the first phase shift pattern. For example, the first phase shift pattern may be one of phase shift patterns 1400*a* and 1400*b* and the second phase shift pattern may be phase shift pattern 1000*b* or 1000*c*, respectively.

In some embodiments, RX 1230 may be configured to receive, at a first time, a first RF receive signal of the RF receive signal(s) according to the first phase shift pattern and receive, at a second time after the first time, a second RF receive signal of the RF receive signal(s) according to the second phase shift pattern. For example, RX 1230 may be configured to receive the first RF receive signal according to phase shift pattern 1400*a* as shown in FIG. 14A at a first time and to receive the second RF receive signal according to phase shift pattern 1400*b* as shown in FIG. 14B at a second time after the first time. For instance, the first RF receive signal and the second RF receive signal may be received during different frames (e.g., each including or a part of a receive sweep over multiple receive beams over time) and/or during a frame (e.g., as part of a same receive sweep over multiple receive beams over time). In some embodiments, the processing circuitry (e.g., 1110) may be configured to generate a range-cross range image using the first RF receive signal and the second RF receive signal (e.g., where the first RF receive signal and the second RF receive signal are received during a frame).

Figure 14D:
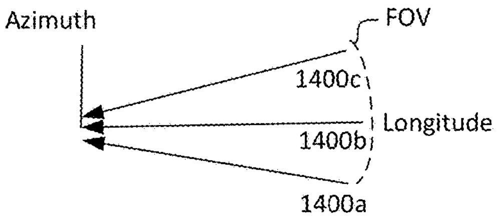
FIG. 14D illustrates angular directions of reception focus in azimuth for the receiver operations of FIGS. 14A, 14B, and 14C, in accordance with some embodiments of the technology described herein.

FIG. 14D illustrates angular directions of reception focus in azimuth for receive phase shift patterns 1400*a*, 1400*b*, and 1400*c*, respectively, in accordance with some embodiments of the technology described herein.

In some embodiments, the specified phase shift pattern(s) may be configured to perform an angular receive sweep over an angular field of view including a first angular direction and a second angular direction different from the first angular direction. For example, according to phase shift pattern 1400*a*, RX 1230 may be configured to focus reception of a first RF receive signal in the first angular direction and, according to phase shift pattern 1400*b*, RX 1230 may be configured to focus reception of the second RF receive signal in the second angular direction. For instance, as shown in FIG. 14D, the angular directions of phase shift patterns 1400*a*, 1400*b*, and 1400*c* are different in the azimuth-longitude plane, with phase shift patterns 1000*a* and 1000*c* above and below 0 degrees in azimuth and phase shift pattern 1000*b* at 0 degrees in azimuth, along the longitudinal axis.

In some embodiments, RX configurations selectable by processing circuitry (e.g., 1110) may specify a plurality of different subsets of receive antenna elements 1232 and a plurality of different phase shift patterns applied to respective ones of the plurality of different subsets, and the RX configuration(s) selected by the processing circuitry may specify at least one subset of the plurality of different subsets and at least one phase shift pattern applied to the at least one subset. For example, a RX configuration may specify a subset (e.g., receive antenna elements 1232*a* and 1232*c* as in FIG. 13B) and a phase shift pattern (e.g., 1400*a*), which may result in a beamwidth and a direction of focus. In some embodiments, RX 1230 may be configured to receive the RF receive signal(s) using the specified subset(s) according to the specified phase shift pattern(s). In some embodiments, RX 1230 may be configured to receive the RF receive signal(s) using the specified subset(s) according to the specified phase shift pattern(s). For example, selection of a subset of receive antenna elements 1232 may be in response to element selection control signal 1212 and a phase shift pattern may be in response to phase shift control signal 1214.

V. Selection of Frame Rates

As mentioned above, the inventors have developed techniques for using a radar device based on situational awareness indicative of at least one characteristic of a vehicle. For example, situational awareness data indicative of a characteristic of a vehicle, a target object, and/or an environment of the vehicle may be used to operate a radar device in a manner appropriate for the situation. The inventors have recognized that a frame rate may be selected based on situational awareness data to balance a frequency at which radar images are generated with constraints on available power. For instance, a high frame rate may produce more radar images over time than a low frame rate, though a high frame rate may consume more power than a low frame rate due to potentially transmitting and receiving more RF signals to produce more radar images over time.

Some embodiments provide a method of using a radar device (e.g., 1500 in FIG. 15) to generate a range-cross range image of a target object (e.g., 206 in FIG. 2A). For example, the radar device may be configured in the manner described herein for radar device 200 including in connection with FIGS. 2A-3B, including processing circuitry (e.g., 1510), a TX (e.g., 1520), and a RX (e.g., 1530).

In some embodiments, the method may include using processing circuitry (e.g., 1510) of the radar device (e.g., 1500), obtaining situational awareness data for a vehicle (e.g., 300 in FIG. 3A), the situational awareness data being indicative of at least one characteristic of the vehicle, at least one characteristic of the target object, and/or at least one characteristic of an environment of the vehicle. For example, the situational awareness data may be as described herein including in connection with FIGS. 2A-3B.

In some embodiments, the method may include, using the processing circuitry (e.g., 1510), selecting a frame rate (e.g., $1/t_f$ in FIG. 16) based on the situational awareness data for the vehicle.

In some embodiments, the method may include, using the processing circuitry (e.g., 1510), generating a plurality of range-cross range images corresponding to a respective plurality of frames defined by the frame rate. For example, generating the plurality of range-cross range images may include, for each frame of the plurality of frames, generating a respective range-cross range image using RF signals received by the radar device (e.g., 1500) during the frame. Alternatively, generating the images may include, for each of only some frames, generating a respective image using RF signals received by the radar device (e.g., 1500) during the frame.

In some embodiments, generating the range-cross range images may include, for a particular frame of the plurality of frames, generating a respective range-cross range image using one or more RF signals received by the radar device (e.g., 1500) during the particular frame. For example, the RF signal(s) may be generated at least in part by reflection of one or more RF transmit signals, which may be transmitted during the frame, though it is possible that an RF transmit signal may be transmitted before the frame and result in an RF signal being received during the frame (e.g., depending on the range of the object from which the RF signal is reflected). For instance, multiple RF signals may be received during a frame, such as resulting from an angular transmit and/or receive sweep during the frame, though in some cases only a single RF signal may be transmitted and/or received.

In some embodiments, the method may include, using the processing circuitry (e.g., 1510), outputting the plurality of range-cross range images. For example, the images may be output to a display (e.g., 350 in FIG. 3A) and/or a computer-assisted driving module (e.g., 352 in FIG. 3A), such as of a vehicle (e.g., 300) on which the radar device (e.g., 1500) is positioned.

In some embodiments, generating the respective image may include transmitting, using a RX (e.g., 1520) of the radar device (e.g., 1500), one or more RF transmit signals (e.g., transmit signals 1620 in FIG. 16) and receiving, during the particular frame, using a RX (e.g., 1530) of the radar device (e.g., 1500), the RF signal(s) (e.g., receive signals 1620) generated at least in part by reflection of the RF transmit signal(s) (e.g., 1610) from the target object. For example, transmitting the RF transmit signal(s) (e.g., 1610) may include transmitting a first RF transmit signal (e.g., 1612 in FIG. 16) of the RF transmit signal(s) and transmitting a second RF transmit signal (e.g., 1614) of the RF transmit signal(s), and the RF signal(s) may be generated at least in part by reflection of the first RF transmit signal (e.g., receive signal 1622) and/or the second RF transmit signal (e.g., receive signal 1624) from the target object. For instance, the first RF transmit signal and the second RF transmit signal may be transmitted during the particular frame and/or at times that would cause RF signal(s) reflected from a target object to reach the radar device (e.g., 1500) during the particular frame.

In some embodiments, the TX (e.g., 820 in FIG. 8) may include a transmit antenna array including a plurality of transmit antenna elements (e.g., 822) arranged along a dimension (e.g., elevation) of the transmit antenna array, transmitting the first RF transmit signal (e.g., 1612) may use a first subset of the plurality of transmit antenna elements (e.g., 822*a*, 822*b*, and 822*c*), and transmitting the second RF transmit signal (e.g., 1624) may use a second subset of the plurality of transmit antenna elements (e.g., 822*a* and 822*c*) that is different from the first subset of the plurality of transmit antenna elements.

In some embodiments, the TX (e.g., 820) may include a transmit antenna array including a plurality of transmit antenna elements (e.g., 822) arranged along a dimension (e.g., elevation) of the transmit antenna array, and transmitting the first RF transmit signal (e.g., 1612) may be via the plurality of transmit antenna elements (e.g., 822) according to a first transmit phase shift pattern (e.g., 1000*a* in FIG. 10A) and transmitting the second RF transmit signal (e.g., 1614) may be via the plurality of transmit antenna elements (e.g., 822) according to a second transmit phase shift pattern (e.g., 1000*b* in FIG. 10B) that is different from the first transmit phase shift pattern.

In some embodiments, the TX (e.g., 822) may include a transmit antenna array including a plurality of transmit antenna elements (e.g., 822) arranged along a dimension (e.g., elevation) of the transmit antenna array, and transmitting the first RF transmit signal (e.g., 1612) may be via the plurality of transmit antenna elements (e.g., 822) according to a first transmit power level (e.g., FIG. 9A) and transmitting the second RF transmit signal (e.g., 1614) may be via the plurality of transmit antenna elements (e.g., 822) according to a second transmit power level (e.g., FIG. 9B) that is different from the first transmit power level.

In some embodiments, the RF transmit signal(s) may have frequency content in a frequency band of 300 GHz-3 THz.

In some embodiments, the RX (e.g., 1230) may include a receive antenna array including a plurality of receive antenna elements (e.g., 1232) arranged along a dimension (e.g., azimuth) of the receive antenna array, and receiving the RF signal(s) (e.g., 1620) may include using a first subset (e.g., 1232*a*, 1232*b*, and 1232*c*) of the plurality of receive antenna elements during a first time period within the particular frame and using a second subset (e.g., 1232*a* and 1232*c*) of the plurality of receive antenna elements during a second time period that is after the first time period and within the particular frame, the second subset (e.g., 1232*a* and 1232*c*) of the plurality of receive antenna elements being different from the first subset (e.g., 1232*a*, 1232*b*, and 1232*c* of the plurality of receive antenna elements, and the RF signal(s) (e.g., 1620) may be received during the first time period and/or the second time period.

In some embodiments, the RX (e.g., 1230) may include a receive antenna array including a plurality of receive antenna elements (e.g., 1232) arranged along a dimension (e.g., azimuth) of the receive antenna array, and receiving the RF signals (e.g., 1620) may include operating the plurality of receive antenna elements (e.g., 1232) according to a first receive phase shift pattern (e.g., 1400*a*) during a first time period within the particular frame and operating the plurality of receive antenna elements (e.g., 1232) according to a second receive phase shift pattern (e.g., 1400*b*) during a second time period that is after the first time period and within the particular frame, the second receive phase shift pattern (e.g., 1400*b*) being different from the first receive phase shift pattern (e.g., 1400*a*), and the RF signal(s) (e.g., 1620) may be received during the first time period and/or the second time period.

Figure 15:
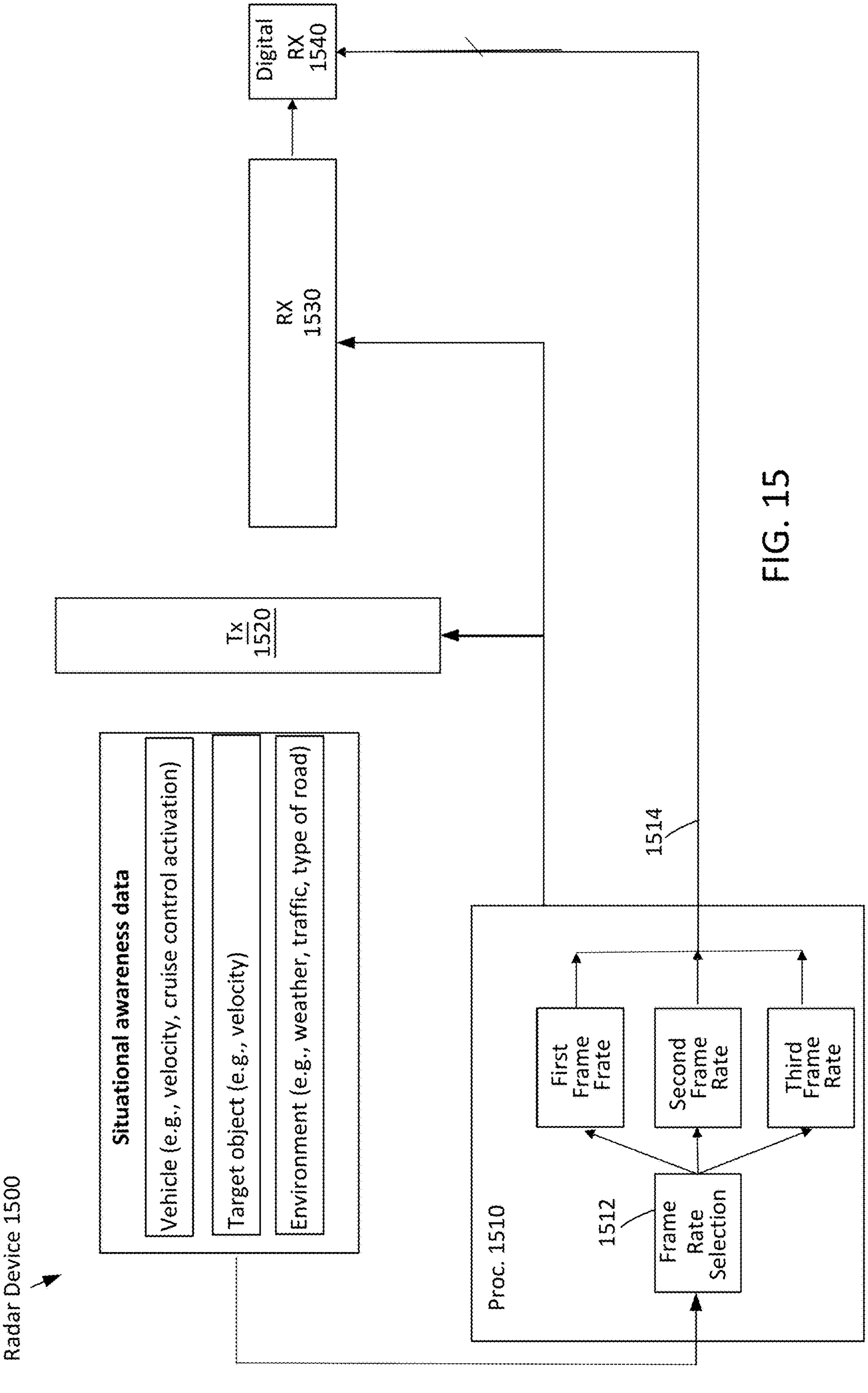
FIG. 15 illustrates an example radar device having processing circuitry configured to select among frame rates for operating the radar device, in accordance with some embodiments of the technology described herein.

FIG. 15 illustrates an example radar device 1500 having processing circuitry 1510 configured to select among frame rates for operating the radar device 1500, in accordance with some embodiments of the technology described herein.

In some embodiments, processing circuitry 1510 may be configured to obtain situational awareness data for a vehicle (e.g., 300 in FIG. 3A), the situational awareness data being indicative of at least one characteristic of the vehicle, at least one characteristic of the target object, and/or at least one characteristic of an environment of the vehicle, such as described herein for processing circuitry 210 including in connection with FIGS. 3A-3B.

In some embodiments, processing circuitry 1510 may be configured to select a frame rate based on the situational awareness data for the vehicle (e.g., 300). For example, as shown in FIG. 15, processing circuitry 1510 includes frame rate selection circuitry 1512, which may be configured to select one or more frame rates based on situational awareness data, such as described herein for processing circuitry 210. For instance, the situational awareness data may be indicative of at least one characteristic of the vehicle (e.g., 300), at least one characteristic of the target object, and/or at least one characteristic of the environment of the vehicle.

In some embodiments, processing circuitry 1510 may be configured to generate a plurality of range-cross range images corresponding to a respective plurality of frames defined by the frame rate and output the range-cross range images. For example, as shown in FIG. 15, radar device 1500 includes TX 1520, which may be configured to transmit RF signals, and RX 1530, which may be configured to receive RF signals generated at least in part by reflection of the transmitted RF signals from a target object.

Figure 16:
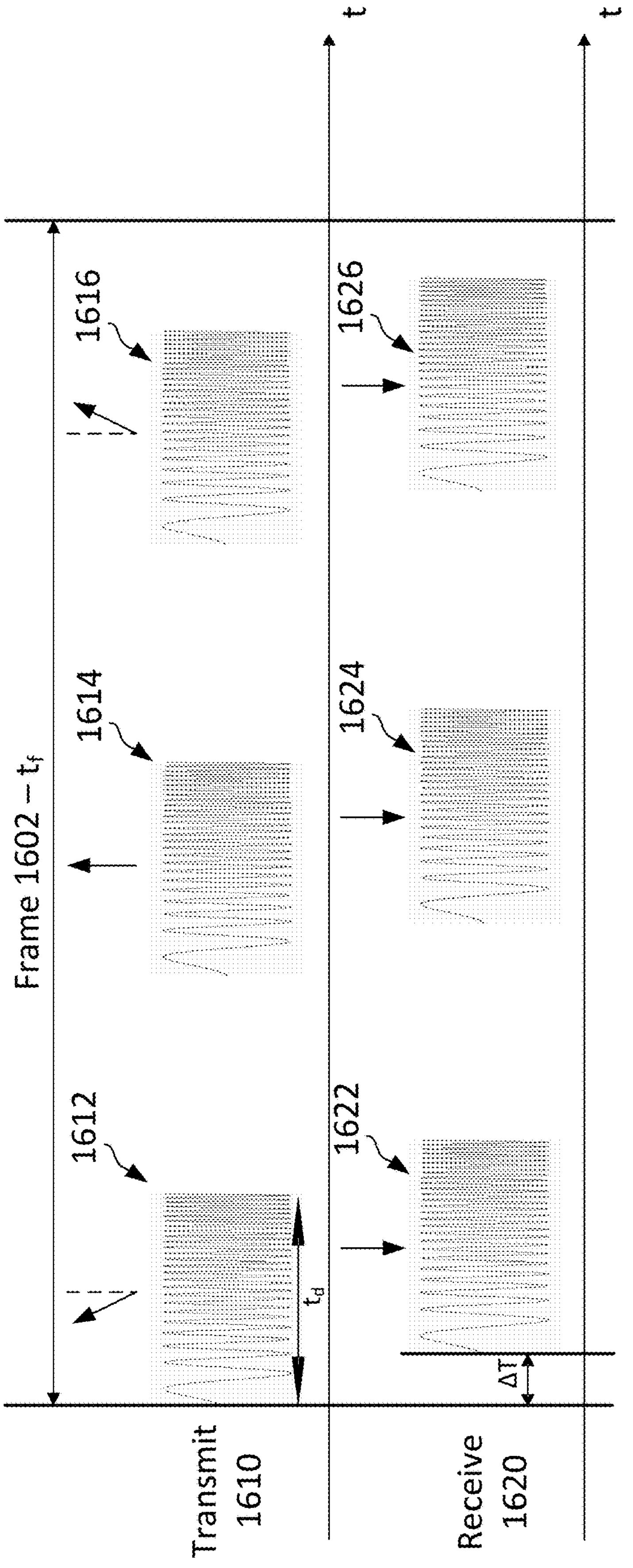
FIG. 16 illustrates transmission and reception of RF signals during a frame according to a frame rate, in accordance with some embodiments of the technology described herein.

FIG. 16 illustrates transmission and reception of RF signals 1610, 1620 by radar device 1500 during a frame 1602 according to a frame rate, in accordance with some embodiments of the technology described herein. For example, in FIG. 16, the frame 1602 has a frame duration $t_f$ which may be the reciprocal of the frame rate selected by processing circuitry 1510. For instance, the frame duration $t_f$ may be 50 ms for a 20 FPS frame rate or 100 ms for a 10 FPS frame rate.

In some embodiments, processing circuitry 1510 may be configured to, for a particular frame 1602 of a plurality of frames, generate a respective range-cross range image using one or more RF signals 1620 received by radar device 1500 during the particular frame 1602. For example, TX 1520 may be configured to transmit one or more RF transmit signals 1610 and RX 1530 may be configured to receive, during the particular frame, RF signal(s) 1620 generated at least in part by reflection of the RF transmit signal(s) 1610 from a target object. For instance, TX 1520 may be configured to transmit a first RF transmit signal 1612 of the RF transmit signal(s) 1610 and transmit a second RF transmit signal 1614 of the RF transmit signal(s) 1610, and the RF signal(s) 1620 may be generated at least in part by reflection of the first RF transmit signal 1612 and/or the second RF transmit signal 1614 from the target object. In the illustrated embodiment, a first RF receive signal 1622 may be generated at least in part by reflection of the first RF transmit signal 1612, a second RF receive signal 1624 may be generated at least in part by reflection of the second RF transmit signal 1614, and a third RF receive signal 1626 may be generated at least in part by reflection of a third RF transmit signal 1616. It should be appreciated that not every RF transmit signal may correspond to a received RF signal, for instance, since not every RF transmit signal may be reflected by a target object within a longitudinal range of the radar device 1500 (e.g., depending on the amount of transmit power used, the direction of focus of the RF transmission, and the presence, absence, and/or location of target objects in the environment).

In some embodiments, TX 1520 may be configured to transmit the RF transmit signal(s) 1610 during the particular frame 1602 and/or at times that would cause RF signal(s) 1620 reflected from a target object to reach the radar device 1500 during the particular frame 1602. For example, in FIG. 16, each RF transmit signal 1610 is shown being transmitted during the particular frame 1602, though it should be appreciated that an RF transmit signal 1610 (e.g., 1612) may be transmitted, at least in part, before the particular frame 1602 while still producing an RF receive signal (e.g., 1622) to be received during the particular frame 1602.

In some embodiments, processing circuitry 1510 may be configured to, for each frame of the plurality of frames, generate a respective range-cross range image using RF signals received by the radar device 1500 during the frame. For example, while a single frame 1602 is shown in FIG. 16, RF signals (e.g., 1620) may be received during each of a plurality of frames and images may be generated using the RF signals.

In some embodiments, TX 1520 may include a transmit antenna array including transmit antenna elements (e.g., 822) arranged along a dimension (e.g., elevation) of the transmit antenna array, such as described herein including in connection with FIGS. 8-10D. As one example, TX 1520 may be configured to transmit the first RF transmit signal 1612 via the transmit antenna elements according to a first transmit power level and transmit the second RF transmit signal 1614 via the transmit antenna elements according to a second transmit power level that is different from the first transmit power level, such as described herein including in connection with FIGS. 9A-9B. For instance, the RF transmit signals 1612 and 1614 may be transmitted with different longitudinal ranges.

As another example, TX 1520 may be configured to transmit the first RF transmit signal 1612 using a first subset (e.g., 822*a*, 822*b*, and 822*c*) of the transmit antenna elements and transmit the second RF transmit signal 1614 using a second subset (e.g., 822*a* and 822*c*) of the plurality of transmit antenna elements that is different from the first subset of the plurality of transmit antenna elements, such as described herein including in connection with FIGS. 9B-9C. For instance, the first RF transmit signal 1612 may be transmitted with a wider or narrower transmit beamwidth than the second RF transmit signal 1614, such as for less or greater amounts of resolution (e.g., in elevation).

As another example, TX 1520 may be configured to transmit the first RF transmit signal 1612 via the transmit antenna elements according to a first transmit phase shift pattern (e.g., 1000*a* in FIG. 10A) and transmit the second RF transmit signal 1614 via the transmit antenna elements according to a second transmit phase shift pattern (e.g., 1000*b* in FIG. 10B) that is different from the first transmit phase shift pattern, such as described herein including in connection with FIGS. 10A-10C. For instance, transmission of the first RF transmit signal 1612 may be focused in a first angular direction (e.g., in elevation) and transmission of the second RF transmit signal 1614 may be focused in a second angular direction (e.g., in elevation). In some embodiments, an angular sweep of transmission may be performed within a frame according to the selected frame rate.

In some embodiments, the RF transmit signal(s) may have frequency content in a frequency band of 300 GHz-3 THz. In the illustrated embodiment, RF transmit signal 1612 has a pulse duration td, which together with the bandwidth of the RF transmit signal 1612 may define the range resolution available from the RF transmit signal 1612. For instance, the waveform type of RF transmit signal 1612 may be set based on situational awareness data, such as described herein including in connection with FIGS. 5A-6D.

In some embodiments, RX 1530 may include a receive antenna array including receive antenna elements (e.g., 1232) arranged along a dimension of the receive antenna array. As one example, RX 1530 may be configured to use a first subset (e.g., 1232*a*, 1232*b*, and 1232*c*) of the plurality of receive antenna elements during a first time period within the particular frame (e.g., during which receive signal 1622 is received) and use a second subset (e.g., 1232*a* and 1232*c*) of the plurality of receive antenna elements that is different from the first subset of the plurality of receive antenna elements during a second time period that is after the first time period and within the particular frame (e.g., during which receive signal 1614 is received). For instance, reception during the first time period have a wider or narrower receive beamwidth than during the second time period, such as for less or greater amounts of resolution (e.g., in azimuth). In some embodiments, RX 1530 may be configured to receive the RF signal(s) 1622, 1624 during the first time period and/or the second time period, (e.g., respectively).

As another example, RX 1530 may be configured to operate according to a first receive phase shift pattern (e.g., 1400*a*) during a first time period within the particular frame and operate according to a second receive phase shift pattern (e.g., 1400*b*) that is different from the first receive phase shift pattern during a second time period that is after the first time period and within the particular frame. For instance, while not shown in FIG. 16, reception during the first time period (e.g., of the first RF receive signal 1622) may be focused in a first angular direction (e.g., in azimuth) and reception during the second time period (e.g., of the second RF receive signal 1624) may be focused in a second angular direction (e.g., in azimuth), such as described herein for RF transmit signals 1612 and 1614. In some embodiments, RX 1530 may be configured to receive the RF signal(s) 1622, 1624 during the first time period and/or the second time period (e.g., respectively). For instance, an angular sweep of reception may be performed over multiple time periods within a frame according to the selected frame rate.

VI. Example Radar Operational Configurations

Figure 17:
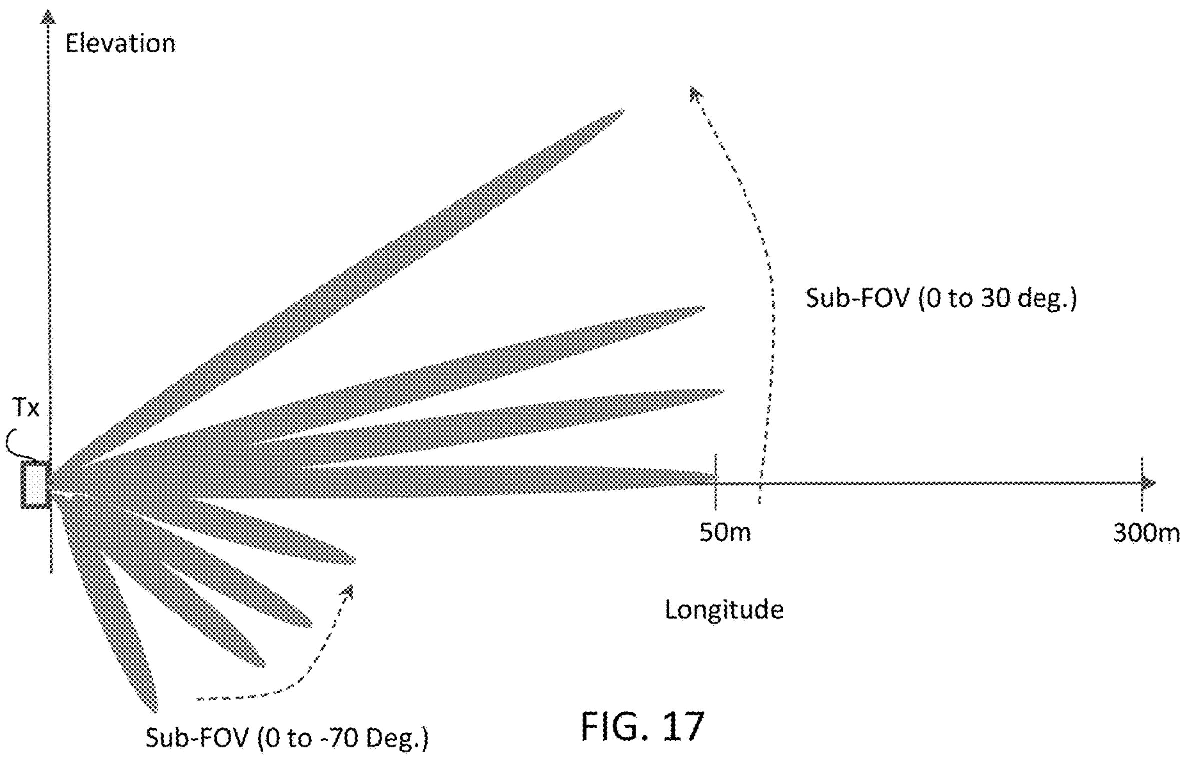
FIG. 17 illustrates example operation of a transmitter of a radar device according to a transmitter configuration of a first radar operational configuration, in accordance with some embodiments of the technology described herein.

FIG. 17 illustrates example operation of a RX of a radar device according to a TX configuration of a first radar operational configuration, in accordance with some embodiments of the technology described herein.

In some embodiments, the first radar operational configuration may be selected based on situational awareness data indicating that a vehicle is traveling at low speed and/or in a parking mode of operation. For example, as shown in FIG. 17, the illustrated TX configuration specifies, during a frame (e.g., at 20 FPS), an angular field of view sweep in elevation from −70 degrees to 30 degrees (e.g., with 0 degrees being normal to the plane of the transmit antenna array), such as by transmitting an RF signal using each illustrated transmit beam in sequence (e.g., over a time period of 6 milliseconds). For instance, the angular field of view may be divided between a first sub-FOV from −70 degrees to 0 degrees, having a longitudinal range of 5 meters (e.g., using near-field radiation) and a second sub-FOV from 0 degrees to 30 degrees having a longitudinal range of 50 meters. In some embodiments, the angular field of view shown in FIG. 17 may be obtained using a selected transmit phase shift pattern that focuses transmission in each illustrated transmit beam. In some embodiments, the difference in longitudinal range between the first sub-FOV and the second sub-FOV may be obtained by using a first transmit power level for the first sub-FOV that is lower than a second transmit power level for the second sub-FOV. In some embodiments, the beamwidths of the illustrated transmit beams may be substantially equal, such as by using a same subset of transmit antenna elements for each transmitted RF signal.

In some embodiments, the first radar operational configuration may specify transmitting different RF transmit signals for the first sub-FOV and the second sub-FOV. For example, a first RF transmit signal having a pulse duration of 33 microseconds and bandwidth of 5 GHz may be used for the first sub-FOV and a second RF transmit signal having a pulse duration of 330 microseconds and bandwidth of 5 GHz may be used for the second sub-FOV, such as due to the shorter range of the first sub-FOV. While eight transmit beams are shown in FIG. 17, fewer or greater numbers of transmit beams may be used, such as 10 or 15 transmit beams.

Figure 18:
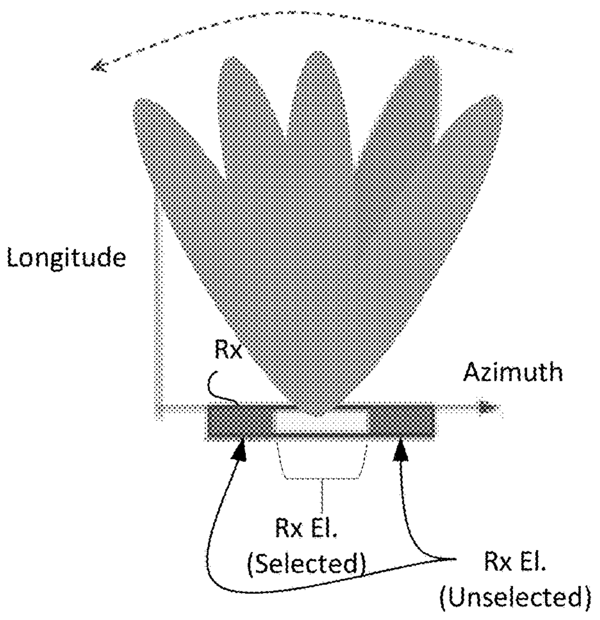
FIG. 18 illustrates example operation of a receiver of the radar device of FIG. 17 according to a receiver configuration of the first radar operational configuration, in accordance with some embodiments of the technology described herein.

FIG. 18 illustrates example operation of a RX of the radar device of FIG. 17 according to a RX configuration of the first radar operational configuration, in accordance with some embodiments of the technology described herein.

As shown in FIG. 18, the illustrated RX configuration specifies, during the frame (e.g., responsive to reflection of the transmit beams of FIG. 17), an angular field of view sweep in azimuth from −90 degrees to 90 degrees (e.g., with 0 degrees being normal to the plane of the receive antenna array), such as by receiving any RF receive signals (if present) using each illustrated receive beam in sequence. In some embodiments, the angular field of view shown in FIG. 18 bay be obtained using a selected receive phase shift pattern that focuses reception in each illustrated receive beam. In some embodiments, the beamwidths of the illustrated receive beams may be substantially equal, such as by using a same subset of receive antenna elements for each receive beam. In the illustrated embodiment, a subset including fewer than all (e.g., half) of receive antenna elements may be selected for reception during each beam, resulting in moderate (e.g., half) spatial resolution in azimuth, such as due to wider beamwidths than if all receive antenna elements were used.

Figure 19:
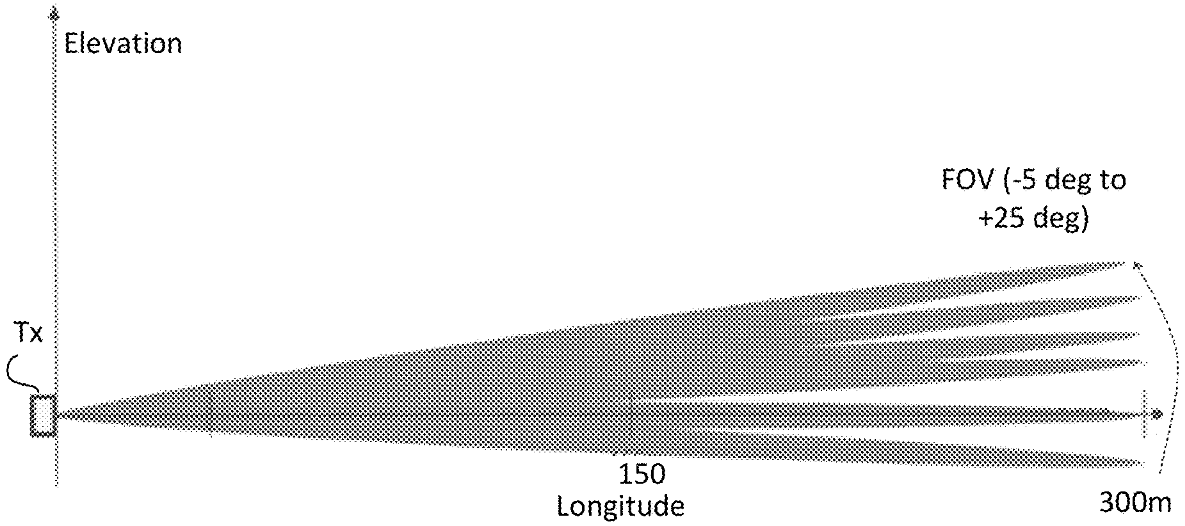
FIG. 19 illustrates example operation of a transmitter of the radar device of FIG. 17 according to a transmitter configuration of a second radar operational configuration, in accordance with some embodiments of the technology described herein.

FIG. 19 illustrates example operation of a RX of the radar device of FIG. 17 according to a RX configuration of a second radar operational configuration, in accordance with some embodiments of the technology described herein.

In some embodiments, the second radar operational configuration may be selected based on situational awareness data indicating that a vehicle is traveling at high speed, on a highway, and/or in a highway mode of operation. For example, as shown in FIG. 19, the illustrated TX configuration specifies, during a frame (e.g., at 20 FPS), an angular field of view sweep in elevation from −5 degrees to 25 degrees, such as by transmitting an RF signal using each illustrated transmit beam in sequence (e.g., over a 6 ms time period). For instance, each illustrated transmit beam may have a longitudinal range of 300 meters. In some embodiments, the angular field of view shown in FIG. 19 may be obtained using a selected transmit phase shift pattern that focuses transmission in each illustrated transmit beam. In some embodiments, a longitudinal range of 300 m may be obtained by using a first transmit power level that provides the same amount of power to the illustrated transmit beams as in the first radar operational configuration but over a smaller number of transmit beams over the same amount of time (e.g., due to the smaller angular field of view). In some embodiments, the beamwidths of the illustrated transmit beams may be substantially equal, such as by using a same subset of transmit antenna elements for each transmitted RF signal.

In some embodiments, the second radar operational configuration may specify transmitting RF transmit signals for each transmit beam having a pulse duration of 1 millisecond and bandwidth of 2.5 GHz, which may provide sufficient range resolution over the longitudinal range of 300 meters. While six transmit beams are shown in FIG. 17, fewer or greater numbers of transmit beams may be used, such as 4 or 8 transmit beams.

Figure 20:
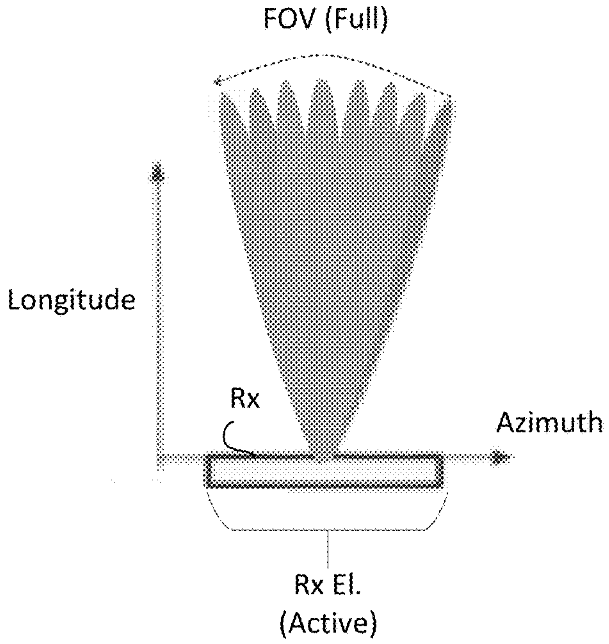
FIG. 20 illustrates example operation of a receiver of the radar device of FIG. 17 according to a receiver configuration of the second radar operational configuration, in accordance with some embodiments of the technology described herein.

FIG. 20 illustrates example operation of a RX of the radar device of FIG. 17 according to a RX configuration of the second radar operational configuration, in accordance with some embodiments of the technology described herein.

As shown in FIG. 20, the illustrated RX configuration specifies, during the frame (e.g., responsive to reflection of the transmit beams of FIG. 19), an angular field of view sweep in azimuth from −90 degrees to 90 degrees (e.g., with 0 degrees being normal to the plane of the receive antenna array), such as by receiving any RF receive signals (if present) using each illustrated receive beam in sequence. In some embodiments, the angular field of view shown in FIG. 20 bay be obtained using a selected receive phase shift pattern that focuses reception in each illustrated receive beam. In some embodiments, the beamwidths of the illustrated receive beams may be substantially equal, such as by using a same subset of receive antenna elements for each receive beam. In the illustrated embodiment, a subset including most or all receive antenna elements may be selected for reception during each beam, resulting in high spatial resolution in azimuth, such as due to narrower beamwidths than if fewer receive antenna elements were used.

Figure 21:
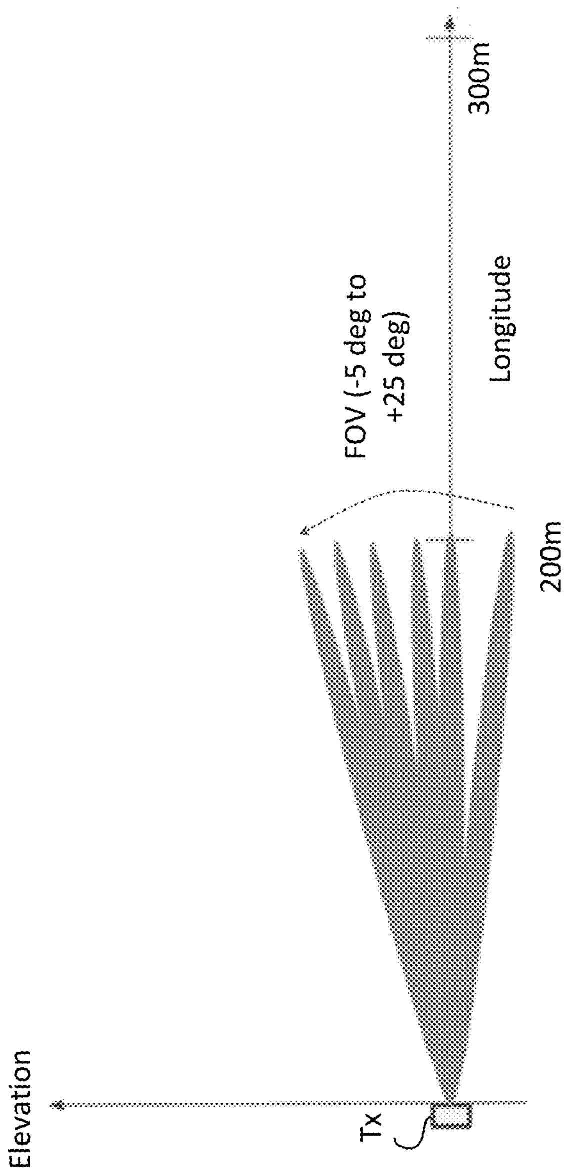
FIG. 21 illustrates example operation of a transmitter of the radar device of FIG. 17 according to a transmitter configuration of a third radar operational configuration, in accordance with some embodiments of the technology described herein.

FIG. 21 illustrates example operation of a TX of the radar device of FIG. 17 according to a TX configuration of a third radar operational configuration, in accordance with some embodiments of the technology described herein.

In some embodiments, the third radar operational configuration may be selected based on situational awareness data indicating that a vehicle is in an anomalous environment, such as above a threshold environmental temperature. For example, as shown in FIG. 21, the illustrated TX configuration specifies, during a frame (e.g., at 10 FPS), an angular field of view sweep in elevation from −5 degrees to 25, such as by transmitting an RF signal using each illustrated transmit beam in sequence (e.g., over a 3 ms time period). For instance, each illustrated transmit beam may have a longitudinal range of 200 meters. In some embodiments, the angular field of view shown in FIG. 21 may be obtained using a selected transmit phase shift pattern that focuses transmission in each illustrated transmit beam. In some embodiments, a longitudinal range of 200 m may be obtained by using a transmit power level that provides the same of power to the illustrated transmit beams as in the second radar operational configuration over the same number of transmit beams but over a shorter amount of time by using a shorter duration RF transmit signal (e.g., with the sequence occurring over 3 ms instead of 6 ms). In some embodiments, the beamwidths of the illustrated transmit beams may be substantially equal, such as by using a same subset of transmit antenna elements for each transmitted RF signal.

In some embodiments, the third radar operational configuration may specify transmitting RF transmit signals for each transmit beam having a pulse duration of 0.5 milliseconds and bandwidth of 1.8 GHz, which may provide sufficient range resolution over the longitudinal range of 200 meters balanced with lower power operation than the second operational configuration. While six transmit beams are shown in FIG. 21, fewer or greater numbers of transmit beams may be used, such as 4 or 8 transmit beams.

In some embodiments the third radar operational configuration may use the same RX configuration as the second radar operational configuration, such as shown in FIG. 20.

In some embodiments, the third radar operational configuration may further specify a frame rate that is lower than the first radar operational configuration and the second radar operational configuration. For example, the third radar operational configuration may specify a frame rate that is half the frame rates of the first radar operational configuration and the second radar operational configuration. For instance, at a frame rate of 20 FPS, a 6 ms transmit and receive sequence of the second radar operational configuration may be performed every 50 ms, whereas at a frame rate of 10 FPS, a 3 ms transmit and receive sequence of the third radar operational configuration may be performed every 100 ms, thereby using less power over time.

Figure 22:
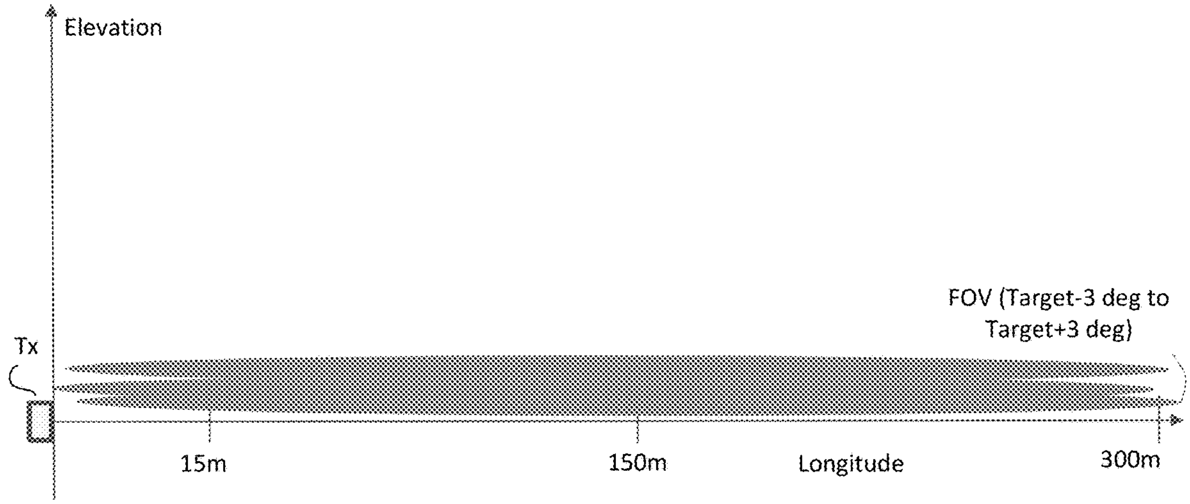
FIG. 22 illustrates example operation of a transmitter of the radar device of FIG. 17 according to a transmitter configuration of a fourth radar operational configuration, in accordance with some embodiments of the technology described herein.

FIG. 22 illustrates example operation of a TX of the radar device of FIG. 17 according to a TX configuration of a fourth radar operational configuration, in accordance with some embodiments of the technology described herein.

In some embodiments, the fourth radar operational configuration may be selected based on situational awareness data indicating that a target object has been detected, such as a small object (e.g., a tire, a boulder) and/or a vulnerable road user (e.g., a pedestrian and/or cyclist). For example, as shown in FIG. 22, the illustrated TX configuration specifies, during a frame (e.g., at 20 FPS), an angular field of view sweep in elevation from 3 degrees below the detected elevation of the target object to 3 degrees above the detected elevation of the target object, such as by transmitting an RF signal using each illustrated transmit beam in sequence (e.g., over a 6 ms time period). For instance, each illustrated transmit beam may have a longitudinal range of 300 meters. In some embodiments, the angular field of view shown in FIG. 22 may be obtained using a selected transmit phase shift pattern that focuses transmission in each illustrated transmit beam. In some embodiments, a longitudinal range of 300 m may be obtained by using a transmit power level that provides power to the illustrated transmit beams over a small number of transmit beams. In some embodiments, the beamwidths of the illustrated transmit beams may be substantially equal, such as by using a same subset of transmit antenna elements for each transmitted RF signal.

In some embodiments, the second radar operational configuration may specify transmitting RF transmit signals for each transmit beam having a pulse duration of 1 millisecond and bandwidth of 2.5 GHz, which may provide sufficient range resolution over the longitudinal range of 300 meters. While three transmit beams are shown in FIG. 22, fewer or greater numbers of transmit beams may be used, such as 2 or 6 transmit beams.

Figure 23:
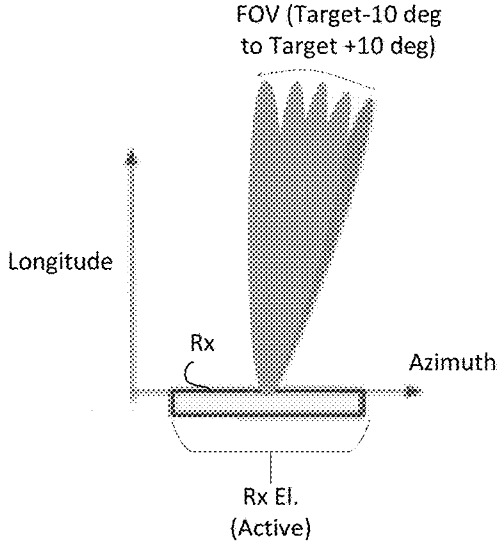
FIG. 23 illustrates example operation of a receiver of the radar device of FIG. 17 according to a receiver configuration of the fourth radar operational configuration, in accordance with some embodiments of the technology described herein.

FIG. 23 illustrates example operation of a RX of the radar device of FIG. 17 according to a RX configuration of the fourth radar operational configuration, in accordance with some embodiments of the technology described herein.

As shown in FIG. 23, the illustrated RX configuration specifies, during the frame (e.g., responsive to reflection of the transmit beams of FIG. 22), an angular field of view sweep in azimuth from 10 degrees below the detected azimuth position of the target object to 10 degrees above the detected azimuth position, such as by receiving any RF receive signals (if present) using each illustrated receive beam in sequence. In some embodiments, the angular field of view shown in FIG. 23 may be obtained using a selected receive phase shift pattern that focuses reception in each illustrated receive beam. In some embodiments, the beamwidths of the illustrated receive beams may be substantially equal, such as by using a same subset of receive antenna elements for each receive beam. In the illustrated embodiment, a subset including most or all receive antenna elements may be selected for reception during each beam, resulting in high spatial resolution in azimuth, such as due to narrower beamwidths than if fewer receive antenna elements were used.

VII. Example Computer System

Figure 24:
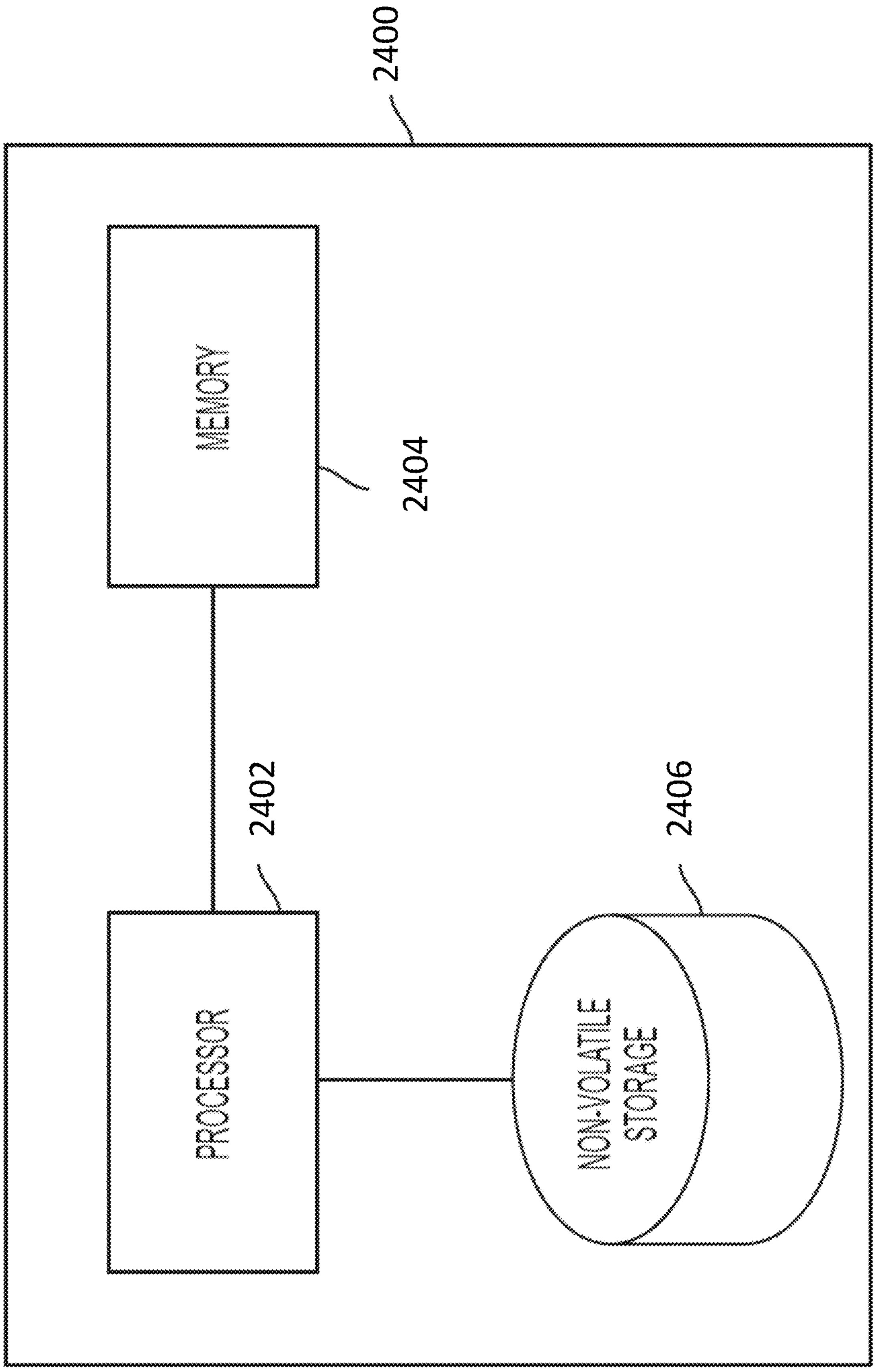
FIG. 24 illustrates an example computer system that may be configured to perform at least some processing operations in the radar devices described herein, in accordance with some embodiments of the technology described herein.

FIG. 24 illustrates an example computer system 2400 that may be configured to perform at least some processing operations in the radar devices described herein, in accordance with some embodiments of the technology described herein.

An illustrative implementation of a computer system 2400 that may be used in connection with any of the embodiments of the disclosure provided herein is shown in FIG. 24. For example, in some embodiments, operations described herein may be performed using the computer system 2400 (e.g., implemented using processing circuitry of a radar device). The computer system 2400 may include one or more processors 2402 and one or more articles of manufacture that comprise non-transitory computer-readable storage media (e.g., memory 2404 and one or more non-volatile storage media 2406). The processor 2402 may control writing data to and reading data from the memory 2404 and the non-volatile storage device 2406 in any suitable manner, as the aspects of the disclosure provided herein are not limited in this respect. To perform any of the functionality described herein, the processor 2402 may execute one or more processor-executable instructions stored in one or more non-transitory computer-readable storage media (e.g., the memory 2404), which may serve as non-transitory computer-readable storage media storing processor-executable instructions for execution by the processor 2402.

VIII. LISTING OF SOME EXAMPLES

Example A1

A method of using a radar device to collect data about a target object, the radar device configured to transmit and/or receive RF signals in a plurality of radar operational configurations, the method comprising: obtaining, by processing circuitry of the radar device, situational awareness data for a vehicle, the situational awareness data being indicative of at least one characteristic of the vehicle, at least one characteristic of the target object, and/or at least one characteristic of an environment of the vehicle; selecting, by the processing circuitry, using the situational awareness data for the vehicle and from among the plurality of radar operational configurations, at least one radar operational configuration to use for collecting the data about the target object; transmitting, using a transmitter of the radar device according to the at least one radar operational configuration, one or more RF transmit signals; and receiving, using a receiver of the radar device according to the at least one radar operational configuration, one or more RF receive signals generated at least in part by reflection of the one or more RF transmit signals from the target object.

Example A2

The method of example A1, wherein the vehicle is a car.

Example A3

The method of example A1 or A2, wherein the situational awareness data comprises data selected from a group consisting of: data indicating a velocity of the vehicle; data indicating that the vehicle is in a cruise control and/or lane departure prevention mode; data indicating that the vehicle is parking; data indicating that the vehicle is on a highway; data indicating a low power level of the vehicle; data indicating a distance from the vehicle to the target object; data indicating a velocity of the target object; data indicating an elevation range of the target object with respect to the radar device; data indicating an azimuth range of the target object with respect to the radar device; data indicating a level of traffic in the environment of the vehicle; data indicating a type of road on which the vehicle is traveling; data indicating a weather condition in the environment of the vehicle; and data indicating a hazardous condition in the environment of the vehicle.

Example A4

The method of any one of examples A1 to A3, wherein: the plurality of radar operational configurations specify a plurality of waveform types having corresponding frequency bandwidths; the at least one radar operational configuration specifies at least one waveform type of the plurality of waveform types having a corresponding frequency bandwidth; and the one or more RF transmit signals have the at least one waveform type.

Example A5

The method of any one of examples A1 to A4, wherein: the transmitter comprises a plurality of transmit antenna elements arranged along a dimension of a transmit antenna array of the transmitter; the plurality of radar operational configurations specify a plurality of different subsets of the plurality of transmit antenna elements, the at least one radar operational configuration specifying at least one subset of the plurality of different subsets; and transmitting the one or more RF transmit signals according to the at least one radar operational configuration comprises transmitting the one or more RF transmit signals using the at least one subset of the plurality of different subsets of the plurality of transmit antenna elements.

Example A6

The method of any one of examples A1 to A4, wherein: the transmitter comprises a plurality of transmit antenna elements arranged along a dimension of a transmit antenna array of the transmitter; the plurality of radar operational configurations specify a plurality of different transmit phase shift patterns for transmitting the one or more RF transmit signals via the plurality of transmit antenna elements, the at least one radar operational configuration specifying at least one transmit phase shift pattern of the plurality of different transmit phase shift patterns; and transmitting the one or more RF transmit signals according to the at least one radar operational configuration comprises transmitting the one or more RF transmit signals according to the at least one transmit phase shift pattern.

Example A7

The method of any one of examples A1 to A6, wherein: the receiver comprises a plurality of receive antenna elements arranged along a dimension of a receive antenna array of the receiver; the plurality of radar operational configurations specify a plurality of different subsets of the plurality of receive antenna elements, the at least one radar operational configuration specifying at least one subset of the plurality of different subsets; and receiving the one or more RF receive signals according to the at least one radar operational configuration comprises receiving the one or more RF receive signals using the at least one subset of the plurality of different subsets of the plurality of receive antenna elements.

Example A8

The method of any one of examples A1 to A6, wherein: the receiver comprises a plurality of receive antenna elements arranged along a dimension of a receive antenna array of the receiver; the plurality of radar operational configurations specify a plurality of different receive phase shift patterns for receiving the one or more RF receive signals via the plurality of receive antenna elements, the at least one radar operational configuration specifying at least one receive phase shift pattern of the plurality of different receive phase shift patterns; and receiving the one or more RF receive signals comprises receiving the one or more RF receive signals according to the at least one receive phase shift pattern.

Example 9

The method of any one of examples A1 to A8, further comprising:

generating, using processing circuitry of the radar device according to the at least one radar operational configuration, using the one or more RF receive signals, a range-cross range image of the target object; wherein: the plurality of radar operational configurations specify a plurality of frame rates; the at least one radar operational configuration specifies at least one frame rate of the plurality of frame rates; and generating the range-cross range image uses the one or more RF receive signals received during a frame defined by the at least one frame rate.

Example A10

The method of any one of examples A1 to A9, wherein the one or more RF transmit signals have frequency content in a frequency band of 300 GHz-3 THz.

Example A11

A radar device for collecting data about a target object, the radar device being configured to transmit and/or receive RF signals in a plurality of radar operational configurations, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle; and select, using the situational awareness data for the vehicle and from among the plurality of radar operational configurations, at least one radar operational configuration to use for collecting the data about the target object; a transmitter configured to transmit, according to the at least one radar operational configuration, one or more RF transmit signals; and a receiver configured to receive, according to the at least one radar operational configuration, one or more RF receive signals generated at least in part by reflection of the one or more RF transmit signals from the target object.

Example A12

The radar device of example A11, wherein the vehicle is a car.

Example A13

The radar device of example A11 or A12, wherein the situational awareness data comprises data selected from a group consisting of: data indicating a velocity of the vehicle; data indicating that the vehicle is in a cruise control and/or lane departure prevention mode; data indicating that the vehicle is parking; data indicating that the vehicle is on a highway; data indicating a low power level of the vehicle; data indicating a distance from the vehicle to the target object; data indicating a velocity of the target object; data indicating an elevation range of the target object with respect to the radar device; data indicating an azimuth range of the target object with respect to the radar device; data indicating a level of traffic in the environment of the vehicle; data indicating a type of road on which the vehicle is traveling; data indicating a weather condition in the environment of the vehicle; and data indicating a hazardous condition in the environment of the vehicle.

Example A14

The radar device of any one of examples A11 to A13, wherein: the plurality of radar operational configurations specify a plurality of waveform types having corresponding frequency bandwidths; the at least one radar operational configuration specifies at least one waveform type of the plurality of waveform types having a corresponding frequency bandwidth; and the transmitter is configured to transmit the one or more RF transmit signals having the at least one waveform type.

Example A15

The radar device of any one of examples A11 to A14, wherein: the transmitter comprises a transmit antenna array comprising a plurality of transmit antenna elements arranged along a dimension of the transmit antenna array; the plurality of radar operational configurations specify a plurality of different subsets of the plurality of transmit antenna elements, the at least one radar operational configuration specifying at least one subset of the plurality of different subsets; and the transmitter is configured to transmit the one or more RF transmit signals using the at least one subset of the plurality of different subsets of the plurality of transmit antenna elements.

Example A16

The radar device of any one of examples A11 to A14, wherein: the transmitter comprises a transmit antenna array comprising a plurality of transmit antenna elements arranged along a dimension of the transmit antenna array; the plurality of radar operational configurations specify a plurality of different transmit phase shift patterns for transmitting the one or more RF transmit signals via the plurality of transmit antenna elements, the at least one radar operational configuration specifying at least one transmit phase shift pattern of the plurality of different transmit phase shift patterns; and the transmitter is configured to transmit the one or more RF transmit signals according to the at least one transmit phase shift pattern.

Example A17

The radar device of any one of examples A11 to A16, wherein: the receiver comprises a receive antenna array comprising a plurality of receive antenna elements arranged along a dimension of the receive antenna array; the plurality of radar operational configurations specify a plurality of different subsets of the plurality of receive antenna elements, the at least one radar operational configuration specifying at least one subset of the plurality of different subsets; and the receiver is configured to receive the one or more RF receive signals using the at least one subset of the plurality of different subsets of the plurality of receive antenna elements.

Example A18

The radar device of any one of examples A11 to A16, wherein: the receiver comprises a receive antenna array comprising a plurality of receive antenna elements arranged along a dimension of the receive antenna array; the plurality of radar operational configurations specify a plurality of different receive phase shift patterns for receiving the one or more RF receive signals via the plurality of receive antenna elements, the at least one radar operational configuration specifying at least one receive phase shift pattern of the plurality of different receive phase shift patterns; and the receiver is configured to receive the one or more RF receive signals according to the at least one receive phase shift pattern.

Example A19

The radar device of any one of examples A11 to A18, wherein: the plurality of radar operational configurations specify a plurality of frame rates; the at least one radar operational configuration specifies at least one frame rate of the plurality of frame rates; and the processing circuitry is further configured to generate, according to the at least one radar operational configuration, a range-cross range image of the target object at least in part by using the one or more RF receive signals, received during a frame defined by the at least one frame rate, to generate the range-cross range image.

Example A20

The radar device of any one of examples A11 to A19, wherein the one or more RF transmit signals have frequency content in a frequency band of 300 GHz-3 THz.

Example B1

A method of using a radar device to collect data about a target object, the radar device configured to transmit a plurality of waveform types having corresponding frequency bandwidths, the method comprising: obtaining, using processing circuitry of the radar device, situational awareness data for a vehicle, the situational awareness data being indicative of at least one characteristic of the vehicle, at least one characteristic of the target object, and/or at least one characteristic of an environment of the vehicle; selecting, using the processing circuitry, using the situational awareness data for the vehicle and from among the plurality of waveform types having corresponding frequency bandwidths, at least one waveform type to use for collecting the data about the target object; transmitting, using the radar device, one or more RF transmit signals having at least one frequency bandwidth corresponding to the at least one waveform type; and receiving, using the radar device, one or more RF receive signals generated at least in part by reflection of the one or more RF transmit signals from the target object.

Example B2

The method of example B1, wherein: the plurality of waveform types comprises a first waveform type having a first frequency bandwidth and a second waveform type having a second frequency bandwidth, the first frequency bandwidth is between 1 GHz and 5 GHz, and the second frequency bandwidth is between 6 GHz and 20 GHz, and selecting the at least one waveform type comprising selecting at least one of the first waveform type and the second waveform type using the situational awareness data for the vehicle.

Example B3

The method of example B1, wherein: the plurality of waveform types comprises a first waveform type having a first frequency bandwidth, a second waveform type having a second frequency bandwidth and a third waveform type having a third frequency bandwidth, the first frequency bandwidth is between 1 GHz and 5 GHz, the second frequency bandwidth is between 6 GHz and 12 GHz and the third frequency bandwidth is between 13 GHz and 25 GHz, and selecting the at least one waveform type comprising selecting at least one among the first waveform type, the second waveform type and the third waveform type using the situational awareness data for the vehicle.

Example B4

The method of any one of examples B1-3, wherein the one or more RF transmit signals have frequency content in a frequency band of 300 GHz-3 THz.

Example B5

The method of any one of examples B1-4, wherein:

- transmitting the one or more RF transmit signals comprises transmitting one or more RF chirps having at least one frequency bandwidth corresponding to the at least one waveform type.

Example B6

The method of example B5, wherein the one or more RF chirps have durations between 5 μs and 100 ms.

Example B7

The method of example B5, wherein the one or more RF chirps have durations between 50 μs and 2 ms.

Example B8

The method of any one of examples B1-7, further comprising: generating, using the processing circuitry, one or more range-cross range images of the target object using the one or more RF receive signals at a frame rate between 10 frames per second and 30 frames per second.

Example B9

The method of any one of examples B1-8, wherein: selecting the at least one waveform type comprises selecting, using the situational awareness data for the vehicle and from among the plurality of waveform types, a first waveform type and a second waveform type, transmitting the one or more RF transmit signals comprises: transmitting, during a first time interval, a first RF transmit signal having a first frequency bandwidth corresponding to the first waveform type; and transmitting, during a second time interval subsequent to the first time interval, a second RF transmit signal having a second frequency bandwidth corresponding to the second waveform type, wherein the second frequency bandwidth is different from the first frequency bandwidth; and receiving the one or more RF receive signals comprises: receiving a first RF receive signal generated by reflection of the first RF transmit signal from the target object; and receiving a second RF receive signal generated by reflection of the second RF transmit signal from the target object.

Example B10

The method of example B9, wherein the first frequency bandwidth is between 1 GHz and 5 GHz, and the second frequency bandwidth is between 6 GHz and 20 GHz.

Example B11

A radar device for collecting data about a target object, the radar device being configured to transmit a plurality of waveform types having corresponding frequency bandwidths, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle, and select, using the situational awareness data for the vehicle and from among the plurality of waveform types having corresponding frequency bandwidths, at least one waveform type to use for collecting the data about the target object; a transmitter configured to transmit one or more RF transmit signals having at least one frequency bandwidth corresponding to the at least one waveform type; and a receiver configured to receive one or more RF receive signals generated at least in part by reflection of the one or more RF transmit signals from the target object.

Example B12

The radar device of example B11, wherein: the plurality of waveform types comprises a first waveform type having a first frequency bandwidth and a second waveform type having a second frequency bandwidth, the first frequency bandwidth is between 1 GHz and 5 GHz, and the second frequency bandwidth is between 6 GHz and 20 GHz, and selecting the at least one waveform type comprising selecting at least one of the first waveform type and the second waveform type using the situational awareness data for the vehicle.

Example B13

The radar device of example B11, wherein: the plurality of waveform types comprises a first waveform type having a first frequency bandwidth, a second waveform type having a second frequency bandwidth and a third waveform type having a third frequency bandwidth, the first frequency bandwidth is between 1 GHz and 5 GHz, the second frequency bandwidth is between 6 GHz and 12 GHz and the third frequency bandwidth is between 13 GHz and 25 GHz, and selecting the at least one waveform type comprising selecting at least one among the first waveform type, the second waveform type and the third waveform type using the situational awareness data for the vehicle.

Example B14

The radar device of any one of examples B11-13, wherein the one or more RF transmit signals have frequency content in a frequency band of 300 GHz-3 THz.

Example B15

The radar device of any one of examples B11-12, wherein: transmitting the one or more RF transmit signals comprises transmitting one or more RF chirps having at least one frequency bandwidth corresponding to the at least one waveform type.

Example B16

The radar device of example B15, wherein the one or more RF chirps have durations between 5 μs and 100 ms.

Example B17

The radar device of example B15, wherein the one or more RF chirps have durations between 50 μs and 2 ms.

Example B18

The radar device of any one of examples B11-17, wherein the processing circuitry is configured to: generate one or more range-cross range images of the target object using the one or more RF receive signals at a frame rate between 10 frames per second and 30 frames per second.

Example B19

The radar device of any one of examples B11-18, wherein: selecting the at least one waveform type comprises selecting, using the situational awareness data for the vehicle and from among the plurality of waveform types, a first waveform type and a second waveform type, transmitting the one or more RF transmit signals comprises: transmitting, during a first time interval, a first RF transmit signal having a first frequency bandwidth corresponding to the first waveform type; and transmitting, during a second time interval subsequent to the first time interval, a second RF transmit signal having a second frequency bandwidth corresponding to the second waveform type, wherein the second frequency bandwidth is different from the first frequency bandwidth; and receiving the one or more RF receive signals comprises: receiving a first RF receive signal generated by reflection of the first RF transmit signal from the target object; and receiving a second RF receive signal generated by reflection of the second RF transmit signal from the target object.

Example B20

The radar device of example B19, wherein the first frequency bandwidth is between 1 GHz and 5 GHz, and the second frequency bandwidth is between 6 GHz and 20 GHz.

Example C1

A method of using a radar device to collect data about a target object, the radar device configured to transmit of a plurality of waveform types having a corresponding plurality of frequency bandwidths, the method comprising: obtaining, using processing circuitry of the radar device, situational awareness data for a vehicle; generating, using the processing circuitry, one or more range-cross range images of the target object at least in part by: selecting waveform bandwidths to use for imaging the target object based on the obtained situational awareness data for the vehicle; and imaging the target object using one or more RF signals corresponding to the selected waveform bandwidths.

Example C2

The method of example C1, wherein selecting waveform bandwidths to use for imaging the target object comprises selecting waveform bandwidths based on data indicative of a velocity of the vehicle.

Example C3

The method of any one of examples C1-2, wherein selecting waveform bandwidths to use for imaging the target object comprises selecting waveform bandwidths based on data indicative of a velocity of the target object relative to a velocity of the vehicle.

Example C4

The method of any one of examples C1-3, wherein selecting waveform bandwidths to use for imaging the target object is performed using data indicative of whether a cruise control for the vehicle is activated.

Example C5

The method of any one of examples C1-4, wherein selecting waveform bandwidths to use for imaging the target object is performed using data indicative of at least one weather condition associated with the vehicle's environment.

Example C6

The method of any one of examples C1-5, wherein selecting waveform bandwidths to use for imaging the target object is performed using data indicative of a level of traffic associated with the vehicle's environment.

Example C7

The method of any one of examples C1-6, wherein selecting waveform bandwidths to use for imaging the target object is performed using data indicative of a type of road associated with the vehicle's environment.

Example C8

The method of any one of examples C1-7, wherein selecting waveform bandwidths comprises selecting at least one of a first waveform bandwidth that is between 1 GHz and 5 GHz and a second waveform bandwidth that is between 6 GHz and 20 GHz.

Example C9

The method of any one of examples C1-7, wherein selecting waveform bandwidths comprises selecting at least one among a first waveform bandwidth that is between 1 GHz and 5 GHz, a second waveform bandwidth that is between 6 GHz and 12 GHz and a third waveform bandwidth that is between 13 GHz and 25 GHz.

Example C10

The method of any one of examples C1-9, wherein the one or more RF signals have frequency content in a frequency band of 300 GHz-3 THz.

Example C11

A radar device configured to collect data about a target object least in part by transmitting of a plurality of waveform types having a corresponding plurality of frequency bandwidths, the radar device comprising: processing circuitry configured to: obtain situational awareness data for a vehicle; generate one or more range-cross range images of the target object at least in part by: selecting waveform bandwidths to use for imaging the target object based on the obtained situational awareness data for the vehicle; and imaging the target object using one or more RF signals corresponding to the selected waveform bandwidths.

Example C12

The radar device of example C11, wherein the processing circuitry is configured to select waveform bandwidths based on data indicative of a velocity of the vehicle.

Example C13

The radar device of any one of examples C11-12, wherein the processing circuitry is configured to select waveform bandwidths based on data indicative of a velocity of the target object relative to a velocity of the vehicle.

Example C14

The radar device of any one of examples C11-13, wherein the processing circuitry is configured to select waveform bandwidths to use for imaging the target object using data indicative of whether a cruise control for the vehicle is activated.

Example C15

The radar device of any one of examples C11-14, wherein the processing circuitry is configured to select waveform bandwidths to use for imaging the target object using data indicative of at least one weather condition associated with the vehicle's environment.

Example C16

The radar device of any one of examples C11-15, wherein the processing circuitry is configured to select waveform bandwidths to use for imaging the target object using data indicative of a level of traffic associated with the vehicle's environment.

Example C17

The radar device of any one of examples C11-16, wherein the processing circuitry is configured to select waveform bandwidths to use for imaging the target object using data indicative of a type of road associated with an environment of the vehicle.

Example C18

The radar device of any one of examples C11-17, wherein the processing circuitry is configured to select at least one of a first waveform bandwidth that is between 1 GHz and 5 GHz and a second waveform bandwidth that is between 6 GHz and 20 GHz.

Example C19

The radar device of any one of examples C11-17, wherein the processing circuitry is configured to select at least one among a first waveform bandwidth that is between 1 GHz and 5 GHz, a second waveform bandwidth that is between 6 GHz and 12 GHz and a third waveform bandwidth that is between 13 GHz and 25 GHz.

Example C20

The radar device of any one of examples C11-19, wherein the one or more RF signals have frequency content in a frequency band of 300 GHz-3 THz.

Example D1

A method of using a radar device to collect data about a target object, the radar device being configurable among a plurality of transmitter configurations, the method comprising: obtaining, using processing circuitry of the radar device, situational awareness data for a vehicle, the situational awareness data being indicative of at least one characteristic of the vehicle, at least one characteristic of the target object, and/or at least one characteristic of an environment of the vehicle; selecting, using the processing circuitry, using the situational awareness data for the vehicle and from among a plurality of transmitter configurations, at least one transmitter configuration to use for collecting the data about the target object; transmitting, using a transmitter of the radar device according to the at least one transmitter configuration, one or more RF transmit signals; and receiving, using a receiver of the radar device, one or more RF receive signals generated at least in part by reflection of the one or more RF transmit signals from the target object.

Example D2

The method of example D1, wherein: the transmitter comprises a transmit antenna array comprising a plurality of transmit antenna elements arranged along a dimension of the transmit antenna array; the plurality of transmitter configurations specify a plurality of different subsets of the plurality of transmit antenna elements, the at least one transmitter configuration specifying at least one subset of the plurality of different subsets; and transmitting the one or more RF transmit signals according to the at least one transmitter configuration comprises transmitting the one or more RF transmit signals using the at least one subset.

Example D3

The method of example D2, wherein: the at least one subset comprises a first subset of the plurality of transmit antenna elements and a second subset of the plurality of transmit antenna elements that is different from the first subset; transmitting the one or more RF transmit signals using the at least one subset comprises: transmitting, at a first time, a first RF transmit signal of the one or more RF transmit signals using the first subset; and transmitting, at a second time after the first time, a second RF transmit signal of the one or more RF transmit signals using the second subset; and the method further comprises generating a range-cross range image using the one or more RF receive signals, the one or more RF receive signals generated at least in part by reflection of the first RF transmit signal and/or of the second RF transmit signal from the target object.

Example D4

The method of example D3, wherein: the transmitter uses a first amount of transmit power transmitting the first RF transmit signal using the first subset; and the transmitter uses a second amount of transmit power that is different from the first amount of transmit power transmitting the second RF transmit signal using the second subset.

Example D5

The method of example D1, wherein: the transmitter comprises a transmit antenna array comprising a plurality of transmit antenna elements arranged along a dimension of the transmit antenna array; the plurality of transmitter configurations specify a plurality of different phase shift patterns for transmitting the one or more RF transmit signals via the plurality of transmit antenna elements, the at least one transmitter configuration specifying at least one phase shift pattern of the plurality of different phase shift patterns; and transmitting the one or more RF transmit signals according to the at least one transmitter configuration comprises transmitting the one or more RF transmit signals according to the at least one phase shift pattern.

Example D6

The method of example D5, wherein: the at least one phase shift pattern comprises a first phase shift pattern and a second phase shift pattern that is different from the first phase shift pattern; transmitting the one or more RF transmit signals according to the at least one phase shift pattern comprises: transmitting, at a first time, a first RF transmit signal of the one or more RF transmit signals according to the first phase shift pattern; and transmitting, at a second time after the first time, a second RF transmit signal of the one or more RF transmit signals according to the second phase shift pattern; and the method further comprises generating a range-cross range image using the one or more RF receive signals, the one or more RF receive signals generated at least in part by reflection of the first RF transmit signal and/or of the second RF transmit signal from the target object.

Example D7

The method of example D6, wherein: the at least one phase shift pattern is configured to perform an angular transmit sweep over an angular field of view including a first angular direction and a second angular direction different from the first angular direction; according to the first phase shift pattern, the transmitter focuses transmission of the first RF transmit signal in the first angular direction; and according to the second phase shift pattern, the transmitter focuses transmission of the second RF transmit signal in the second angular direction.

Example D8

The method of example D1, wherein: the transmitter comprises a transmit antenna array comprising a plurality of transmit antenna elements arranged along a dimension of the transmit antenna array; the plurality of transmitter configurations specifies a plurality of different transmit power levels for transmitting the one or more RF transmit signals via the plurality of transmit antenna elements, the at least one transmitter configuration specifying at least one transmit power level of the plurality of different transmit power levels; and transmitting the one or more RF transmit signals according to the at least one transmitter configuration comprises transmitting the one or more RF transmit signals according to the at least one transmit power level.

Example D9

The method of example D8, wherein the at least one transmit power level comprises a first transmit power level and a second transmit power level that is different from the first transmit power level; transmitting the one or more RF transmit signals according to the at least one transmit power level comprises: transmitting, at a first time, a first RF transmit signal of the one or more RF transmit signals according to the first transmit power level; and transmitting, at a second time, a second RF transmit signal of the one or more RF transmit signals according to the second transmit power level; and the method further comprises generating a range-cross range image using the one or more RF receive signals, the one or more RF receive signals generated at least in part by reflection of the first RF transmit signal and/or the second RF transmit signal from the target object.

Example D10

The method of any one of examples D1 to D9, wherein the one or more RF transmit signals have frequency content in a frequency band of 300 GHz-3 THz.

Example D11

A radar device for collecting data about a target object, the radar device being configurable among a plurality of transmitter configurations, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle, and select, using the situational awareness data for the vehicle and from among the plurality of transmitter configurations, at least one transmitter configuration to use for collecting the data about the target object; a transmitter configured to transmit one or more RF transmit signals according to the at least one transmitter configuration; and a receiver configured to receive one or more RF receive signals generated at least in part by reflection of the one or more RF transmit signals from the target object.

Examples D12

The radar device of example D11, wherein: the transmitter comprises a transmit antenna array comprising a plurality of transmit antenna elements arranged along a dimension of the transmit antenna array; the plurality of transmitter configurations specify a plurality of different subsets of the plurality of transmit antenna elements, the at least one transmitter configuration specifying at least one subset of the plurality of different subsets; and the transmitter is configured to transmit the one or more RF transmit signals using the at least one subset.

Example D13

The radar device of example D12, wherein: the at least one subset comprises a first subset of the plurality of transmit antenna elements and a second subset of the plurality of transmit antenna elements that is different from the first subset; the transmitter is configured to: transmit, at a first time, a first RF transmit signal of the one or more RF transmit signals using the first subset; and transmit, at a second time after the first time, a second RF transmit signal of the one or more RF transmit signals using the second subset; and the processing circuitry is further configured to generate a range-cross range image using the one or more RF receive signals, the one or more RF receive signals generated at least in part by reflection of the first RF transmit signal and/or of the second RF transmit signal from the target object.

Example D14

The radar device of example D13, wherein the transmitter is configured to: transmit the first RF transmit signal using the first subset using a first amount of transmit power; and transmit the second RF transmit signal using the second subset using a second amount of transmit power that is different from the first amount of transmit power.

Example D15

The radar device of example D11, wherein: the transmitter comprises a transmit antenna array comprising a plurality of transmit antenna elements arranged along a dimension of the transmit antenna array; the plurality of transmitter configurations specify a plurality of different phase shift patterns for transmitting the one or more RF transmit signals via the plurality of transmit antenna elements, the at least one transmitter configuration specifying at least one phase shift pattern of the plurality of different phase shift patterns; and the transmitter is configured to transmit the one or more RF transmit signals according to the at least one phase shift pattern.

Example D16

The radar device of example D15, wherein: the at least one phase shift pattern comprises a first phase shift pattern and a second phase shift pattern that is different from the first phase shift pattern; the transmitter is configured to: transmit, at a first time, a first RF transmit signal of the one or more RF transmit signals according to the first phase shift pattern; and transmit, at a second time after the first time, a second RF transmit signal of the one or more RF transmit signals according to the second phase shift pattern; and the processing circuitry is further configured to generate a range-cross range image using the one or more RF receive signals, the one or more RF receive signals generated at least in part by reflection of the first RF transmit signal and/or of the second RF transmit signal from the target object.

Example D17

The radar device of example D16, wherein: the at least one phase shift pattern is configured to perform an angular transmit sweep over an angular field of view including a first angular direction and a second angular direction different from the first angular direction; according to the first phase shift pattern, the transmitter is configured to focus transmission of the first RF transmit signal in the first angular direction; and according to the second phase shift pattern, the transmitter is configured to focus transmission of the second RF transmit signal in the second angular direction.

Example D18

The radar device of example D11, wherein: the transmitter comprises a transmit antenna array comprising a plurality of transmit antenna elements arranged along a dimension of the transmit antenna array; the plurality of transmitter configurations specifies a plurality of different transmit power levels for transmitting the one or more RF transmit signals via the plurality of transmit antenna elements, the at least one transmitter configuration specifying at least one transmit power level of the plurality of different transmit power levels; and the transmitter is configured to transmit the one or more RF transmit signals according to the at least one transmit power level.

Example D19

The radar device of example D18, wherein: the at least one transmit power level comprises a first transmit power level and a second transmit power level that is different from the first transmit power level; the transmitter is configured to: transmit, at a first time, a first RF transmit signal of the one or more RF transmit signals according to the first transmit power level; and transmit, at a second time, a second RF transmit signal of the one or more RF transmit signals according to the second transmit power level; and the processing circuitry is further configured to generate a range-cross range image using the one or more RF receive signals, the one or more RF receive signals generated at least in part by reflection of the first RF transmit signal and/or the second RF transmit signal from the target object.

Example D20

The radar device of any one of examples D11 to D19, wherein the one or more RF transmit signals have frequency content in a frequency band of 300 GHz-3 THz.

Example E1

A method of using a radar device to collect data about a target object, the radar device being configurable among a plurality of receiver configurations, the method comprising: obtaining, using processing circuitry of the radar device, situational awareness data for a vehicle, the situational awareness data being indicative of at least one characteristic of the vehicle, at least one characteristic of the target object, and/or at least one characteristic of an environment the vehicle; selecting, using the processing circuitry, using the situational awareness data for the vehicle and from among a plurality of receiver configurations, at least one receiver configuration to use for collecting the data about the target object; transmitting, using a transmitter of the radar device, one or more RF transmit signals; and receiving, using a receiver of the radar device in the at least one receiver configuration, one or more RF receive signals generated at least in part by reflection of the one or more RF transmit signals from the target object.

Example E2

The method of example E1, wherein: the receiver comprises a receive antenna array comprising a plurality of receive antenna elements arranged along a dimension of the receive antenna array; the plurality of receiver configurations specify a plurality of different subsets of the plurality of receive antenna elements, the at least one receiver configuration specifying at least one subset of the plurality of different subsets; and receiving the one or more RF receive signals according to the at least one receiver configuration comprises receiving the one or more RF receive signals using the at least one subset.

Example E3

The method of example E2, wherein: the at least one subset comprises a first subset of the plurality of receive antenna elements and a second subset of the plurality of receive antenna elements that is different from the first subset; receiving the one or more RF receive signals according to the at least one receiver configuration comprises: receiving, at a first time, a first RF receive signal of the one or more RF receive signals using the first subset; and receiving, at a second time after the first time, a second RF receive signal of the one or more RF receive signals using the second subset; and the method further comprises generating, using the processing circuitry, a range-cross range image using the first RF receive signal and the second RF receive signal.

Example E4

The method of example E3, wherein: the receiver uses a first amount of receive power receiving the first RF receive signal using the first subset; and the receiver uses a second amount of receive power that is different from the first amount of receive power receiving the second RF receive signal using the second subset.

Example E5

The method of example E1, wherein: the receiver comprises a receive antenna array comprising a plurality of receive antenna elements arranged along a dimension of the receive antenna array; the plurality of receiver configurations specify a plurality of different phase shift patterns for receiving the one or more RF receive signals via the plurality of receive antenna elements, the at least one receiver configuration specifying at least one phase shift pattern of the plurality of different phase shift patterns; and receiving the one or more RF receive signals according to the at least one receiver configuration comprises receiving the one or more RF receive signals according to the at least one phase shift pattern.

Example E6

The method of example E5, wherein: the at least one phase shift pattern comprises a first phase shift pattern and a second phase shift pattern that is different from the first phase shift pattern; receiving the one or more RF receive signals according to the at least one phase shift pattern comprises: receiving, at a first time, a first RF receive signal of the one or more RF receive signals according to the first phase shift pattern; and receiving, at a second time after the first time, a second RF receive signal of the one or more RF receive signals according to the second phase shift pattern; and the method further comprises generating a range-cross range image using the first RF receive signal and the second RF receive signal.

Example E7

The method of example E6, wherein: the at least one phase shift pattern is configured to perform an angular receive sweep over an angular field of view including a first angular direction and a second angular direction different from the first angular direction; according to the first phase shift pattern, the receiver focuses reception of the first RF receive signal in the first angular direction; and according to the second phase shift pattern, the receiver focuses reception of the second RF receive signal in the second angular direction.

Example E8

The method of example E1, wherein the receiver comprises a receive antenna array comprising a plurality of receive antenna elements arranged along a dimension of the receive antenna array; the plurality of receiver configurations specify a plurality of different subsets of the plurality of receive antenna elements and a plurality of different phase shift patterns applied to respective ones of the plurality of different subsets, the at least one receiver configuration specifying at least one subset of the plurality of different subsets and at least one phase shift pattern applied to the at least one subset; and receiving the one or more RF receive signals according to the at least one receiver configuration comprises receiving the one or more RF receive signals using the at least one subset according to the at least one phase shift pattern.

Example E9

The method of any one of examples E2 to E8, wherein the transmitter comprises a transmit antenna array comprising a plurality of transmit antenna elements arranged along a dimension of the transmit antenna array that is orthogonal to the dimension of the receive antenna array, and transmitting the one or more RF transmit signals comprises transmitting the one or more RF transmit signals via the plurality of transmit antenna elements.

Example E10

The method of any one of examples E1 to E7, wherein the one or more RF transmit signals have frequency content in a frequency band of 300 GHz-3 THz.

Example E11

A radar device for collecting data about a target object, the radar device being configurable among a plurality of receiver configurations, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle, and select, using the situational awareness data for the vehicle and from among the plurality of receiver configurations, at least one receiver configuration to use for collecting the data about the target object; a transmitter configured to transmit one or more RF transmit signals; and a receiver configured to receive one or more RF receive signals, according to the at least one receiver configuration, generated at least in part by reflection of the one or more RF transmit signals from the target object.

Example E12

The radar device of example E11, wherein: the receiver comprises a receive antenna array comprising a plurality of receive antenna elements arranged along a dimension of the receive antenna array; the plurality of receiver configurations specify a plurality of different subsets of the plurality of receive antenna elements, the at least one receiver configuration specifying at least one subset of the plurality of different subsets; and the receiver is configured to receive the one or more RF receive signals using the at least one subset.

Example E13

The radar device of example E12, wherein: the at least one subset comprises a first subset of the plurality of receive antenna elements and a second subset of the plurality of receive antenna elements that is different from the first subset; the receiver is configured to: receive, at a first time, a first RF receive signal of the one or more RF receive signals using the first subset; and receive, at a second time after the first time, a second RF receive signal of the one or more RF receive signals using the second subset; and the processing circuitry is further configured to generate a range-cross range image using the first RF receive signal and the second RF receive signal.

Example E14

The radar device of example E13, wherein: the receiver is configured to use a first amount of receive power receiving the first RF receive signal using the first subset; and the receiver is configured to use a second amount of receive power that is different from the first amount of receive power receiving the second RF receive signal using the second subset.

Example E15

The radar device of example E11, wherein: the receiver comprises a receive antenna array comprising a plurality of receive antenna elements arranged along a dimension of the receive antenna array; the plurality of receiver configurations specify a plurality of different phase shift patterns for receiving the one or more RF receive signals via the plurality of receive antenna elements, the at least one receiver configuration specifying at least one phase shift pattern of the plurality of different phase shift patterns; and the receiver is configured to receive the one or more RF receive signals according to the at least one phase shift pattern.

Example E16

The radar device of example E15, wherein: the at least one phase shift pattern comprises a first phase shift pattern and a second phase shift pattern that is different from the first phase shift pattern; the receiver is configured to: receive, at a first time, a first RF receive signal of the one or more RF receive signals according to the first phase shift pattern; and receive, at a second time after the first time, a second RF receive signal of the one or more RF receive signals according to the second phase shift pattern; and the processing circuitry is further configured to generate a range-cross range image using the first RF receive signal and the second RF receive signal.

Example E17

The radar device of example E16, wherein: the at least one phase shift pattern is configured to perform an angular receive sweep over an angular field of view including a first angular direction and a second angular direction different from the first angular direction; according to the first phase shift pattern, the receiver is configured to focus reception of the first RF receive signal in the first angular direction; and according to the second phase shift pattern, the receiver is configured to focus reception of the second RF receive signal in the second angular direction.

Example E18

The radar device of example E11, wherein the receiver comprises a receive antenna array comprising a plurality of receive antenna elements arranged along a dimension of the receive antenna array; the plurality of receiver configurations specify a plurality of different subsets of the plurality of receive antenna elements and a plurality of different phase shift patterns applied to respective ones of the plurality of different subsets, the at least one receiver configuration specifying at least one subset of the plurality of different subsets and at least one phase shift pattern applied to the at least one subset; and the receiver is configured to receive the one or more RF receive signals using the at least one subset according to the at least one phase shift pattern.

Example E19

The radar device of any one of example E12 to E18, wherein the transmitter comprises a transmit antenna array comprising a plurality of transmit antenna elements arranged along a dimension of the transmit antenna array that is orthogonal to the dimension of the receive antenna array, and the transmitter is configured to transmit the one or more RF transmit signals via the plurality of transmit antenna elements.

Example E20

The radar device of any one of example E11 to E17, wherein the one or more RF transmit signals have frequency content in a frequency band of 300 GHz-3 THz.

Example F1

A method of using a radar device to generate a range-cross range image of a target object, the method comprising: using processing circuitry of the radar device: obtaining situational awareness data for a vehicle, the situational awareness data being indicative of at least one characteristic of the vehicle, at least one characteristic of the target object, and/or at least one characteristic of an environment of the vehicle; selecting a frame rate based on the situational awareness data for the vehicle; generating a plurality of range-cross range images corresponding to a respective plurality of frames defined by the frame rate, the generating comprising: for a particular frame of the plurality of frames, generating a respective range-cross range image using one or more RF signals received by the radar device during the particular frame; and outputting the plurality of range-cross range images.

Example F2

The method of example F1, wherein generating the plurality of range-cross range images comprises, for each frame of the plurality of frames, generating a respective range-cross range image using RF signals received by the radar device during the frame.

Example F3

The method of example F1, wherein generating the respective range-cross range image comprises: transmitting, using a transmitter of the radar device, one or more RF transmit signals; and receiving, during the particular frame, using a receiver of the radar device, the one or more RF signals generated at least in part by reflection of the one or more RF transmit signals from the target object.

Example F4

The method of example F3, wherein: transmitting the one or more RF transmit signals comprises transmitting a first RF transmit signal of the one or more RF transmit signals and transmitting a second RF transmit signal of the one or more RF transmit signals; and the one or more RF signals are generated at least in part by reflection of the first RF transmit signal and/or the second RF transmit signal from the target object.

Example F5

The method of example F4, wherein: the transmitter comprises a transmit antenna array comprising a plurality of transmit antenna elements arranged along a dimension of the transmit antenna array; transmitting the first RF transmit signal uses a first subset of the plurality of transmit antenna elements; and transmitting the second RF transmit signal uses a second subset of the plurality of transmit antenna elements that is different from the first subset of the plurality of transmit antenna elements.

Example F6

The method of example F4, wherein: the transmitter comprises a transmit antenna array comprising a plurality of transmit antenna elements arranged along a dimension of the transmit antenna array; and transmitting the first RF transmit signal is via the plurality of transmit antenna elements according to a first transmit phase shift pattern and transmitting the second RF transmit signal is via the plurality of transmit antenna elements according to a second transmit phase shift pattern that is different from the first transmit phase shift pattern.

Example F7

The method of example F4, wherein: the transmitter comprises a transmit antenna array comprising a plurality of transmit antenna elements arranged along a dimension of the transmit antenna array; and transmitting the first RF transmit signal is via the plurality of transmit antenna elements according to a first transmit power level and transmitting the second RF transmit signal is via the plurality of transmit antenna elements according to a second transmit power level that is different from the first transmit power level.

Example F8

The method of any one of examples F4 to F7, wherein: the receiver comprises a receive antenna array comprising a plurality of receive antenna elements arranged along a dimension of the receive antenna array; receiving the one or more RF signals comprises: using a first subset of the plurality of receive antenna elements during a first time period within the particular frame; and using a second subset of the plurality of receive antenna elements during a second time period that is after the first time period and within the particular frame, the second subset of the plurality of receive antenna elements being different from the first subset of the plurality of receive antenna elements; and the one or more RF signals are received during the first time period and/or the second time period.

Example F9

The method of any one of example F4 to F7, wherein: the receiver comprises a receive antenna array comprising a plurality of receive antenna elements arranged along a dimension of the receive antenna array; receiving the one or more RF signals comprises: operating the plurality of receive antenna elements according to a first receive phase shift pattern during a first time period within the particular frame; and operating the plurality of receive antenna elements according to a second receive phase shift pattern during a second time period that is after the first time period and within the particular frame, the second receive phase shift pattern being different from the first receive phase shift pattern; and the one or more RF signals are received during the first time period and/or the second time period.

Example F10

The method of any one of examples F3 to F9, wherein the one or more RF transmit signals have frequency content in a frequency band of 300 GHz-3 THz.

Example F11

A radar device for generating a range-cross range image of a target object, the radar device comprising: processing circuitry configured to: obtain situational awareness data for a vehicle, the situational awareness data being indicative of at least one characteristic of the vehicle, at least one characteristic of the target object, and/or at least one characteristic of an environment of the vehicle; select a frame rate based on the situational awareness data for the vehicle; generate a plurality of range-cross range images corresponding to a respective plurality of frames defined by the frame rate at least in part by: for a particular frame of the plurality of frames, generating a respective range-cross range image using one or more RF signals received by the radar device during the particular frame; and output the plurality of range-cross range images.

Example F12

The radar device of example F11, wherein the processing circuitry is configured to generate the plurality of range-cross range images at least in part by, for each frame of the plurality of frames, generating a respective range-cross range image using RF signals received by the radar device during the frame.

Example F13

The radar device of example F11, further comprising: a transmitter configured to transmit one or more RF transmit signals; and a receiver configured to receive, during the particular frame, the one or more RF signals generated at least in part by reflection of the one or more RF transmit signals from the target object.

Example F14

The radar device of example F13, wherein: the transmitter is configured to transmit a first RF transmit signal of the one or more RF transmit signals and transmit a second RF transmit signal of the one or more RF transmit signals; and the one or more RF signals are generated at least in part by reflection of the first RF transmit signal and/or the second RF transmit signal from the target object.

Example F15

The radar device of example F14, wherein: the transmitter comprises a transmit antenna array comprising a plurality of transmit antenna elements arranged along a dimension of the transmit antenna array; and the transmitter is configured to transmit the first RF transmit signal using a first subset of the plurality of transmit antenna elements and transmit the second RF transmit signal using a second subset of the plurality of transmit antenna elements that is different from the first subset of the plurality of transmit antenna elements.

Example F16

The radar device of example F14, wherein: the transmitter comprises a transmit antenna array comprising a plurality of transmit antenna elements arranged along a dimension of the transmit antenna array; and the transmitter is configured to transmit the first RF transmit signal via the plurality of transmit antenna elements according to a first transmit phase shift pattern and transmit the second RF transmit signal via the plurality of transmit antenna elements according to a second transmit phase shift pattern that is different from the first transmit phase shift pattern.

Example F17

The radar device of example F14, wherein: the transmitter comprises a transmit antenna array comprising a plurality of transmit antenna elements arranged along a dimension of the transmit antenna array; and the transmitter is configured to transmit the first RF transmit signal via the plurality of transmit antenna elements according to a first transmit power level and transmit the second RF transmit signal via the plurality of transmit antenna elements according to a second transmit power level that is different from the first transmit power level.

Example F18

The radar device of any one of examples F14 to F17, wherein: the receiver comprises a receive antenna array comprising a plurality of receive antenna elements arranged along a dimension of the receive antenna array; and the receiver is configured to: use a first subset of the plurality of receive antenna elements during a first time period within the particular frame; use a second subset of the plurality of receive antenna elements that is different from the first subset of the plurality of receive antenna elements during a second time period that is after the first time period and within the particular frame; and receive the one or more RF signals during the first time period and/or the second time period.

Example F19

The radar device of any one of examples F14 to F17, wherein: the receiver comprises a receive antenna array comprising a plurality of receive antenna elements arranged along a first dimension of the receive antenna array; and the receiver is configured to: operate according to a first receive phase shift pattern during a first time period within the particular frame; operate according to a second receive phase shift pattern that is different from the first receive phase shift pattern during a second time period that is after the first time period and within the particular frame; and receive the one or more RF signals during the first time period and/or the second time period.

Example F20

The radar device of any one of examples F13 to F19, wherein the one or more RF transmit signals have frequency content in a frequency band of 300 GHz-3 THz.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

What is claimed is:

1. A method of using a radar device to generate a range-cross range image of a target object, the method comprising:

using processing circuitry of the radar device:

obtaining situational awareness data for a vehicle, the situational awareness data being indicative of at least one characteristic of the vehicle, at least one characteristic of the target object, and/or at least one characteristic of an environment of the vehicle;

selecting a frame rate based on the situational awareness data for the vehicle;

generating a plurality of range-cross range images corresponding to a respective plurality of frames defined by the frame rate, the generating comprising:

transmitting, using a transmitter of the radar device, a first RF transmit signal and a second RF transmit signal, wherein:

the transmitter comprises a transmit antenna array comprising a plurality of transmit antenna elements arranged along a dimension of the transmit antenna array; and transmitting the first RF transmit signal is via the plurality of transmit antenna elements according to a first transmit power level and transmitting the second RF transmit signal is via the plurality of transmit antenna elements according to a second transmit power level that is different from the first transmit power level;

receiving, using a receiver of the radar device, one or more RF signals generated at least in part by reflection of the first RF transmit signal and/or the second RF transmit signal from the target object; and for a particular frame of the plurality of frames, generating a respective range-cross range image using the one or more RF signals received by the receiver of the radar device during the particular frame; and outputting the plurality of range-cross range images.

2. The method of claim 1, wherein generating the plurality of range-cross range images comprises, for each frame of the plurality of frames, generating a respective range-cross range image using RF signals received by the radar device during the frame.

3. The method of claim 1, wherein:

the transmitter comprises a transmit antenna array comprising a plurality of transmit antenna elements arranged along a dimension of the transmit antenna array;

transmitting the first RF transmit signal uses a first subset of the plurality of transmit antenna elements; and transmitting the second RF transmit signal uses a second subset of the plurality of transmit antenna elements that is different from the first subset of the plurality of transmit antenna elements.

4. The method of claim 1, wherein:

the transmitter comprises a transmit antenna array comprising a plurality of transmit antenna elements arranged along a dimension of the transmit antenna array; and transmitting the first RF transmit signal is via the plurality of transmit antenna elements according to a first transmit phase shift pattern and transmitting the second RF transmit signal is via the plurality of transmit antenna elements according to a second transmit phase shift pattern that is different from the first transmit phase shift pattern.

5. The method of claim 1, wherein the first RF transmit signal and the second RF transmit signal have frequency content in a frequency band of 300 GHz-3 THz.

6. A method of using a radar device to generate a range-cross range image of a target object, the method comprising:

using processing circuitry of the radar device:

obtaining situational awareness data for a vehicle, the situational awareness data being indicative of at least one characteristic of the vehicle, at least one characteristic of the target object, and/or at least one characteristic of an environment of the vehicle;

selecting a frame rate based on the situational awareness data for the vehicle;

generating a plurality of range-cross range images corresponding to a respective plurality of frames defined by the frame rate, the generating comprising:

transmitting, using a transmitter of the radar device, a first RF transmit signal and a second RF transmit signal;

receiving using a receiver of the radar device, one or more RF signals generated at least in part by reflection of the first RF transmit signal and/or the second RF transmit signal from the target object, wherein:
the receiver comprises a receive antenna array comprising a plurality of receive antenna elements arranged along a dimension of the receive antenna array;
receiving the one or more RF signals comprises:
using a first subset of the plurality of receive antenna elements during a first time period; and
using a second subset of the plurality of receive antenna elements during a second time period that is after the first time period, the second subset of the plurality of receive antenna elements being different from the first subset of the plurality of receive antenna elements; and
the one or more RF signals are received during the first time period and/or the second time period; and
for a particular frame of the plurality of frames, generating a respective range-cross range image using the one or more RF signals received by the receiver of the radar device during the particular frame,
wherein the first time period and the second time period are within the particular frame; and
outputting the plurality of range-cross range images.

7. The method of claim 6, wherein the first RF transmit signal and the second RF transmit signal have frequency content in a frequency band of 300 GHz-3 THz.

8. A method of using a radar device to generate a range-cross range image of a target object, the method comprising:
using processing circuitry of the radar device:
obtaining situational awareness data for a vehicle, the situational awareness data being indicative of at least one characteristic of the vehicle, at least one characteristic of the target object, and/or at least one characteristic of an environment of the vehicle;
selecting a frame rate based on the situational awareness data for the vehicle;
generating a plurality of range-cross range images corresponding to a respective plurality of frames defined by the frame rate, the generating comprising:
transmitting, using a transmitter of the radar device, a first RF transmit signal and a second RF transmit signal;
receiving, using a receiver of the radar device, one or more RF signals generated at least in part by reflection of the first RF transmit signal and/or the second RF transmit signal from the target object, wherein:
the receiver comprises a receive antenna array comprising a plurality of receive antenna elements arranged along a dimension of the receive antenna array;
receiving the one or more RF signals comprises:
operating the plurality of receive antenna elements according to a first receive phase shift pattern during a first time period; and
operating the plurality of receive antenna elements according to a second receive phase shift pattern during a second time period that is after the first time period, the second receive phase shift pattern being different from the first receive phase shift pattern; and
the one or more RF signals are received during the first time period and/or the second time period; and
for a particular frame of the plurality of frames, generating a respective range-cross range image using the one or more RF signals received by the receiver of the radar device during the particular frame,
wherein the first time period and the second time period are within the particular frame; and
outputting the plurality of range-cross range images.

9. The method of claim 8, wherein the first RF transmit signal and the second RF transmit signal have frequency content in a frequency band of 300 GHz-3 THz.

10. The method of claim 8, wherein generating the plurality of range-cross range images comprises, for each frame of the plurality of frames, generating a respective range-cross range image using RF signals received by the radar device during the frame.

11. A radar device for generating a range-cross range image of a target object, the radar device comprising:
a transmitter configured to transmit a first RF transmit signal and transmit a second RF transmit signal, wherein:
the transmitter comprises a transmit antenna array comprising a plurality of transmit antenna elements arranged along a dimension of the transmit antenna array; and
the transmitter is configured to transmit the first RF transmit signal via the plurality of transmit antenna elements according to a first transmit power level and transmit the second RF transmit signal via the plurality of transmit antenna elements according to a second transmit power level that is different from the first transmit power level;
a receiver configured to receive one or more RF signals generated at least in part by reflection of the first RF transmit signal and/or the second RF transmit signal from the target object; and
processing circuitry configured to:
obtain situational awareness data for a vehicle, the situational awareness data being indicative of at least one characteristic of the vehicle, at least one characteristic of the target object, and/or at least one characteristic of an environment of the vehicle;
select a frame rate based on the situational awareness data for the vehicle;
generate a plurality of range-cross range images corresponding to a respective plurality of frames defined by the frame rate at least in part by:
for a particular frame of the plurality of frames, generating a respective range-cross range image using the one or more RF signals received by the receiver of the radar device during the particular frame; and
output the plurality of range-cross range images.

12. The radar device of claim 11, wherein the processing circuitry is configured to generate the plurality of range-cross range images at least in part by, for each frame of the plurality of frames, generating a respective range-cross range image using RF signals received by the radar device during the frame.

13. The radar device of claim 11, wherein:
the transmitter comprises a transmit antenna array comprising a plurality of transmit antenna elements arranged along a dimension of the transmit antenna array; and
the transmitter is configured to transmit the first RF transmit signal using a first subset of the plurality of transmit antenna elements and transmit the second RF transmit signal using a second subset of the plurality of transmit antenna elements that is different from the first subset of the plurality of transmit antenna elements.

14. The radar device of claim 11, wherein:

the transmitter comprises a transmit antenna array comprising a plurality of transmit antenna elements arranged along a dimension of the transmit antenna array; and the transmitter is configured to transmit the first RF transmit signal via the plurality of transmit antenna elements according to a first transmit phase shift pattern and transmit the second RF transmit signal via the plurality of transmit antenna elements according to a second transmit phase shift pattern that is different from the first transmit phase shift pattern.

15. The radar device of claim 11, wherein the first RF transmit signal and the second RF transmit signal have frequency content in a frequency band of 300 GHz-3 THz.

16. A radar device for generating a range-cross range image of a target object, the radar device comprising:

a transmitter configured to transmit a first RF transmit signal and transmit a second RF transmit signal;

a receiver configured to receive one or more RF signals generated at least in part by reflection of the first RF transmit signal and/or the second RF transmit signal from the target object, wherein:

the receiver comprises a receive antenna array comprising a plurality of receive antenna elements arranged along a dimension of the receive antenna array; and the receiver is configured to:

use a first subset of the plurality of receive antenna elements during a first time period;

use a second subset of the plurality of receive antenna elements that is different from the first subset of the plurality of receive antenna elements during a second time period that is after the first time period and within the particular frame; and receive the one or more RF signals during the first time period and/or the second time period; and processing circuitry configured to:

obtain situational awareness data for a vehicle, the situational awareness data being indicative of at least one characteristic of the vehicle, at least one characteristic of the target object, and/or at least one characteristic of an environment of the vehicle;

select a frame rate based on the situational awareness data for the vehicle;

generate a plurality of range-cross range images corresponding to a respective plurality of frames defined by the frame rate at least in part by:

for a particular frame of the plurality of frames, generating a respective range-cross range image using the one or more RF signals received by the radar device during the particular frame, wherein the first time period and the second time period are within the particular frame; and output the plurality of range-cross range images.

17. The radar device of claim 16, wherein the first RF transmit signal and the second RF transmit signal have frequency content in a frequency band of 300 GHz-3 THz.

18. A radar device for generating a range-cross range image of a target object, the radar device comprising:

a transmitter configured to transmit a first RF transmit signal and transmit a second RF transmit signal;

a receiver configured to receive one or more RF signals generated at least in part by reflection of the first RF transmit signal and/or the second RF transmit signal from the target object, wherein:

the receiver comprises a receive antenna array comprising a plurality of receive antenna elements arranged along a first dimension of the receive antenna array; and the receiver is configured to:

operate according to a first receive phase shift pattern during a first time period;

operate according to a second receive phase shift pattern that is different from the first receive phase shift pattern during a second time period that is after the first time period; and receive the one or more RF signals during the first time period and/or the second time period; and processing circuitry configured to:

obtain situational awareness data for a vehicle, the situational awareness data being indicative of at least one characteristic of the vehicle, at least one characteristic of the target object, and/or at least one characteristic of an environment of the vehicle;

select a frame rate based on the situational awareness data for the vehicle;

generate a plurality of range-cross range images corresponding to a respective plurality of frames defined by the frame rate at least in part by:

for a particular frame of the plurality of frames, generating a respective range-cross range image using the one or more RF signals received by the radar device during the particular frame, wherein the first time period and the second time period are within the particular frame; and output the plurality of range-cross range images.

19. The radar device of claim 18, wherein the first RF transmit signal and the second RF transmit signal have frequency content in a frequency band of 300 GHz-3 THz.

20. The radar device of claim 18, wherein the processing circuitry is configured to generate the plurality of range-cross range images at least in part by, for each frame of the plurality of frames, generating a respective range-cross range image using RF signals received by the radar device during the frame.

* * * * *